(12) United States Patent
Fu et al.

(10) Patent No.: US 12,372,746 B2
(45) Date of Patent: Jul. 29, 2025

(54) IMAGING SYSTEM LENS ASSEMBLY, IMAGE CAPTURING UNIT AND ELECTRONIC DEVICE

(71) Applicant: LARGAN PRECISION CO., LTD., Taichung (TW)

(72) Inventors: Wei-Xiang Fu, Taichung (TW); Jin Sen Wang, Taichung (TW); I-Hsuan Chen, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 478 days.

(21) Appl. No.: 17/960,685

(22) Filed: Oct. 5, 2022

(65) Prior Publication Data

US 2024/0085664 A1 Mar. 14, 2024

(30) Foreign Application Priority Data

Sep. 2, 2022 (TW) .................................. 111133306

(51) Int. Cl.
*G02B 9/60* (2006.01)
*G02B 1/04* (2006.01)

(52) U.S. Cl.
CPC ............... *G02B 9/60* (2013.01); *G02B 1/041* (2013.01)

(58) Field of Classification Search
None
See application file for complete search history.

(56) References Cited

U.S. PATENT DOCUMENTS 9,128,266 B2    9/2015  Chen
9,279,956 B2    3/2016  Lin et al.
9,377,602 B2    6/2016  Lin et al.
(Continued)

FOREIGN PATENT DOCUMENTS

CN    110262014 A    9/2019
CN    106959500 B    12/2019
(Continued)

OTHER PUBLICATIONS

Taiwan Office Action issued in corresponding application No. 111133306, dated Aug. 1, 2023.
(Continued)

*Primary Examiner* — Darryl J Collins
(74) *Attorney, Agent, or Firm* — Maschoff Brennan

(57) ABSTRACT

An imaging system lens assembly includes, in order from an object side to an image side: a first lens element, a second lens element, a third lens element, a fourth lens element and a fifth lens element. The first lens element with positive refractive power has an object-side surface being convex in a paraxial region thereof and an image-side surface being concave in a paraxial region thereof. The second lens element with positive refractive power has an image-side surface being convex in a paraxial region thereof. The third lens element has an object-side surface being concave in a paraxial region thereof and an image-side surface being convex in a paraxial region thereof. The fifth lens element (Continued)

with positive refractive power has an object-side surface being convex in a paraxial region thereof and an image-side surface being concave in a paraxial region thereof and having at least one inflection point.

26 Claims, 34 Drawing Sheets

(56) References Cited

U.S. PATENT DOCUMENTS

| | | |
|---|---|---|
| 9,625,680 B2 | 4/2017 | Chen |
| 10,394,001 B2 | 8/2019 | Lin et al. |
| 10,523,850 B2 | 12/2019 | Chen et al. |
| 10,620,404 B2 | 4/2020 | Chen et al. |
| 2013/0335834 A1* | 12/2013 | Tsai .................. G02B 13/0045 359/713 |
| 2014/0340766 A1 | 11/2014 | Hsu et al. |
| 2015/0097106 A1 | 4/2015 | Yu |
| 2015/0098011 A1 | 4/2015 | Huang |
| 2016/0334607 A1* | 11/2016 | Chen ................. G02B 13/0045 |
| 2018/0275373 A1 | 9/2018 | Hsu |
| 2019/0129137 A1* | 5/2019 | Nitta ...................... H04N 23/55 |
| 2020/0209572 A1* | 7/2020 | Teraoka ................... G02B 9/62 |
| 2020/0333562 A1 | 10/2020 | Lin et al. |
| 2022/0179179 A1* | 6/2022 | Sekine ..................... G02B 9/64 |
| 2023/0087134 A1* | 3/2023 | Dang ................. G02B 13/0045 359/714 |

FOREIGN PATENT DOCUMENTS

| | | |
|---|---|---|
| CN | 107121755 B | 8/2020 |
| CN | 113835191 A | 12/2021 |
| CN | 114002822 A | 2/2022 |
| CN | 114815171 A | 7/2022 |
| TW | 201335619 A | 9/2013 |
| WO | 20191/84367 A1 | 10/2019 |
| WO | 2021/012771 A1 | 1/2021 |

OTHER PUBLICATIONS

European Search Report dated Dec. 1, 2023 as received in application No. 22204512.2.

\* cited by examiner

IMAGING SYSTEM LENS ASSEMBLY, IMAGE CAPTURING UNIT AND ELECTRONIC DEVICE

RELATED APPLICATIONS

This application claims priority to Taiwan Application 111133306, filed on Sep. 2, 2022, which is incorporated by reference herein in its entirety.

BACKGROUND

Technical Field

The present disclosure relates to an imaging system lens assembly, an image capturing unit and an electronic device, more particularly to an imaging system lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging system lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The first lens element has positive refractive power, the object-side surface of the first lens element is convex in a paraxial region thereof, and the image-side surface of the first lens element is concave in a paraxial region thereof. The second lens element has positive refractive power, and the image-side surface of the second lens element is convex in a paraxial region thereof. The object-side surface of the third lens element is concave in a paraxial region thereof, and the image-side surface of the third lens element is convex in a paraxial region thereof. The fifth lens element has positive refractive power, the object-side surface of the fifth lens element is convex in a paraxial region thereof, and the image-side surface of the fifth lens element is concave in a paraxial region thereof. The image-side surface of the fifth lens element has at least one inflection point.

When a focal length of the imaging system lens assembly is f, a focal length of the third lens element is f3, a focal length of the fourth lens element is f4, an axial distance between the fourth lens element and the fifth lens element is T45, a central thickness of the fifth lens element is CT5, a curvature radius of the image-side surface of the third lens element is R6, and half of a maximum field of view of the imaging system lens assembly is HFOV, the following conditions are satisfied:

$-3.00 < f/f3 < 0.40$;

$-3.00 < f/f4 < 0.45$;

$0.15 < T45/CT5 < 1.50$;

$-2.80 < f/R6 < -0.10$; and $20.00 \text{ degrees} < HFOV < 75.00 \text{ degrees}$.

According to another aspect of the present disclosure, an imaging system lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The first lens element has positive refractive power, and the object-side surface of the first lens element is convex in a paraxial region thereof. The second lens element has positive refractive power. The image-side surface of the third lens element is convex in a paraxial region thereof. The fifth lens element has positive refractive power, the object-side surface of the fifth lens element is convex in a paraxial region thereof, and the image-side surface of the fifth lens element is concave in a paraxial region thereof. The image-side surface of the fifth lens element has at least one critical point in an off-axis region thereof.

When a focal length of the imaging system lens assembly is f, a composite focal length of the first lens element, the second lens element and the third lens element is f123, a composite focal length of the fourth lens element and the fifth lens element is f45, a maximum value among all axial distances between each of all adjacent lens elements of the imaging system lens assembly is ATmax, an axial distance between the fourth lens element and the fifth lens element is T45, a curvature radius of the object-side surface of the fourth lens element is R7, a curvature radius of the image-side surface of the fourth lens element is R8, and a curvature radius of the image-side surface of the fifth lens element is R10, the following conditions are satisfied:

$-0.35 < f123/f45 < 3.50$;

$1.00 \leq AT\max/T45 < 3.00$;

$-4.00 < (R7+R8)/(R7-R8) < 3.00$; and $0.15 < f/R10 < 10.00$.

According to another aspect of the present disclosure, an imaging system lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The first lens element has positive refractive power, the object-side surface of the first lens element is convex in a paraxial region thereof, and the image-side surface of the first lens element is concave in a paraxial region thereof. The image-side surface of the second lens element is convex in a paraxial region thereof. The object-side surface of the third lens element is concave in a paraxial region thereof, and the image-side surface of the third lens element is convex in a paraxial region thereof. The fifth lens element has positive refractive power, and the image-side surface of the fifth lens element has at least one critical point in an off-axis region thereof.

When a focal length of the imaging system lens assembly is f, a focal length of the first lens element is f1, a focal length of the fifth lens element is f5, a curvature radius of the image-side surface of the first lens element is R2, a curvature radius of the object-side surface of the second lens element is R3, a curvature radius of the object-side surface of the fifth lens element is R9, a curvature radius of the image-side surface of the fifth lens element is R10, an axial distance between the third lens element and the fourth lens element is T34, an axial distance between the fourth lens element and the fifth lens element is T45, and a central thickness of the third lens element is CT3, the following conditions are satisfied:

$0.15 < f/f1 < 1.80;$ $6.00 < |f5/R9| - |f5/R10| < 65.00;$ $-20.00 < (R2+R3)/(R2-R3) < -0.30;$ and $0.10 < (T45-T34)/CT3 < 3.00.$ According to another aspect of the present disclosure, an image capturing unit includes one of the aforementioned imaging system lens assemblies and an image sensor, wherein the image sensor is disposed on an image surface of the imaging system lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging system lens assembly includes at least one lens elements. Preferably, the imaging system lens assembly includes five lens elements. The five lens elements are, in order from an object side to an image side along an optical path, a first lens element, a second lens element, a third lens element, a fourth lens element and a fifth lens element. Each of the five lens elements of the imaging system lens assembly has an object-side surface facing toward the object side and an image-side surface facing toward the image side.

The first lens element preferably has positive refractive power. Therefore, it is favorable for reducing the opening size of the imaging system lens assembly at the object side so as to increase the screen-to-body ratio. The object-side surface of the first lens element is preferably convex in a paraxial region thereof. Therefore, it is favorable for reducing the incident angle in the off-axis region on the first lens element so as to enlarge the field of view. The image-side surface of the first lens element is preferably concave in a paraxial region thereof. Therefore, it is favorable for adjusting the surface shape of the first lens element so as to correct aberrations, such as astigmatism.

The second lens element preferably has positive refractive power. Therefore, it is favorable for distributing the refractive power of the first lens element so as to prevent excessive spherical aberration caused by overly strong refractive power of a single lens element. The image-side surface of the second lens element is preferably convex in a paraxial region thereof. Therefore, it is favorable for adjusting the travelling direction of light so as to increase the area of an image surface.

The object-side surface of the third lens element is preferably concave in a paraxial region thereof. Therefore, it is favorable for adjusting the shape of the object-side surface of the third lens element so as to balance the distribution of the lens elements in the imaging system lens assembly. The image-side surface of the third lens element is preferably convex in a paraxial region thereof. Therefore, it is favorable for adjusting the travelling direction of light so as to increase the area of the image surface.

The fifth lens element preferably has positive refractive power. Therefore, it is favorable for controlling the back focal length so as to reduce the total track length of the imaging system lens assembly. The object-side surface of the fifth lens element is preferably convex in a paraxial region thereof. Therefore, it is favorable for correcting images so as to improve image quality. The image-side surface of the fifth lens element is preferably concave in a paraxial region thereof. Therefore, it is favorable for adjusting the shape of the image-side surface of the fifth lens element so as to improve the light gathering quality in the paraxial region.

Figure 29:
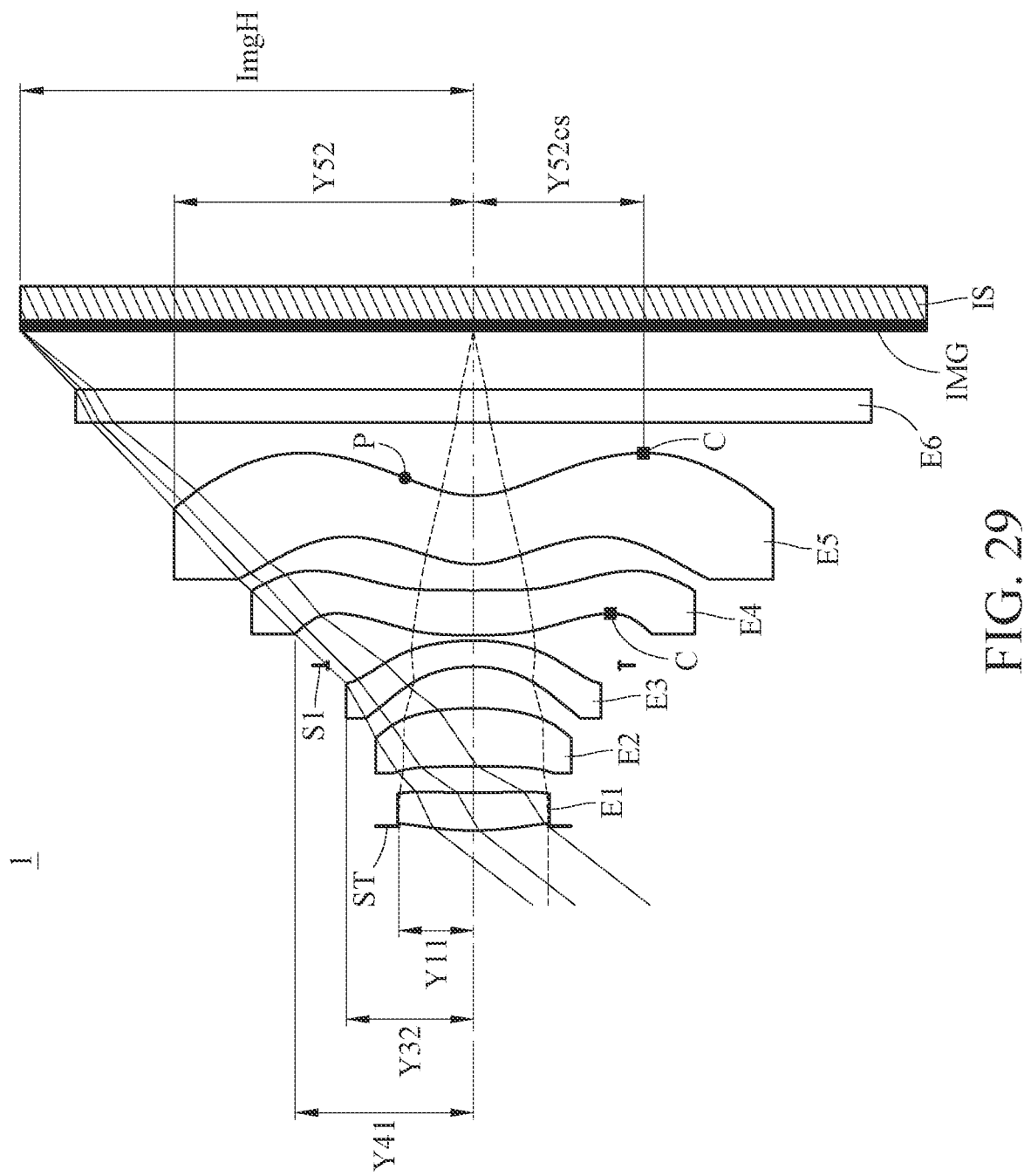
FIG. 29 shows a schematic view of Y11, Y32, Y41, Y52, Y52cs, ImgH, one critical point of the object-sides surface of the fourth lens element, and one inflection point and one critical point of the image-side surface of the fifth lens element according to the 1st embodiment of the present disclosure.

The image-side surface of the fifth lens element preferably has at least one inflection point. Therefore, it is favorable for controlling the incident angle in the off-axis region to reduce vignetting at the image periphery, correcting Petzval field curvature, and reducing distortion. Please refer to FIG. 29, which shows a schematic view of one inflection point P of the image-side surface of the fifth lens element E5 according to the 1st embodiment of the present disclosure. The inflection point P of the image-side surface of the fifth lens element E5 in FIG. 29 is only exemplary. Each of the lens elements in various embodiments of the present disclosure can have one or more inflection points.

The object-side surface of the fourth lens element preferably has at least one concave critical point in an off-axis region thereof. Therefore, it is favorable for adjusting the light travelling direction so as to correct field curvature. The image-side surface of the fifth lens element preferably has at least one critical point in an off-axis region thereof. Therefore, it is favorable for increasing the shape variation of the lens element so as to reduce the incident angle of light, thereby preventing total reflection. Please refer to FIG. 29, which shows a schematic view of critical points C of the object-side surface of the fourth lens element E4 and the image-side surface of the fifth lens element E5 according to the 1st embodiment of the present disclosure. The non-axial critical points C of the object-side surface of the fourth lens element E4 and the image-side surface of the fifth lens element E5 in FIG. 29 are only exemplary. Each of the lens elements in various embodiments of the present disclosure can have one or more non-axial critical points.

The fifth lens element is preferably made of plastic material. Therefore, it is favorable for reducing manufacturing costs and increasing design flexibility so as to improve image quality and increase mass production.

The second lens element, the third lens element and the fourth lens element are preferably made of different materials from one another. In specific, the second lens element can be made of a first material, the third lens element can be made of a second material different from the first material, and the fourth lens element can be made of a third material different from the first material and the second material. Therefore, it is favorable for adjusting the material arrangement of the lens elements so that the lens elements have different optical characteristics from one another so as to balance chromatic aberration and astigmatism and obtain good aberration correction capability.

When a focal length of the imaging system lens assembly is f, and a focal length of the third lens element is f3, the following condition is preferably satisfied: $-3.00 < f/f3 < 0.40$. Therefore, it is favorable for adjusting the refractive power of the third lens element with the collaboration of the first lens element and the second lens element so as to reduce the size of the imaging system lens assembly and prevent excessive aberrations. Moreover, the following condition is preferably satisfied: $-2.00 < f/f3 < 0.30$. Moreover, the following condition is preferably satisfied: $-1.50 < f/f3 < 0.20$. Moreover, the following condition is preferably satisfied: $-1.20 < f/f3 < 0.05$.

When the focal length of the imaging system lens assembly is f, and a focal length of the fourth lens element is f4, the following condition is preferably satisfied: $-3.00 < f/f4 < 0.45$. Therefore, it is favorable for adjusting the refractive power of the fourth lens element so as to correct aberrations, such as astigmatism. Moreover, the following condition is preferably satisfied: $-2.00 < f/f4 < 0.40$. Moreover, the following condition is preferably satisfied: $-1.50 < f/f4 < 0.20$. Moreover, the following condition is preferably satisfied: $-1.20 < f/f4 < 0.00$.

When an axial distance between the fourth lens element and the fifth lens element is T45, and a central thickness of the fifth lens element is CT5, the following condition is preferably satisfied: $0.15 < T45/CT5 < 1.50$. Therefore, it is favorable for adjusting the ratio between the axial distance between the lens elements and the central thickness of the fifth lens element so as to obtain a balance between reducing manufacturing errors and reducing temperature change effects. Moreover, the following condition is preferably satisfied: $0.16 < T45/CT5 < 1.20$. Moreover, the following condition is preferably satisfied: $0.18 < T45/CT5 < 0.90$.

When the focal length of the imaging system lens assembly is f, and a curvature radius of the image-side surface of the third lens element is R6, the following condition is preferably satisfied: $-2.80 < f/R6 < -0.10$. Therefore, it is favorable for the image-side surface of the third lens element to have sufficient curvature so as to increase the field of view and reduce the size of the imaging system lens assembly. Moreover, the following condition is preferably satisfied:

−2.70<f/R6<−0.50. Moreover, the following condition is preferably satisfied: −2.50<f/R6<−1.00.

When half of a maximum field of view of the imaging system lens assembly is HFOV, the following condition is preferably satisfied: 20.00 degrees<HFOV<75.00 degrees. Therefore, it is favorable for adjusting the field of view for various applications, and preventing aberrations, such as distortion, caused by an overly large field of view. Moreover, the following condition is preferably satisfied: 30.00 degrees<HFOV<70.00 degrees. Moreover, the following condition is preferably satisfied: 46.00 degrees<HFOV<65.00 degrees.

When a composite focal length of the first lens element, the second lens element and the third lens element is f123, and a composite focal length of the fourth lens element and the fifth lens element is f45, the following condition is preferably satisfied: −0.35<f123/ f45<3.50. Therefore, it is favorable for the three lens elements located closer to the front side to work with the two lens elements located closer to the rear side so as to correct aberrations, such as spherical aberration. Moreover, the following condition is preferably satisfied: −0.35<f123/ f45<2.00. Moreover, the following condition is preferably satisfied: −0.35<f123/ f45<1.50.

When a maximum value among all axial distances between each of all adjacent lens elements of the imaging system lens assembly is ATmax, and the axial distance between the fourth lens element and the fifth lens element is T45, the following condition is preferably satisfied: 1.00≤ATmax/T45<3.00. Therefore, it is favorable for adjusting the axial distance between the fourth lens element and the fifth lens element so as to obtain a balance between the space utilization and assembly yield rate of the imaging system lens assembly. Moreover, the following condition is preferably satisfied: 1.00≤ATmax/T45<2.70. Moreover, the following condition is preferably satisfied: 1.00≤ATmax/T45<2.30.

When a curvature radius of the object-side surface of the fourth lens element is R7, and a curvature radius of the image-side surface of the fourth lens element is R8, the following condition is preferably satisfied: −4.00<(R7+R8)/(R7−R8)<3.00. Therefore, it is favorable for adjusting the surface shape and refractive power of the fourth lens element so as to improve the light gathering quality in the paraxial region. Moreover, the following condition is preferably satisfied: −3.50<(R7+R8)/(R7−R8)<2.40.

When the focal length of the imaging system lens assembly is f, and a curvature radius of the image-side surface of the fifth lens element is R10, the following condition is preferably satisfied: 0.15<f/R10<10.00. Therefore, it is favorable for adjusting the shape of the image-side surface of the fifth lens element so as to reduce spherical aberration in the paraxial region and reduce the assembly size. Moreover, the following condition is preferably satisfied: 1.50<f/R10<6.00. Moreover, the following condition is preferably satisfied: 2.10<f/R10<5.50.

When the focal length of the imaging system lens assembly is f, and a focal length of the first lens element is f1, the following condition is preferably satisfied: 0.15<f/f1<1.80. Therefore, it is favorable for adjusting the refractive power of the first lens element, so that the first lens element has sufficient light converging capability so as to reduce the opening and reduce the total track length of the imaging system lens assembly. Moreover, the following condition is preferably satisfied: 0.25<f/f1<1.50. Moreover, the following condition is preferably satisfied: 0.30<f/f1<1.10.

When a focal length of the fifth lens element is f5, a curvature radius of the object-side surface of the fifth lens element is R9, and the curvature radius of the image-side surface of the fifth lens element is R10, the following condition is preferably satisfied: 6.00<|f5/ R9|+|f5/ R10|<65.00.

Therefore, it is favorable for adjusting the ratio between the curvature radii and focal length of the fifth lens element so as to maintain sufficient curvature of the fifth lens element and prevent excessive aberrations generated and molding difficulty increased due to overly large curvature. Moreover, the following condition is preferably satisfied: 6.80<|f5/ R9|+|f5/ R10|<50.00. Moreover, the following condition is preferably satisfied: 9.00<|f5/ R9|+|f5/ R10|<25.00.

When a curvature radius of the image-side surface of the first lens element is R2, and a curvature radius of the object-side surface of the second lens element is R3, the following condition is preferably satisfied: −20.00<(R2+R3)/(R2−R3)<−0.30. Therefore, it is favorable for adjusting the surface shape and refractive power of the first and second lens elements so as to reduce the effective radius of the second lens element, thereby reducing the assembly size. Moreover, the following condition is preferably satisfied: −16.00<(R2+R3)/(R2−R3)<−0.40.

When an axial distance between the third lens element and the fourth lens element is T34, the axial distance between the fourth lens element and the fifth lens element is T45, and a central thickness of the third lens element is CT3, the following condition is preferably satisfied: 0.10<(T45−T34)/CT3<3.00. Therefore, it is favorable for increasing the structural strength in the middle part of the imaging system lens assembly so as to increase the overall systematic stability and reduce the sensitivity. Moreover, the following condition is preferably satisfied: 0.32<(T45−T34)/CT3<2.80.

When the curvature radius of the object-side surface of the second lens element is R3, and a curvature radius of the image-side surface of the second lens element is R4, the following condition is preferably satisfied: 0.25<(R3+R4)/(R3−R4)<2.00. Therefore, it is favorable for adjusting the surface shape of the second lens element so as to adjust the light path and thereby improve image quality. Moreover, the following condition is preferably satisfied: 0.25<(R3+R4)/(R3−R4)<1.30. When a focal length of the second lens element is f2, and a central thickness of the second lens element is CT2, the following condition is preferably satisfied: 5.30<f2/ CT2<20.00. Therefore, it is favorable for balancing the refractive power and thickness of the lens element so as to correct aberrations and reduce the size of the imaging system lens assembly.

When an axial distance between the object-side surface of the first lens element and the image surface is TL, and a maximum image height of the imaging system lens assembly (which can be half of a diagonal length of an effective photosensitive area of an image sensor) is ImgH, the following condition is preferably satisfied: 0.60<TL/ImgH<1.45. Therefore, it is favorable for reducing the total track length and increasing light absorption area of the image sensor. Moreover, the following condition is preferably satisfied: 0.70<TL/ImgH<1.40. Moreover, the following condition is preferably satisfied: 0.80<TL/ImgH<1.25.

When a maximum effective radius of the image-side surface of the third lens element is Y32, and a maximum effective radius of the object-side surface of the fourth lens element is Y41, the following condition is preferably satisfied: 1.25<Y41/Y32<1.80. Therefore, it is favorable for adjusting the ratio between the effective radii of the third and fourth lens elements so as to increase the size of the image surface. Please refer to FIG. 29, which shows a schematic view of Y32 and Y41 according to the 1st embodiment of the present disclosure.

When the focal length of the first lens element is f1, the focal length of the second lens element is f2, the focal length of the third lens element is f3, the focal length of the fourth lens element is f4, and the focal length of the fifth lens element is f5, the following condition is preferably satisfied: $0.20<(|f1|+|f2|+|f5|)/(|f3|+|f4|)<2.00$. Therefore, it is favorable for adjusting the refractive power distribution among the lens elements at the front side and rear side and the lens elements at the middle portion so as to reduce the eccentricity sensitivity. Moreover, the following condition is preferably satisfied: $0.30<(|f1|+|f2|+|f5|)/(|f3|+|f4|)<1.50$.

When an Abbe number of the second lens element is V2, and an Abbe number of the third lens element is V3, the following condition is preferably satisfied: $1.10<V2/V3<4.50$. Therefore, it is favorable for the second lens element and the third lens element to work with each other so as to correct chromatic aberration. Moreover, the following condition is preferably satisfied: $2.50<V2/V3<3.70$.

Figure 30:
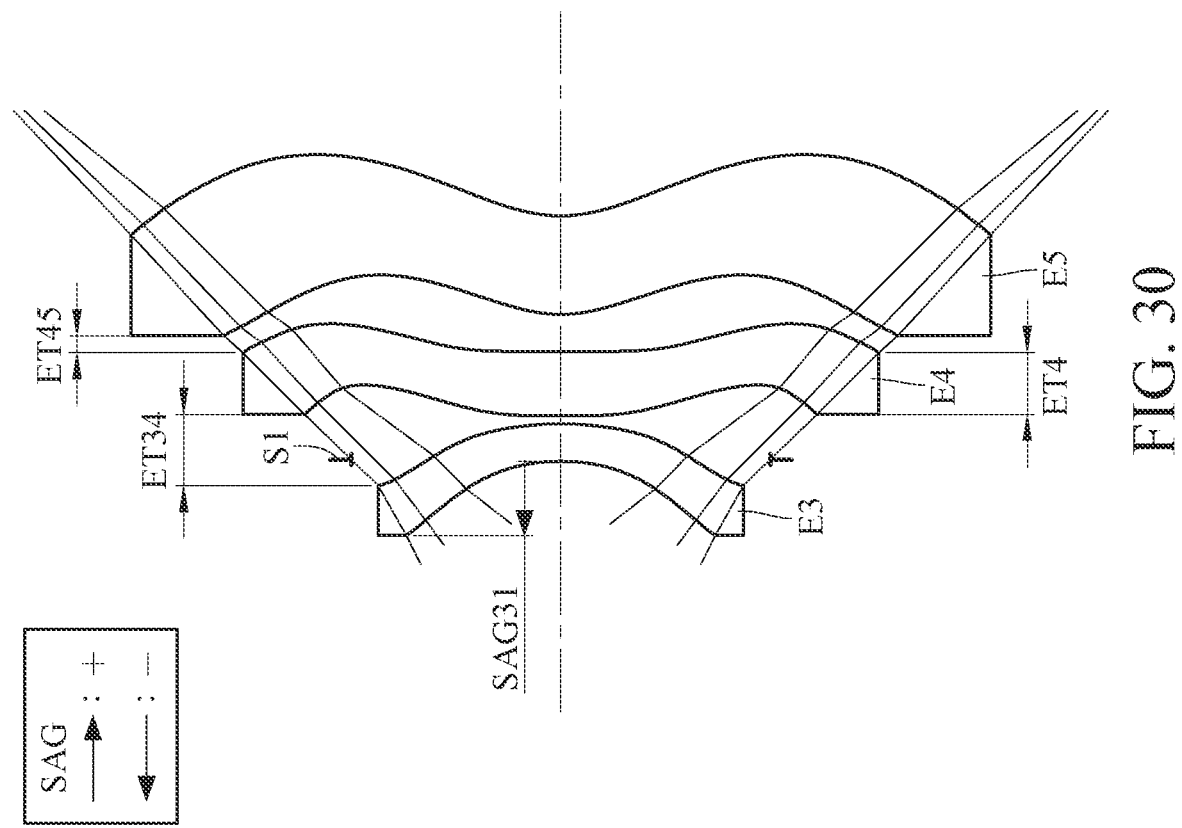
FIG. 30 shows a schematic view of SAG41, ET4, ET34 and ET45 according to the 1st embodiment of the present disclosure.

When a distance in parallel with an optical axis between a maximum effective radius position of the object-side surface of the fourth lens element and a maximum effective radius position of the image-side surface of the fourth lens element is ET4, and an axial distance between the second lens element and the third lens element is T23, the following condition is preferably satisfied: $0.10<ET4/T23<2.50$. Therefore, it is favorable for adjusting the ratio between the axial distance between the lens elements and the peripheral thickness of the lens element so as to obtain a balance between the molding difficulty and assembly yield rate. Moreover, the following condition is preferably satisfied: $0.20<ET4/T23<1.80$. Please refer to FIG. 30, which shows a schematic view of ET4 according to the 1st embodiment of the present disclosure.

When a central thickness of the first lens element is CT1, the central thickness of the second lens element is CT2, the central thickness of the third lens element is CT3, and a central thickness of the fourth lens element is CT4, the following condition is preferably satisfied: $1.50<(CT1+CT3+CT4)/CT2<2.60$. Therefore, it is favorable for adjusting the thickness ratio of each of the lens elements so as to maintain the systematic stability.

When the focal length of the first lens element is f1, and the focal length of the second lens element is f2, the following condition is preferably satisfied: $0.25<f1/f2<4.00$. Therefore, it is favorable for the first lens element and the second lens element to work with each other so as to correct aberrations, such as spherical aberration. Moreover, the following condition is preferably satisfied:

$0.40<f1/f2<2.50$.

Figure 31:
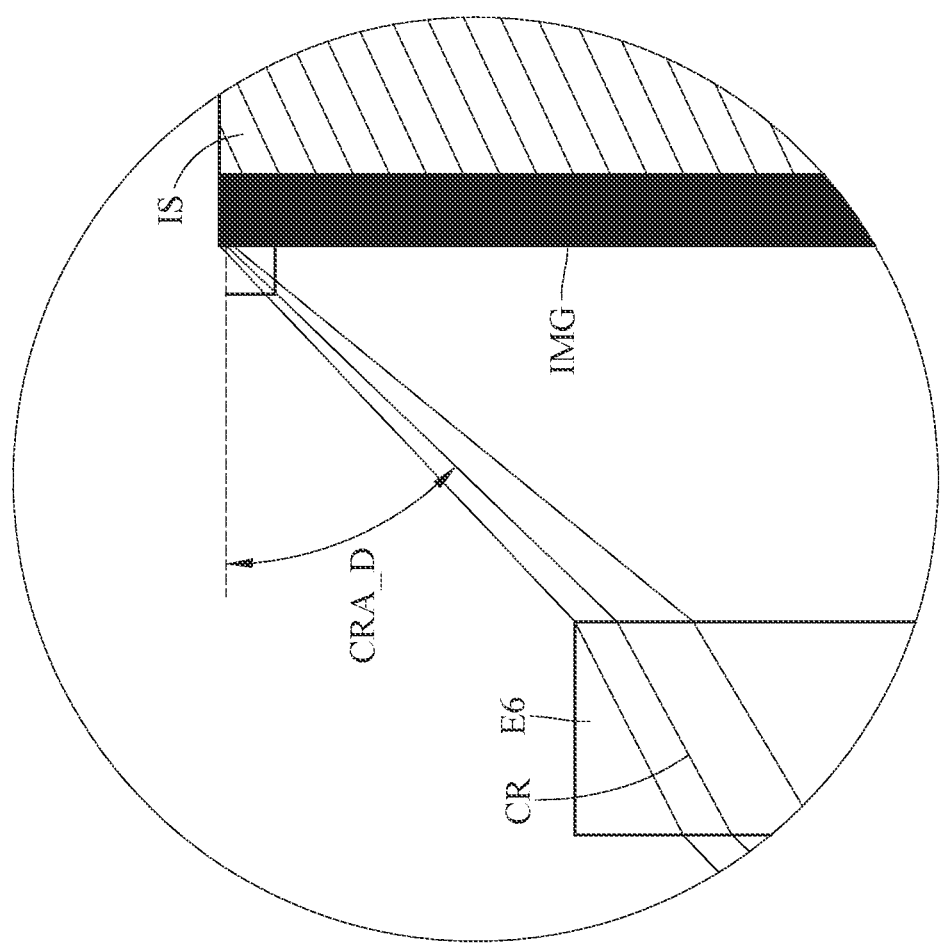
FIG. 31 shows a schematic view of CRA_D according to the 1st embodiment of the present disclosure.

When a chief ray angle of the maximum field of view on the image surface of the imaging system lens assembly is CRA_D, the following condition is preferably satisfied: $34.00$ degrees$<$CRA_D$<65.00$ degrees. Therefore, it is favorable for reducing the back focal length and the total track length of the imaging system lens assembly so as to meet the requirement of compactness. Moreover, the following condition is preferably satisfied: $35.00$ degrees$<$CRA_D$<60.00$ degrees. Please refer to FIG. 31, which shows a schematic view of a chief ray angle CRA_D according to the 1st embodiment of the present disclosure. In FIG. 31, a chief ray CR of the maximum field of view is incident on the image surface IMG at an image position, and the angle between a normal line of the image surface IMG and the chief ray CR of the maximum field of view is the chief ray angle CRA_D of the maximum field of view.

When a vertical distance between a critical point closest to the image surface on the image-side surface of the fifth lens element and the optical axis is Y52cs, and a maximum effective radius of the image-side surface of the fifth lens element is Y52, the following condition is preferably satisfied: $0.35<Y52cs/Y52<0.80$. Therefore, it is favorable for controlling the position of the critical point of the image-side surface of the fifth lens element so as to adjust the incident angle of light on the image surface, thereby maintaining image quality at various object distances. Moreover, the following condition is preferably satisfied: $0.45<Y52cs/Y52<0.70$. Please refer to FIG. 29, which shows a schematic view of Y52cs and Y52 according to the 1st embodiment of the present disclosure. When a curvature radius of the object-side surface of the first lens element is R1, and the curvature radius of the image-side surface of the second lens element is R4, the following condition is preferably satisfied: $-4.50<R4/R1<0.00$. Therefore, it is favorable for the surface shape of the first lens element and the second lens element to collaborate with each other so as to correct aberrations. Moreover, the following condition is preferably satisfied: $-3.20<R4/R1<-0.55$. Moreover, the following condition is preferably satisfied: $-2.50<R4/R1<-0.80$.

When the curvature radius of the object-side surface of the fifth lens element is R9, and the curvature radius of the image-side surface of the fifth lens element is R10, the following condition is preferably satisfied: $-0.15<(R9-R10)/(R9+R10)<0.25$. Therefore, it is favorable for adjusting the surface shape and the refractive power of the fifth lens element so as to reduce the back focal length.

When an f-number of the imaging system lens assembly is Fno, the following condition is preferably satisfied: $1.60<Fno<2.46$. Therefore, it is favorable for adjusting the size of the aperture stop so as to obtain a balance between the image quality of overall field of view and the relative illuminance on the peripheral image.

When an Abbe number of the first lens element is V1, the Abbe number of the second lens element is V2, the Abbe number of the third lens element is V3, an Abbe number of the fourth lens element is V4, an Abbe number of the fifth lens element is V5, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the i-th lens element is Ni, and a minimum value of Vi/Ni is min(Vi/Ni), the following condition is preferably satisfied: min(Vi/Ni)$<14.00$, wherein i=1, 2, 3, 4 or 5. Therefore, it is favorable for adjusting the material arrangement of lens elements so as to balance the chromatic aberration and astigmatism and increase light refractive capability, thereby achieving compactness. Moreover, the following condition is preferably satisfied: min(Vi/Ni)$<12.00$, wherein i=1, 2, 3, 4 or 5.

When a displacement in parallel with the optical axis from an axial vertex of the object-side surface of the third lens element to a maximum effective radius position of the object-side surface of the third lens element is SAG31, and the central thickness of the third lens element is CT3, the following condition is preferably satisfied: $-5.00<SAG31/CT3<-0.75$. Therefore, it is favorable for adjusting the ratio of the off-axis shape of the object-side surface of the third lens element and the central thickness of the third lens element so as to control the shape of the third lens element for correcting off-axis aberrations. Moreover, the following condition is preferably satisfied: $-3.80<SAG31/CT3<-0.90$. Please refer to FIG. 30 which shows a schematic view of SAG31 according to the 1st embodiment of the present disclosure. When the direction from the axial vertex of one surface to the maximum effective radius position of the same surface is facing towards the image side of the imaging system lens assembly, the value of displacement is positive; when the direction from the axial vertex of the surface to the maximum effective radius position of the same surface is facing towards the object side of the imaging system lens assembly, the value of displacement is negative.

When the maximum image height of the imaging system lens assembly is ImgH, the following condition is preferably satisfied: 2.60 mm<ImgH<6.00 mm. Therefore, it is favorable for providing a proper light receiving area with sufficient image brightness so as to meet the requirement of product specifications.

When an axial distance between the object-side surface of the first lens element and the image-side surface of the fifth lens element is TD, and an axial distance between the image-side surface of the fifth lens element and the image surface is BL, the following condition is preferably satisfied: 1.00<TD/BL<4.80. Therefore, it is favorable for adjusting the lens element distribution and back focal length so as to reduce the back focal length. Moreover, the following condition is preferably satisfied: 1.20<TD/BL<3.90. Moreover, the following condition is preferably satisfied: 1.80<TD/BL<3.20.

When the Abbe number of the third lens element is V3, and the refractive index of the third lens element is N3, the following condition is preferably satisfied: 5.00<V3/N3<35.00. Therefore, it is favorable for adjusting the material of the third lens element so as to correct chromatic aberration generated by the first lens element and the second lens element. Moreover, the following condition is preferably satisfied: 7.00<V3/N3<13.00.

When the focal length of the imaging system lens assembly is f, the focal length of the third lens element is f3, the focal length of the fourth lens element is f4, and the focal length of the fifth lens element is f5, the following condition is preferably satisfied: $-0.90<f/f3+f/f4+f/f5<0.30$. Therefore, it is favorable for balancing the refractive power distribution at the image side of the imaging system lens assembly so as to prevent excessive aberration corrections due to overly strong refractive power of a single lens element. Moreover, the following condition is preferably satisfied: $-0.60<f/f3+f/f4+f/f5<0.15$.

When a distance in parallel with the optical axis between a maximum effective radius position of the image-side surface of the third lens element and the maximum effective radius position of the object-side surface of the fourth lens element is ET34, and a distance in parallel with the optical axis between the maximum effective radius position of the image-side surface of the fourth lens element and a maximum effective radius position of the object-side surface of the fifth lens element is ET45, the following condition is preferably satisfied: 0.35<ET34/ET45<8.00. Therefore, it is favorable for controlling the overall position distribution of the three lens elements located closer to the rear side so as to obtain a balance between correcting off-axis aberrations and maintaining systematic stability. Moreover, the following condition is preferably satisfied: 0.45<ET34/ET45<6.00. Please refer to FIG. 30, which shows a schematic view of ET34 and ET45 according to the 1st embodiment of the present disclosure.

When a maximum effective radius of the object-side surface of the first lens element is Y11, and the maximum image height of the imaging system lens assembly is ImgH, the following condition is preferably satisfied: 0.10<Y11/ImgH<0.35. Therefore, it is favorable for adjusting the ratio between the effective radius of the first lens element and the image surface area so as to increase light absorption area and reduce the object side outer diameter of the imaging system lens assembly, thereby providing a preferable device appearance. Moreover, the following condition is preferably satisfied: 0.15<Y11/ImgH<0.27. Please refer to FIG. 29, which shows a schematic view of Y11 according to the 1st embodiment of the present disclosure.

When the Abbe number of the first lens element is V1, the Abbe number of the fourth lens element is V4, and the Abbe number of the fifth lens element is V5, the following condition is preferably satisfied: 0.90<(V4+V5)/V1<1.90. Therefore, it is favorable for balancing the material arrangement of lens elements in the imaging system lens assembly so as to improve light modulating abilities of the lens elements.

When the central thickness of the first lens element is CT1, the central thickness of the second lens element is CT2, the central thickness of the fourth lens element is CT4, the central thickness of the fifth lens element is CT5, an axial distance between the first lens element and the second lens element is T12, and the axial distance between the fourth lens element and the fifth lens element is T45, the following condition is preferably satisfied: 0.85<(CT4+T45+CT5)/(CT1+T12+CT2)<2.00. Therefore, it is favorable for adjusting the axial distance distribution between lens elements of the front side and rear side of the imaging system lens assembly so as to reduce the assembly difficulty.

According to the present disclosure, the aforementioned features and conditions can be utilized in numerous combinations so as to achieve corresponding effects.

According to the present disclosure, the lens elements of the imaging system lens assembly can be made of either glass or plastic material. When the lens elements are made of glass material, the refractive power distribution of the imaging system lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging system lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging system lens assembly, based on the corresponding image sensor, can be flat or curved, especially a curved surface being concave facing towards the object side of the imaging system lens assembly.

According to the present disclosure, an image correction unit, such as a field flattener, can be optionally disposed between the lens element closest to the image side of the imaging system lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 32:
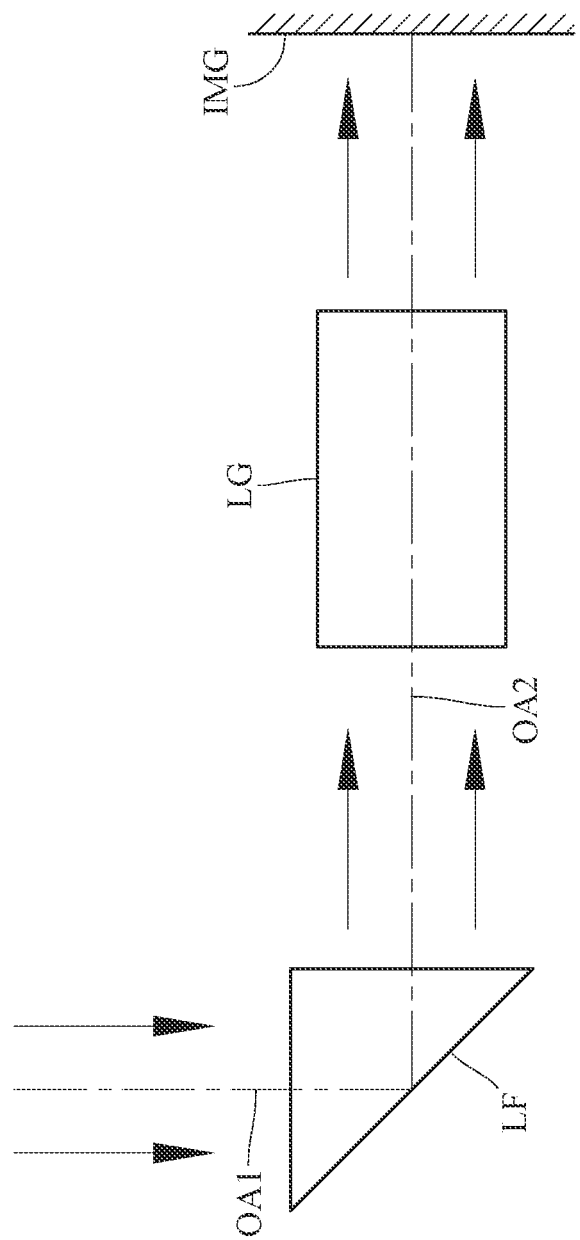
FIG. 32 shows a schematic view of a configuration of one light-folding element in an imaging system lens assembly according to one embodiment of the present disclosure.
Figure 33:
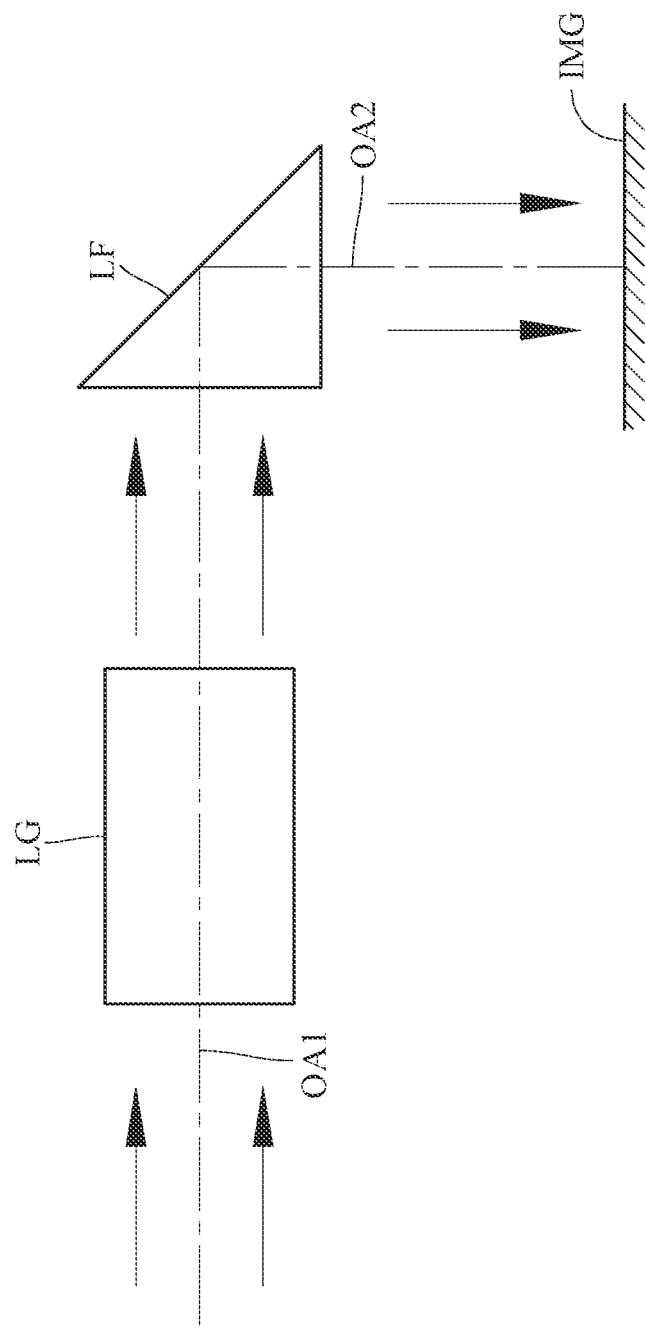
FIG. 33 shows a schematic view of another configuration of one light-folding element in an imaging system lens assembly according to one embodiment of the present disclosure.
Figure 34:
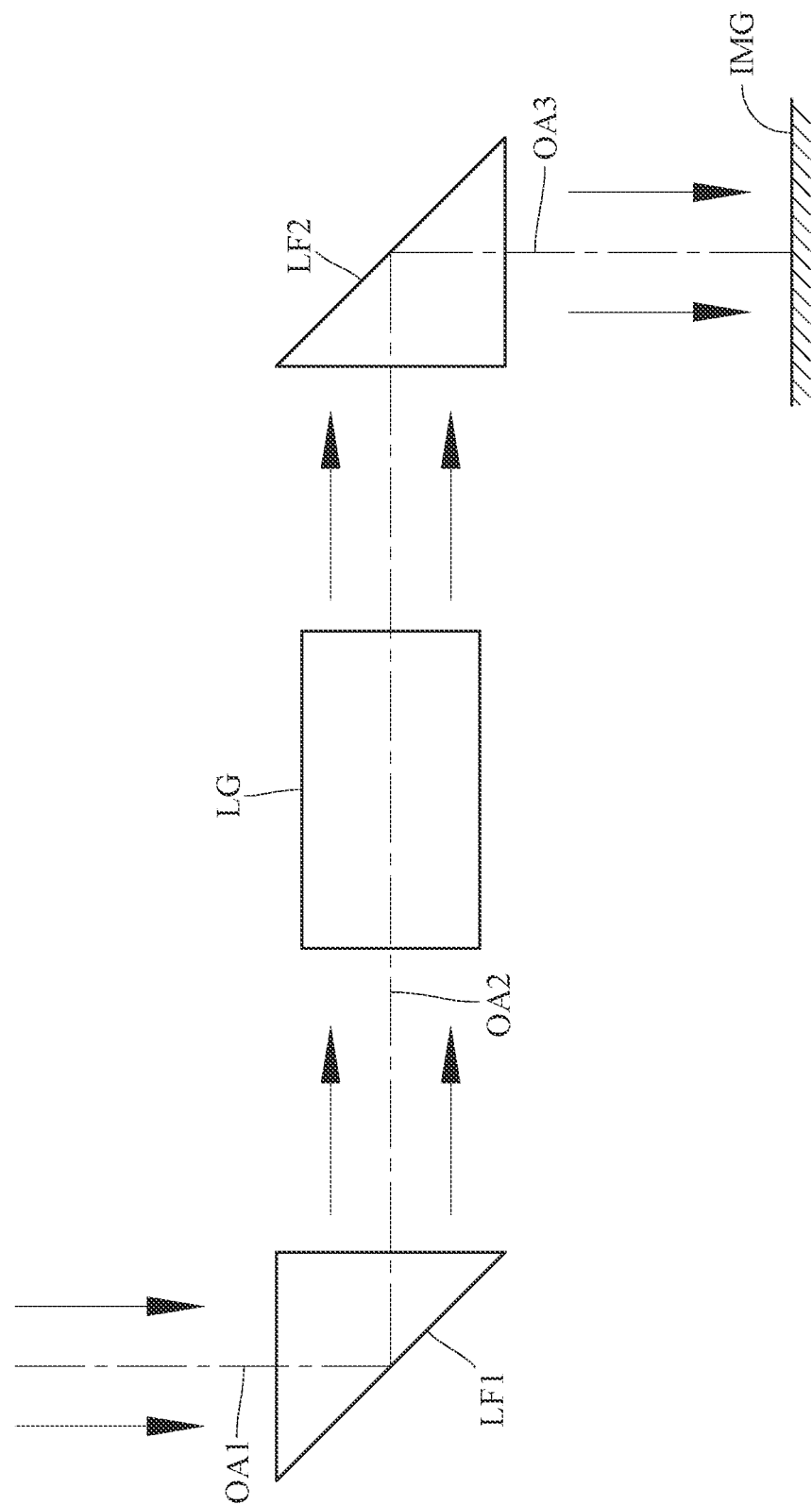
FIG. 34 shows a schematic view of a configuration of two light-folding elements in an imaging system lens assembly according to one embodiment of the present disclosure.

According to the present disclosure, at least one light-folding element, such as a prism or a mirror, can be optionally disposed between an imaged object and the image surface on the imaging optical path, such that the imaging system lens assembly can be more flexible in space arrangement, and therefore the dimensions of an electronic device is not restricted by the total track length of the imaging system lens assembly. Specifically, please refer to FIG. 32 and FIG. 33. FIG. 32 shows a schematic view of a configuration of a light-folding element in an imaging system lens assembly according to one embodiment of the present disclosure, and FIG. 33 shows a schematic view of another configuration of a light-folding element in an imaging system lens assembly according to one embodiment of the present disclosure. In FIG. 32 and FIG. 33, the imaging system lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the imaging system lens assembly as shown in FIG. 32 or disposed between a lens group LG of the imaging system lens assembly and the image surface IMG as shown in FIG. 33. Furthermore, please refer to FIG. 34, which shows a schematic view of a configuration of two light-folding elements in an imaging system lens assembly according to one embodiment of the present disclosure. In FIG. 34, the imaging system lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging system lens assembly, the second light-folding element LF2 is disposed between the lens group LG of the imaging system lens assembly and the image surface IMG, and the travelling direction of light on the first optical axis OA1 can be the same direction as the travelling direction of light on the third optical axis OA3 as shown in FIG. 34. The imaging system lens assembly can be optionally provided with three or more light-folding elements, and the present disclosure is not limited to the type, amount and position of the light-folding elements of the embodiments disclosed in the aforementioned figures.

According to the present disclosure, the imaging system lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging system lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging system lens assembly and thereby provides a wider field of view for the same.

According to the present disclosure, the imaging system lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging system lens assembly can include one or more optical elements for limiting the form of light passing through the imaging system lens assembly. Each optical element can be, but not limited to, a filter, a polarizer, etc., and each optical element can be, but not limited to, a single-piece element, a composite component, a thin film, etc. The optical element can be located at the object side or the image side of the imaging system lens assembly or between any two adjacent lens elements so as to allow light in a specific form to pass through, thereby meeting application requirements.

According to the above description of the present disclosure, the following specific embodiments are provided for further explanation.

1st Embodiment

Figure 1:
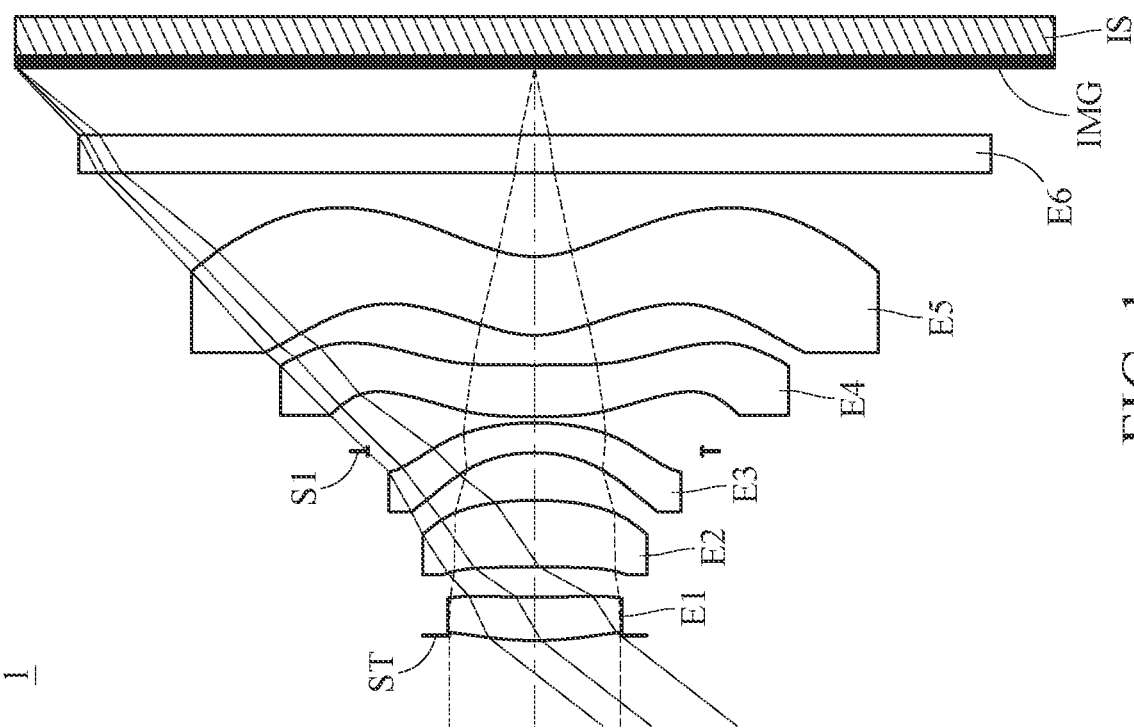
FIG. 1 is a schematic view of an image capturing unit according to the 1st embodiment of the present disclosure.

FIG. 1 is a schematic view of an image capturing unit according to the 1st embodiment of the present disclosure.

Figure 2:
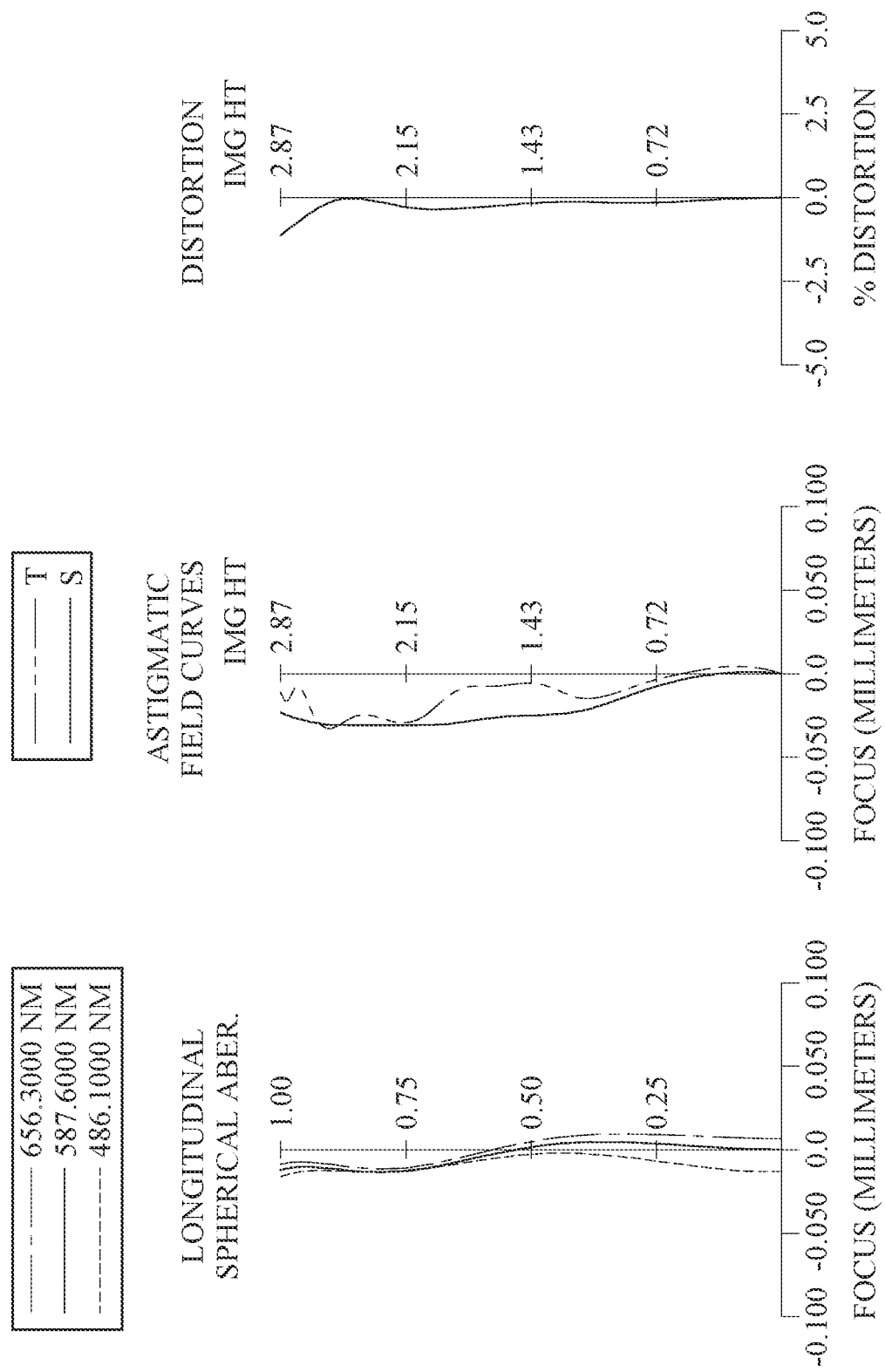
FIG. 2 shows spherical aberration curves, astigmatic field curves and a distortion curve of the image capturing unit according to the 1st embodiment.

FIG. 2 shows, in order from left to right, spherical aberration curves, astigmatic field curves and a distortion curve of the image capturing unit according to the 1st embodiment. In FIG. 1, the image capturing unit 1 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a stop S1, a fourth lens element E4, a fifth lens element E5, a filter E6 and an image surface IMG. The imaging system lens assembly includes five lens elements (E2, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has one inflection point. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, and 28.

In the imaging system lens assembly of the image capturing unit 1 according to the 1st embodiment, when a focal length of the imaging system lens assembly is f, an f-number of the imaging system lens assembly is Fno, and half of a maximum field of view of the imaging system lens assembly is HFOV, these parameters have the following values: f=2.26 millimeters (mm), Fno=2.38, and HFOV=52.2 degrees (deg.).

When the focal length of the imaging system lens assembly is f, and a focal length of the first lens element E1 is f1, the following condition is satisfied: f/f1=0.49.

When the focal length of the imaging system lens assembly is f, and a focal length of the third lens element E3 is f3, the following condition is satisfied: f/f3=−0.44.

When the focal length of the imaging system lens assembly is f, and a focal length of the fourth lens element E4 is f4, the following condition is satisfied: f/f4=−0.26.

When the focal length of the first lens element E1 is f1, and a focal length of the second lens element E2 is f2, the following condition is satisfied: f1/f2=1.25.

When a composite focal length of the first lens element E1, the second lens element E2 and the third lens element E3 is f123, and a composite focal length of the fourth lens element E4 and the fifth lens element E5 is f45, the following condition is satisfied: f123/ f45=0.50.

When the focal length of the first lens element E1 is f1, the focal length of the second lens element E2 is f2, the focal length of the third lens element E3 is f3, the focal length of the fourth lens element E4 is f4, and a focal length of the fifth lens element E5 is f5, the following condition is satisfied: (|f1|+|f2|+|f5|)/(|f3|+|f4|)=0.85.

When the focal length of the imaging system lens assembly is f, the focal length of the third lens element E3 is f3, the focal length of the fourth lens element E4 is f4, and the focal length of the fifth lens element E5 is f5, the following condition is satisfied: f/f3+f/f4+f/f5=−0.06.

When the focal length of the second lens element E2 is f2, and a central thickness of the second lens element E2 is CT2, the following condition is satisfied: f2/ CT2=9.89.

When the focal length of the imaging system lens assembly is f, and a curvature radius of the image-side surface of the third lens element E3 is R6, the following condition is satisfied: f/R6=−1.73.

When the focal length of the imaging system lens assembly is f, and a curvature radius of the image-side surface of the fifth lens element ES is R10, the following condition is satisfied: f/R10=3.63.

When the focal length of the fifth lens element ES is f5, a curvature radius of the object-side surface of the fifth lens element E5 is R9, and the curvature radius of the image-side surface of the fifth lens element E5 is R10, the following condition is satisfied: |f5/ R9|+|f5/ R10|=11.67.

When a curvature radius of the object-side surface of the first lens element E1 is R1, and a curvature radius of the image-side surface of the second lens element E2 is R4, the following condition is satisfied: R4/R1=−1.01.

When a curvature radius of the image-side surface of the first lens element E1 is R2, and a curvature radius of the object-side surface of the second lens element E2 is R3, the following condition is satisfied: (R2+R3)/(R2−R3)=−0.73.

When the curvature radius of the object-side surface of the second lens element E2 is R3, and the curvature radius of the image-side surface of the second lens element E2 is R4, the following condition is satisfied: (R3+R4)/(R3−R4)=1.11.

When a curvature radius of the object-side surface of the fourth lens element E4 is R7, and a curvature radius of the image-side surface of the fourth lens element E4 is R8, the following condition is satisfied: (R7+R8)/(R7−R8)=0.07.

When the curvature radius of the object-side surface of the fifth lens element E5 is R9, and the curvature radius of the image-side surface of the fifth lens element E5 is R10, the following condition is satisfied: (R9-R10)/(R9+R10)=−0.02.

When a maximum image height of the imaging system lens assembly is ImgH, the following condition is satisfied: ImgH=2.87 mm.

When an axial distance between the object-side surface of the first lens element E1 and the image surface IMG is TL, and the maximum image height of the imaging system lens assembly is ImgH, the following condition is satisfied: TL/ImgH=1.11.

When an axial distance between the object-side surface of the first lens element E1 and the image-side surface of the fifth lens element E5 is TD, and an axial distance between the image-side surface of the fifth lens element E5 and the image surface IMG is BL, the following condition is satisfied: TD/BL=2.03.

When a chief ray angle of the maximum field of view on the image surface IMG of the imaging system lens assembly is CRA_D, the following condition is satisfied: CRA_D=46.04 degrees.

When an axial distance between the fourth lens element E4 and the fifth lens element E5 is T45, and a central thickness of the fifth lens element E5 is CT5, the following condition is satisfied: T45/CT5=0.38. In this embodiment, an axial distance between two adjacent lens elements is a distance in a paraxial region between two adjacent lens surfaces of the two adjacent lens elements.

When an axial distance between the third lens element E3 and the fourth lens element E4 is T34, the axial distance between the fourth lens element E4 and the fifth lens element E5 is T45, and a central thickness of the third lens element E3 is CT3, the following condition is satisfied: (T45−T34)/CT3=0.78.

When a central thickness of the first lens element E1 is CT1, the central thickness of the second lens element E2 is CT2, the central thickness of the third lens element E3 is CT3, and a central thickness of the fourth lens element E4 is CT4, the following condition is satisfied:

(CT1+CT3+CT4)/CT2=1.86.

When the central thickness of the first lens element E1 is CT1, the central thickness of the second lens element E2 is CT2, the central thickness of the fourth lens element E4 is CT4, the central thickness of the fifth lens element E5 is CT5, an axial distance between the first lens element E1 and the second lens element E2 is T12, and the axial distance between the fourth lens element E4 and the fifth lens element E5 is T45, the following condition is satisfied:

(CT4+T45+CT5)/(CT1+T12+CT2)=1.14.

When a maximum value among all axial distances between each of all adjacent lens elements of the imaging system lens assembly is ATmax, and the axial distance between the fourth lens element E4 and the fifth lens element E5 is T45, the following condition is satisfied: ATmax/T45=1.60. In this embodiment, among the first lens element E1 to the fifth lens element E5, an axial distance between the second lens element E2 and the third lens element E3 is larger than other axial distances between each of adjacent lens elements of the imaging system lens assembly, and ATmax is equal to the axial distance between the second lens element E2 and the third lens element E3.

When a distance in parallel with the optical axis between a maximum effective radius position of the object-side surface of the fourth lens element E4 and a maximum effective radius position of the image-side surface of the fourth lens element E4 is ET4, and the axial distance between the second lens element E2 and the third lens element E3 is T23, the following condition is satisfied: ET4/T23=1.03.

When a distance in parallel with the optical axis between a maximum effective radius position of the image-side surface of the third lens element E3 and the maximum effective radius position of the object-side surface of the fourth lens element E4 is ET34, and a distance in parallel with the optical axis between the maximum effective radius position of the image-side surface of the fourth lens element E4 and a maximum effective radius position of the object-side surface of the fifth lens element E5 is ET45, the following condition is satisfied: ET34/ET45=4.20.

When a displacement in parallel with the optical axis from an axial vertex of the object-side surface of the third lens element E3 to a maximum effective radius position of the object-side surface of the third lens element E3 is SAG31, and the central thickness of the third lens element E3 is CT3, the following condition is satisfied: SAG31/CT3=−1.97. In this embodiment, the direction of SAG31 faces towards the object side of the imaging system lens assembly, so the value of SAG31 is negative.

When a maximum effective radius of the object-side surface of the first lens element E1 is Y11, and the maximum image height of the imaging system lens assembly is ImgH, the following condition is satisfied: Y11/ImgH=0.17.

When a maximum effective radius of the image-side surface of the third lens element E3 is Y32, and a maximum effective radius of the object-side surface of the fourth lens element E4 is Y41, the following condition is satisfied: Y41/Y32=1.40.

When a vertical distance between a critical point closest to the image surface IMG on the image-side surface of the fifth lens element E5 and the optical axis is Y52cs, and a maximum effective radius of the image-side surface of the fifth lens element E5 is Y52, the following condition is satisfied: Y52cs/Y52=0.57.

When an Abbe number of the second lens element E2 is V2, and an Abbe number of the third lens element E3 is V3, the following condition is satisfied: V2/V3=2.87.

When an Abbe number of the first lens element E1 is V1, an Abbe number of the fourth lens element E4 is V4, and an Abbe number of the fifth lens element E5 is V5, the following condition is satisfied: (V4+V5)/V1=1.25.

When the Abbe number of the third lens element E3 is V3, and a refractive index of the third lens element E3 is N3, the following condition is satisfied: V3/N3=11.68.

When the Abbe number of the first lens element E1 is V1, the Abbe number of the second lens element E2 is V2, the Abbe number of the third lens element E3 is V3, the Abbe number of the fourth lens element E4 is V4, the Abbe number of the fifth lens element E5 is V5, an Abbe number of the i-th lens element is Vi, a refractive index of the first lens element E1 is N1, a refractive index of the second lens element E2 is N2, the refractive index of the third lens element E3 is N3, a refractive index of the fourth lens element E4 is N4, a refractive index of the fifth lens element E5 is N5, a refractive index of the i-th lens element is Ni, and a minimum value of Vi/Ni is min(Vi/Ni), the following condition is satisfied: min(Vi/Ni)=11.68, wherein i=1, 2, 3, 4 or 5. In this embodiment, among the first lens element E1 to the fifth lens element E5, a ratio of Abbe number to refractive index of the third lens element E3 is smaller than those of the other lens elements in the imaging system lens assembly, and min(Vi/Ni) is equal to the ratio of Abbe number to refractive index of the third lens element E3.

In this embodiment, the second lens element E2, the third lens element E3 and the fourth lens element E4 are made of different materials from one another.

The detailed optical data of the 1st embodiment are shown in Table 1A and the aspheric surface data are shown in Table 1B below.

TABLE 1A

1st Embodiment
f = 2.26 mm, Fno = 2.38, HFOV = 52.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.027 | | | | |
| 2 | Lens 1 | 1.8788 | (ASP) | 0.240 | Glass | 1.603 | 65.5 | 4.58 |
| 3 | | 5.5901 | (ASP) | 0.167 | | | | |
| 4 | Lens 2 | −35.9038 | (ASP) | 0.370 | Plastic | 1.544 | 56.0 | 3.66 |
| 5 | | −1.8924 | (ASP) | 0.264 | | | | |
| 6 | Lens 3 | −0.8992 | (ASP) | 0.166 | Plastic | 1.669 | 19.5 | −5.19 |
| 7 | | −1.3028 | (ASP) | −0.158 | | | | |
| 8 | Stop | Plano | | 0.194 | | | | |
| 9 | Lens 4 | −10.4295 | (ASP) | 0.284 | Plastic | 1.562 | 44.6 | −8.60 |
| 10 | | 9.0909 | (ASP) | 0.165 | | | | |
| 11 | Lens 5 | 0.5957 | (ASP) | 0.436 | Plastic | 1.566 | 37.4 | 3.55 |
| 12 | | 0.6225 | (ASP) | 0.466 | | | | |
| 13 | Filter | Plano | | 0.210 | Glass | 1.517 | 64.2 | — |
| 14 | | Plano | | 0.371 | | | | |
| 15 | Image | Plano | | — | | | | |

Note:
Reference wavelength is 587.6 nm (d-line).
An effective radius of the stop S1 (Surface 8) is 0.926 mm.

TABLE 1B

Aspheric Coefficients

| Surface # | 2 | 3 | 4 | 5 |
|---|---|---|---|---|
| k= | 1.42170E+00 | −1.96601E+01 | 9.00000E+01 | 1.84080E+00 |
| A4= | −2.31229984E−01 | −3.18292330E−01 | −2.88528245E−01 | −3.47811328E−01 |
| A6= | −2.19141082E−01 | −6.83444025E−01 | −1.91903609E+00 | −6.07408092E−01 |
| A8= | −9.77535816E−01 | −2.62296509E−02 | 1.17428300E+01 | 1.42313841E+00 |
| A10= | — | — | −7.21244679E+01 | −8.63058687E+00 |
| A12= | — | — | 2.08232502E+02 | 2.49180268E+01 |
| A14= | — | — | −2.42532613E+02 | −2.75383787E+01 |

| Surface # | 6 | 7 | 9 | 10 |
|---|---|---|---|---|
| k= | −8.84939E−01 | −1.95634E+00 | 9.86897E+00 | −9.00000E+01 |
| A4= | −1.49383181E+00 | 7.47490015E−01 | 3.20366288E+00 | −1.21735543E+00 |
| A6= | 8.95590046E+00 | −8.29455876E+00 | −1.77339502E+01 | 1.46785773E+01 |
| A8= | −5.77771496E+01 | 2.07804618E+01 | 6.93509661E+01 | −6.43956492E+01 |
| A10= | 2.47651683E+02 | −1.97746696E+01 | −2.04891752E+02 | 1.64806460E+02 |
| A12= | −5.92391565E+02 | −1.00695912E+02 | 4.41669138E+02 | −2.80016275E+02 |
| A14= | 7.75081442E+02 | 2.48389144E+02 | −6.75681047E+02 | 3.32105738E+02 |
| A16= | −5.02432250E+02 | −3.13732268E+02 | 7.16657473E+02 | −2.80139844E+02 |
| A18= | 1.17490865E+02 | 2.19292808E+02 | −5.10917645E+02 | 1.67775603E+02 |
| A20= | — | −6.64163597E+01 | 2.31722519E+02 | −6.98072177E+01 |
| A22= | — | — | −5.98465920E+01 | 1.91919919E+01 |
| A24= | — | — | 6.62360318E+00 | −3.13394971E+00 |
| A26= | — | — | — | 2.29995300E−01 |

| Surface # | 11 | 12 | — | — |
|---|---|---|---|---|
| k= | −4.22621E+00 | −2.38580E+00 | — | — |
| A4= | −6.71774372E−01 | −7.72130515E−01 | — | — |
| A6= | 1.81691260E+00 | 1.61165773E+00 | — | — |
| A8= | −5.33503400E+00 | −2.72963777E+00 | — | — |

TABLE 1B-continued

| Aspheric Coefficients | | | | |
|---|---|---|---|---|
| A10= | 1.29910755E+01 | 3.49328606E+00 | — | — |
| A12= | −2.46431548E+01 | −3.38150221E+00 | — | — |
| A14= | 3.39280683E+01 | 2.47270029E+00 | — | — |
| A16= | −3.26765095E+01 | −1.35526161E+00 | — | — |
| A18= | 2.16233026E+01 | 5.49678374E−01 | — | — |
| A20= | −9.60702571E+00 | −1.61909982E−01 | — | — |
| A22= | 2.73412980E+00 | 3.36177896E−02 | — | — |
| A24= | −4.49894263E−01 | −4.66748766E−03 | — | — |
| A26= | 3.25204611E−02 | 3.89632467E−04 | — | — |
| A28= | — | −1.48188350E−05 | — | — |

In Table 1A, the curvature radius, the thickness and the focal length are shown in millimeters (mm). Surface numbers 0-15 represent the surfaces sequentially arranged from the object side to the image side along the optical axis. In Table 1B, k represents the conic coefficient of the equation of the aspheric surface profiles. A4-A28 represent the aspheric coefficients ranging from the 4th order to the 28th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
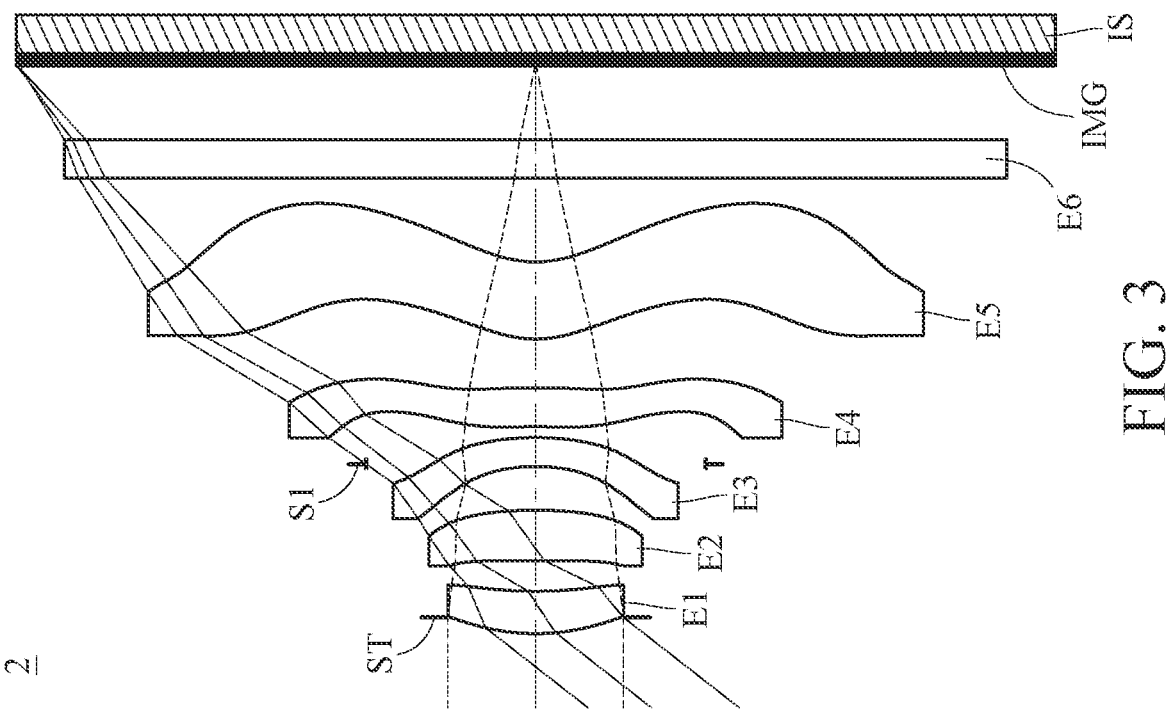
FIG. 3 is a schematic view of an image capturing unit according to the 2nd embodiment of the present disclosure.
Figure 4:
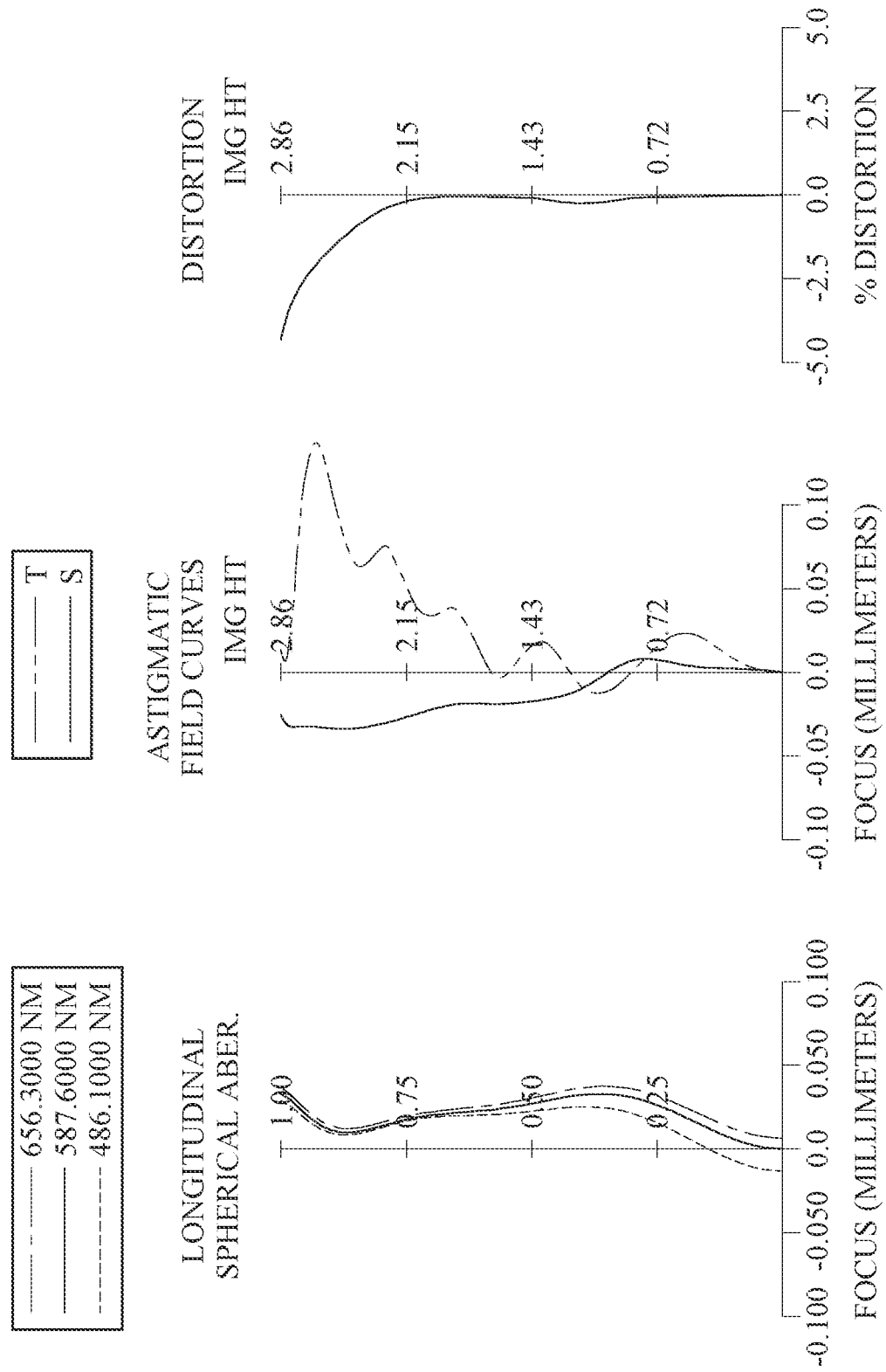
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a stop S1, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has three inflection points. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 2nd embodiment are shown in Table 2A and the aspheric surface data are shown in Table 2B below.

TABLE 2A

2nd Embodiment
f = 2.33 mm, Fno = 2.40, HFOV = 52.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.090 | | | | |
| 2 | Lens 1 | 1.1990 | (ASP) | 0.234 | Plastic | 1.545 | 56.1 | 4.29 |
| 3 | | 2.2907 | (ASP) | 0.169 | | | | |
| 4 | Lens 2 | −144.1372 | (ASP) | 0.279 | Plastic | 1.534 | 56.0 | 4.57 |
| 5 | | −2.4022 | (ASP) | 0.242 | | | | |
| 6 | Lens 3 | −0.9938 | (ASP) | 0.160 | Plastic | 1.686 | 18.4 | −7.43 |
| 7 | | −1.3152 | (ASP) | −0.146 | | | | |

TABLE 2A-continued

2nd Embodiment
f = 2.33 mm, Fno = 2.40, HFOV = 52.0 deg.

| Surface # | | Curvature Radius | | Thickness | Material | Index | Abbe # | Focal Length |
|---|---|---|---|---|---|---|---|---|
| 8 | Stop | Plano | | 0.206 | | | | |
| 9 | Lens 4 | −4.0390 | (ASP) | 0.214 | Plastic | 1.562 | 44.6 | −10.47 |
| 10 | | −13.1295 | (ASP) | 0.270 | | | | |
| 11 | Lens 5 | 0.5973 | (ASP) | 0.426 | Plastic | 1.544 | 56.0 | 4.42 |
| 12 | | 0.5952 | (ASP) | 0.466 | | | | |
| 13 | Filter | Plano | | 0.210 | Glass | 1.517 | 64.2 | — |
| 14 | | Plano | | 0.408 | | | | |
| 15 | Image | Plano | | — | | | | |

Note:
Reference wavelength is 587.6 nm (d-line).
An effective radius of the stop S1 (Surface 8) is 0.938 mm.

TABLE 2B

Aspheric Coefficients

| Surface # | 2 | 3 | 4 | 5 |
|---|---|---|---|---|
| k= | 2.25661E+00 | 9.02870E+00 | −9.00000E+01 | 1.56986E+00 |
| A4= | −3.87478815E−01 | −1.62758165E−01 | −1.42956339E−01 | −2.22874175E−01 |
| A6= | 3.50572899E+00 | −1.10988613E+00 | −2.24643308E+00 | −1.89844357E+00 |
| A8= | −4.37837750E+01 | 4.05294700E+00 | 9.14396111E+00 | 9.04332515E+00 |
| A10= | 2.42318659E+02 | −3.86560513E+01 | −3.96696557E+01 | −3.84783845E+01 |
| A12= | −6.76257857E+02 | 1.35789282E+02 | 4.76453205E+01 | 7.50699177E+01 |
| A14= | 7.02757503E+02 | −2.13769135E+02 | 4.66931064E+00 | −4.86719489E+01 |

| Surface # | 6 | 7 | 9 | 10 |
|---|---|---|---|---|
| k= | −6.38329E−01 | −2.47223E+00 | −7.61662E+00 | 7.11681E+01 |
| A4= | −7.46122287E−01 | 1.05385425E+00 | 2.29313599E+00 | −1.29604146E+00 |
| A6= | −1.34956478E−01 | −1.20285100E+01 | −8.49099693E+00 | 1.34171697E+01 |
| A8= | −6.33982431E+00 | 4.83399090E+01 | 2.54552356E+01 | −4.47718226E+01 |
| A10= | 5.51599697E+01 | −1.43634917E+02 | −7.63066375E+01 | 6.38821059E+01 |
| A12= | −9.56197897E+01 | 3.62355981E+02 | 1.84428956E+02 | 9.38468620E+00 |
| A14= | −1.02256722E+01 | −6.23150217E+02 | −3.12991915E+02 | −2.03069396E+02 |
| A16= | 1.29227448E+02 | 6.08125799E+02 | 3.57410912E+02 | 3.96932690E+02 |
| A18= | −7.08574648E+01 | −2.81652080E+02 | −2.67518561E+02 | −4.31728168E+02 |
| A20= | — | 3.98005048E+01 | 1.25167026E+02 | 3.01911628E+02 |
| A22= | — | — | −3.30140903E+01 | −1.39028036E+02 |
| A24= | — | — | 3.72467356E+00 | 4.09166790E+01 |
| A26= | — | — | — | −6.99508070E+00 |
| A28= | — | — | — | 5.29369079E−01 |

| Surface # | 11 | 12 | — | — |
|---|---|---|---|---|
| k= | −3.49286E+00 | −2.15445E+00 | — | — |
| A4= | −5.99225089E−01 | −7.66109186E−01 | — | — |
| A6= | 9.75249239E−01 | 1.38264149E+00 | — | — |
| A8= | −1.13611578E+00 | −1.84188267E+00 | — | — |
| A10= | 8.54240101E−01 | 1.80428569E+00 | — | — |
| A12= | −4.41417772E−01 | −1.33140044E+00 | — | — |
| A14= | 1.65072520E−01 | 7.50368864E−01 | — | — |
| A16= | −4.33991878E−02 | −3.24705340E−01 | — | — |
| A18= | 6.89042032E−03 | 1.07189452E−01 | — | — |
| A20= | −2.96005519E−04 | −2.64200718E−02 | — | — |
| A22= | −1.04958576E−04 | 4.67285796E−03 | — | — |
| A24= | 1.93605488E−05 | −5.55303049E−04 | — | — |
| A26= | −1.05099009E−06 | 3.93798964E−05 | — | — |
| A28= | — | −1.25109714E−06 | — | — |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Values of Conditional Expressions

| | | | |
|---|---|---|---|
| f [mm] | 2.33 | ImgH [mm] | 2.86 |
| Fno | 2.40 | TL/ImgH | 1.10 |
| HFOV [deg.] | 52.0 | TD/BL | 1.89 |
| f/f1 | 0.54 | CRA_D [deg.] | 36.90 |
| f/f3 | −0.31 | T45/CT5 | 0.63 |
| f/f4 | −0.22 | (T45 − T34)/CT3 | 1.31 |
| f1/f2 | 0.94 | (CT1 + CT3 + CT4)/CT2 | 2.18 |
| f123/f45 | 0.39 | (CT4 + T45 + CT5)/(CT1 + T12 + CT2) | 1.33 |
| (|f1| + |f2| + |f5|)/(|f3| + |f4|) | 0.74 | ATmax/T45 | 1.00 |
| f/f3 + f/f4 + f/f5 | −0.01 | ET4/T23 | 0.81 |
| f2/CT2 | 16.38 | ET34/ET45 | 0.67 |
| f/R6 | −1.77 | SAG31/CT3 | −1.81 |
| f/R10 | 3.91 | Y11/ImgH | 0.17 |
| |f5/R9| + |f5/R10| | 14.81 | Y41/Y32 | 1.45 |
| R4/R1 | −2.00 | Y52cs/Y52 | 0.56 |
| (R2 + R3)/(R2 − R3) | −0.97 | V2/V3 | 3.04 |
| (R3 + R4)/(R3 − R4) | 1.03 | (V4 + V5)/V1 | 1.79 |
| (R7 + R8)/(R7 − R8) | −1.89 | V3/N3 | 10.91 |
| (R9 − R10)/(R9 + R10) | 0.0018 | min(Vi/Ni) | 10.91 |

3rd Embodiment

Figure 5:
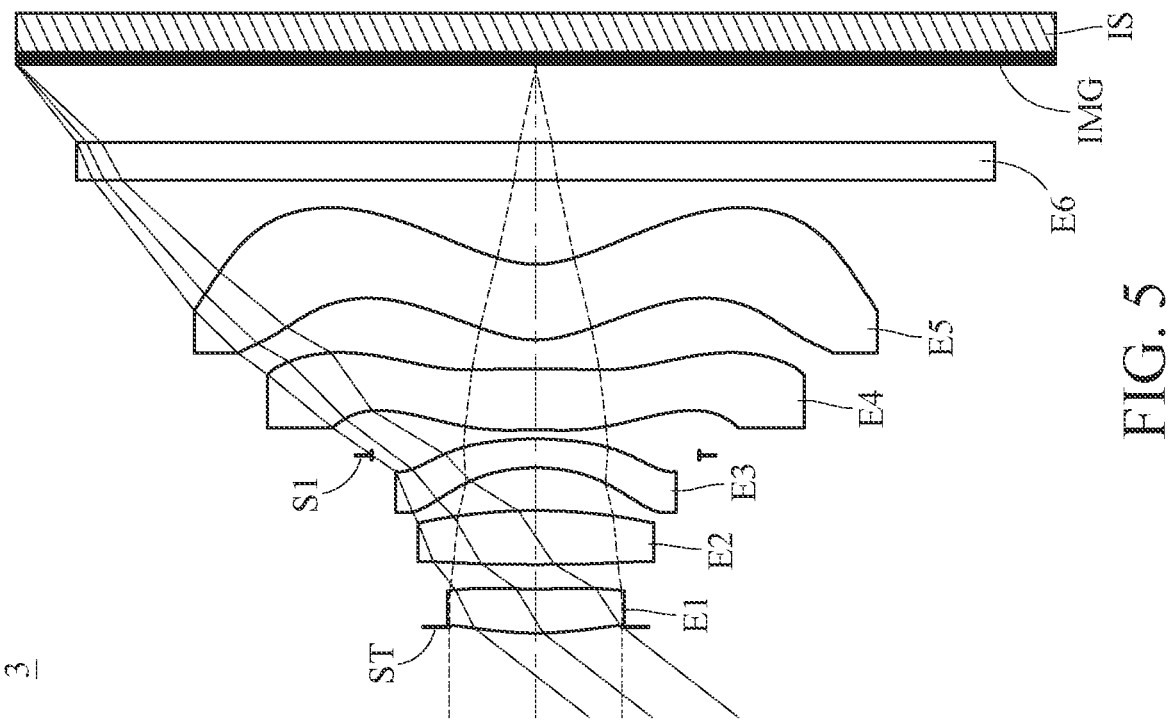
FIG. 5 is a schematic view of an image capturing unit according to the 3rd embodiment of the present disclosure.
Figure 6:
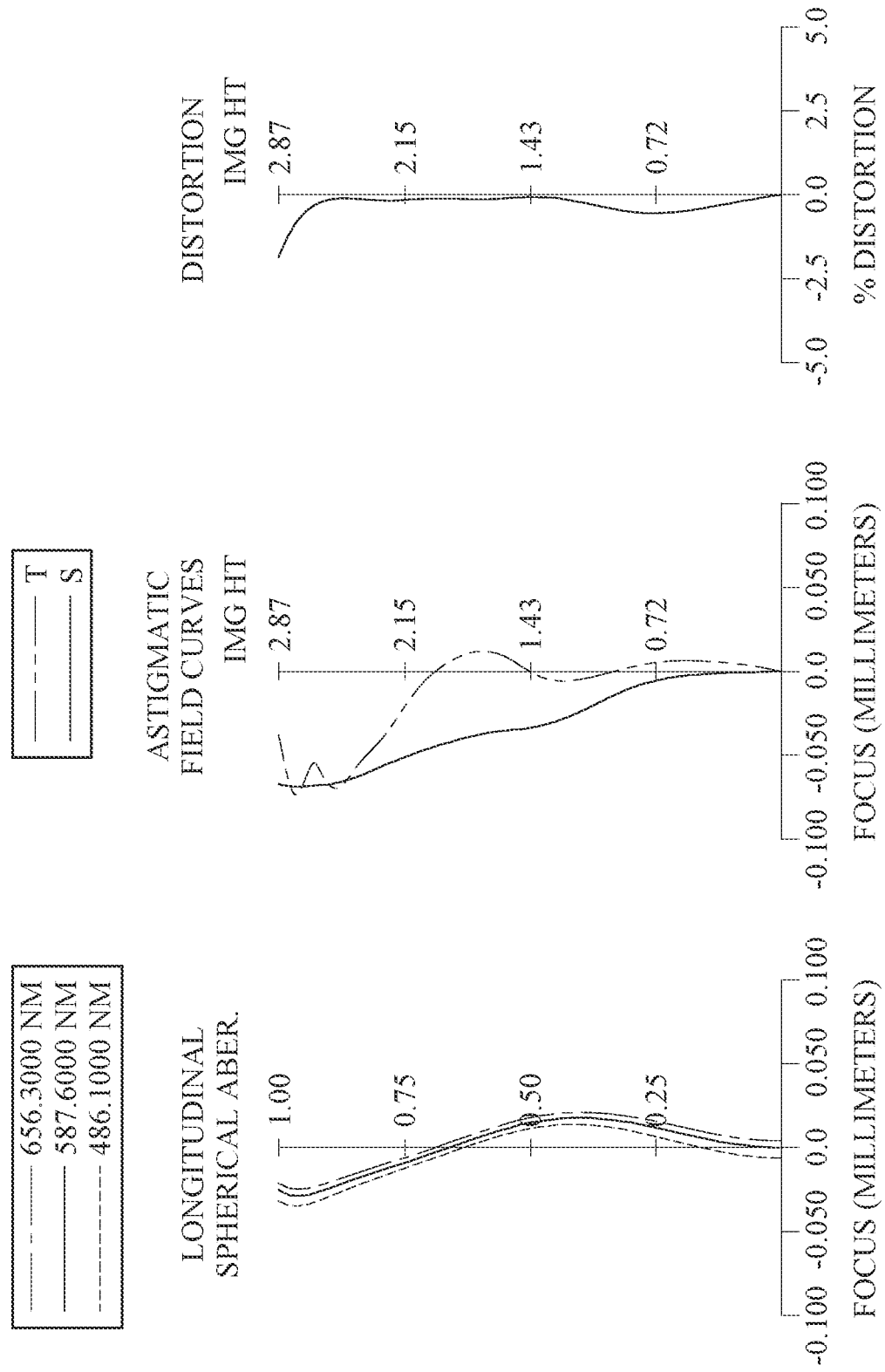
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a stop S1, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of glass material and has the object-side surface and the image-side surface being both spherical.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has three inflection points. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 3rd embodiment are shown in Table 3A and the aspheric surface data are shown in Table 3B below.

TABLE 3A

3rd Embodiment
f = 2.27 mm, Fno = 2.37, HFOV = 52.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.033 | | | | |
| 2 | Lens 1 | 1.8834 | (ASP) | 0.245 | Plastic | 1.545 | 56.1 | 4.31 |
| 3 | | 9.0909 | (ASP) | 0.135 | | | | |
| 4 | Lens 2 | 10.5076 | (SPH) | 0.300 | Glass | 1.569 | 71.3 | 4.29 |
| 5 | | −3.1457 | (SPH) | 0.237 | | | | |
| 6 | Lens 3 | −1.0666 | (ASP) | 0.160 | Plastic | 1.669 | 19.5 | −4.88 |
| 7 | | −1.6794 | (ASP) | −0.090 | | | | |
| 8 | Stop | Plano | | 0.140 | | | | |
| 9 | Lens 4 | −4.3306 | (ASP) | 0.339 | Plastic | 1.587 | 28.3 | −9.51 |
| 10 | | −19.8509 | (ASP) | 0.160 | | | | |
| 11 | Lens 5 | 0.5703 | (ASP) | 0.420 | Plastic | 1.562 | 44.6 | 3.30 |

TABLE 3A-continued

3rd Embodiment
f = 2.27 mm, Fno = 2.37, HFOV = 52.2 deg.

| Surface # | | Curvature Radius | | Thickness | Material | Index | Abbe # | Focal Length |
|---|---|---|---|---|---|---|---|---|
| 12 | | 0.6052 | (ASP) | 0.466 | | | | |
| 13 | Filter | Plano | | 0.210 | Glass | 1.517 | 64.2 | — |
| 14 | | Plano | | 0.432 | | | | |
| 15 | Image | Plano | | — | | | | |

Note:
Reference wavelength is 587.6 nm (d-line).
An effective radius of the stop S1 (Surface 8) is 0.907 mm.

TABLE 3B

| Aspheric Coefficients | | | | |
|---|---|---|---|---|
| Surface # | 2 | 3 | 6 | 7 |
| k= | 1.53131E+00 | 1.22394E+01 | −1.71589E+00 | −5.46509E+00 |
| A4= | −2.74400576E−01 | −3.24529019E−01 | −1.41928192E+00 | 6.19975498E−01 |
| A6= | −2.54702452E−01 | −1.31709628E−01 | 9.38010679E+00 | −5.80236834E+00 |
| A8= | −5.05009526E−01 | −5.81241037E+00 | −6.71068489E+01 | 3.31046224E+00 |
| A10= | −1.16357252E+01 | 3.51994829E+01 | 3.38329340E+02 | 7.62844414E+01 |
| A12= | 6.59651292E+01 | −1.02941234E+02 | −1.05368620E+03 | −3.39468087E+02 |
| A14= | −1.14743864E+02 | 1.21453368E+02 | 2.00574513E+03 | 7.42378210E+02 |
| A16= | — | — | −2.11833190E+03 | −9.29079507E+02 |
| A18= | — | — | 9.41138642E+02 | 6.40420685E+02 |
| A20= | — | — | — | −1.91118335E+02 |

| Surface # | 9 | 10 | 11 | 12 |
|---|---|---|---|---|
| k= | −3.02125E+01 | −1.03575E+01 | −3.42675E+00 | −2.17427E+00 |
| A4= | 3.03967522E+00 | −1.04010052E+00 | −8.10694273E−01 | −8.76698008E−01 |
| A6= | −1.60670735E+01 | 1.07976317E+01 | 2.85212490E+00 | 2.26514531E+00 |
| A8= | 5.87780726E+01 | −4.06795689E+01 | −7.97080603E+00 | −4.60811829E+00 |
| A10= | −1.57790959E+02 | 9.03972705E+01 | 1.56711567E+01 | 6.90343830E+00 |
| A12= | 2.99754118E+02 | −1.34182363E+02 | −2.20063343E+01 | −7.62713554E+00 |
| A14= | −3.83223632E+02 | 1.39226783E+02 | 2.20011329E+01 | 6.21742139E+00 |
| A16= | 2.94618960E+02 | −1.02536356E+02 | −1.55060303E+01 | −3.73161691E+00 |
| A18= | −7.89457661E+01 | 5.34037376E+01 | 7.58815502E+00 | 1.63789744E+00 |
| A20= | −7.91280177E+01 | −1.92318746E+01 | −2.51117280E+00 | −5.18029275E−01 |
| A22= | 9.09519472E+01 | 4.55480001E+00 | 5.34531790E−01 | 1.14749687E−01 |
| A24= | −3.78078002E+01 | −6.38089196E−01 | −6.59454850E−02 | −1.68793399E−02 |
| A26= | 5.99743244E+00 | 4.00473660E−02 | 3.58019262E−03 | 1.48074129E−03 |
| A28= | — | — | — | −5.86456798E−05 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | | | |
|---|---|---|---|
| f [mm] | 2.27 | ImgH [mm] | 2.87 |
| Fno | 2.37 | TL/ImgH | 1.10 |
| HFOV [deg.] | 52.2 | TD/BL | 1.85 |
| f/f1 | 0.53 | CRA_D [deg.] | 41.30 |
| f/f3 | −0.47 | T45/CT5 | 0.38 |
| f/f4 | −0.24 | (T45 − T34)/CT3 | 0.69 |
| f1/f2 | 1.00 | (CT1 + CT3 + CT4)/CT2 | 2.48 |
| f123/f45 | 0.70 | (CT4 + T45 + CT5)/(CT1 + T12 + CT2) | 1.35 |
| (\|f1\| + \|f2\| + \|f5\|)/(\|f3\| + \|f4\|) | 0.83 | ATmax/T45 | 1.48 |
| f/f3 + f/f4 + f/f5 | −0.02 | ET4/T23 | 1.25 |
| f2/CT2 | 14.29 | ET34/ET45 | 2.03 |
| f/R6 | −1.35 | SAG31/CT3 | −1.55 |
| f/R10 | 3.76 | Y11/ImgH | 0.17 |
| \|f5/R9\| + \|f5/R10\| | 11.25 | Y41/Y32 | 1.45 |
| R4/R1 | −1.67 | Y52cs/Y52 | 0.60 |
| (R2 + R3)/(R2 − R3) | −13.83 | V2/V3 | 3.66 |
| (R3 + R4)/(R3 − R4) | 0.54 | (V4 + V5)/V1 | 1.30 |
| (R7 + R8)/(R7 − R8) | −1.56 | V3/N3 | 11.68 |
| (R9 − R10)/(R9 + R10) | −0.03 | min(Vi/Ni) | 11.68 |

4th Embodiment

Figure 7:
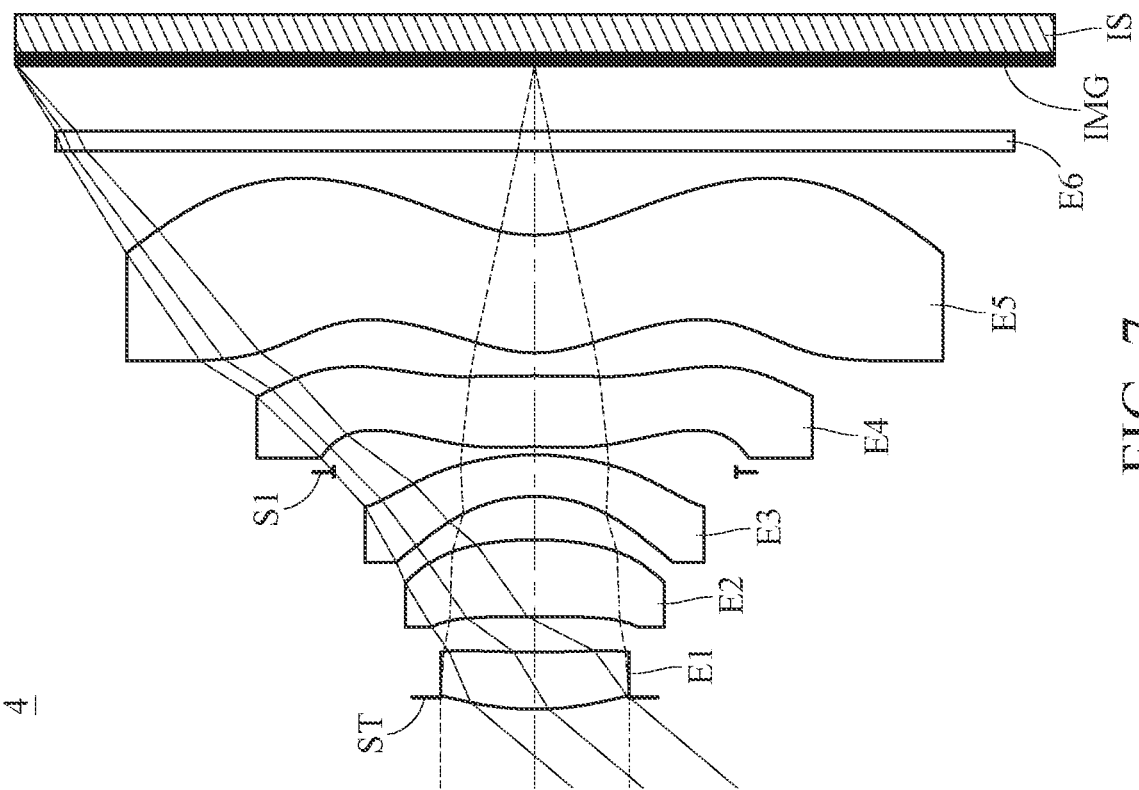
FIG. 7 is a schematic view of an image capturing unit according to the 4th embodiment of the present disclosure.
Figure 8:
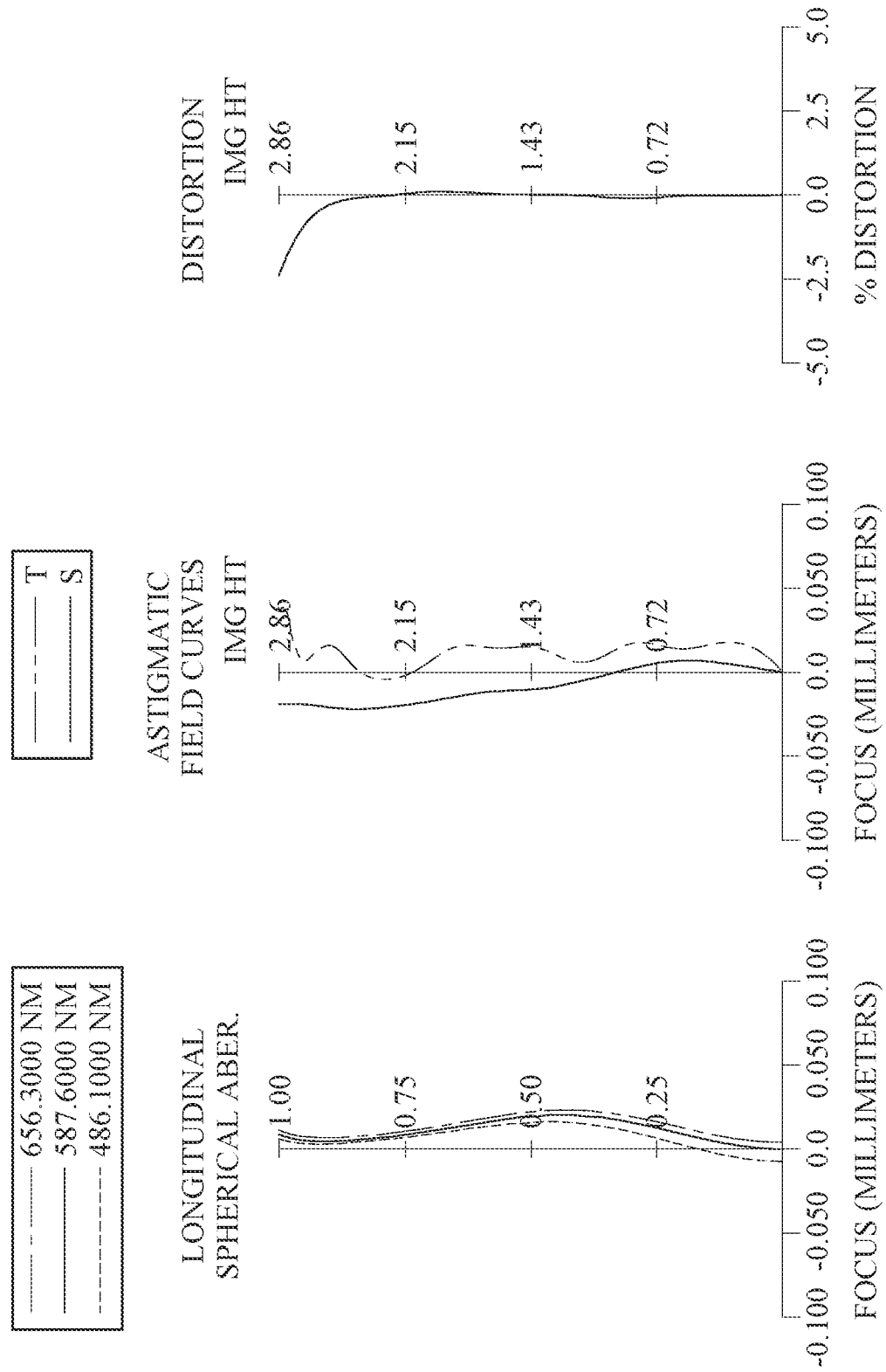
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a stop S1, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has one inflection point. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 4th embodiment are shown in Table 4A and the aspheric surface data are shown in Table 4B below.

TABLE 4A

4th Embodiment
f = 2.45 mm, Fno = 2.35, HFOV = 50.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.065 | | | | |
| 2 | Lens 1 | 1.6184 | (ASP) | 0.315 | Plastic | 1.545 | 56.1 | 4.05 |
| 3 | | 5.6481 | (ASP) | 0.196 | | | | |
| 4 | Lens 2 | −23.9647 | (ASP) | 0.424 | Plastic | 1.545 | 56.1 | 4.07 |
| 5 | | −2.0424 | (ASP) | 0.239 | | | | |
| 6 | Lens 3 | −0.9689 | (ASP) | 0.230 | Plastic | 1.669 | 19.5 | −5.69 |
| 7 | | −1.4232 | (ASP) | −0.094 | | | | |
| 8 | Stop | Plano | | 0.138 | | | | |
| 9 | Lens 4 | −3.3364 | (ASP) | 0.392 | Plastic | 1.588 | 32.3 | −7.35 |
| 10 | | −15.2907 | (ASP) | 0.127 | | | | |
| 11 | Lens 5 | 0.7394 | (ASP) | 0.649 | Plastic | 1.544 | 56.0 | 4.03 |
| 12 | | 0.7702 | (ASP) | 0.466 | | | | |
| 13 | Filter | Plano | | 0.110 | Glass | 1.517 | 64.2 | — |
| 14 | | Plano | | 0.360 | | | | |
| 15 | Image | Plano | | — | | | | |

Note:
Reference wavelength is 587.6 nm (d-line).
An effective radius of the stop S1 (Surface 8) is 1.110 mm.

TABLE 4B

Aspheric Coefficients

| Surface # | 2 | 3 | 4 | 5 |
|---|---|---|---|---|
| k= | 1.44339E+00 | 2.44020E+01 | 4.94893E+01 | −9.16481E+00 |
| A4= | −1.40001323E−01 | −1.86033752E−01 | −2.59059953E−01 | −4.96720866E−01 |
| A6= | 1.64358581E−01 | −6.10246732E−01 | −4.97420171E−01 | 5.71533564E−01 |
| A8= | −2.67030493E+00 | 8.38640023E−01 | 1.69841558E−01 | −3.27944191E+00 |
| A10= | 8.00217185E+00 | −3.48569907E+00 | −4.86654253E+00 | 6.30904421E+00 |
| A12= | −1.17867891E+01 | 2.83440793E+00 | 7.82008881E+00 | −5.01265022E+00 |
| A14= | — | — | — | 1.42105500E+00 |

TABLE 4B-continued

Aspheric Coefficients

| Surface # | 6 | 7 | 9 | 10 |
|---|---|---|---|---|
| k= | −1.32782E+00 | −4.78396E+00 | −4.32491E+00 | 2.95016E+01 |
| A4= | −1.37961837E+00 | 3.00454203E−01 | 2.54357434E+00 | −2.68536154E−01 |
| A6= | 7.84401280E+00 | −2.45024182E+00 | −1.16928598E+01 | 2.99552042E+00 |
| A8= | −3.21049284E+01 | 4.69890173E+00 | 3.86599520E+01 | −7.50449029E+00 |
| A10= | 8.25885638E+01 | −3.16071848E+00 | −9.51686376E+01 | 7.30764566E+00 |
| A12= | −1.21227862E+02 | −1.11787167E−01 | 1.68535366E+02 | 2.66702656E+00 |
| A14= | 9.29381497E+01 | 6.46153347E−01 | −2.10801850E+02 | −1.64978673E+01 |
| A16= | −2.86212642E+01 | 6.46920563E−02 | 1.82880933E+02 | 2.25386035E+01 |
| A18= | — | — | −1.06820826E+02 | −1.77232057E+01 |
| A20= | — | — | 3.97476608E+01 | 9.02639626E+00 |
| A22= | — | — | −8.43528649E+00 | −3.02878241E+00 |
| A24= | — | — | 7.70105251E−01 | 6.48004163E−01 |
| A26= | — | — | — | −8.02290856E−02 |
| A28= | — | — | — | 4.37701649E−03 |

| Surface # | 11 | 12 | — | — |
|---|---|---|---|---|
| k= | −4.25270E+00 | −1.26064E+00 | — | — |
| A4= | −5.29780566E−01 | −7.86960971E−01 | — | — |
| A6= | 1.15769582E+00 | 1.15418916E+00 | — | — |
| A8= | −2.09094340E+00 | −1.37924700E+00 | — | — |
| A10= | 2.56974686E+00 | 1.21864584E+00 | — | — |
| A12= | −2.22685526E+00 | −7.72234870E−01 | — | — |
| A14= | 1.37578210E+00 | 3.42844835E−01 | — | — |
| A16= | −5.99582488E−01 | −1.01832685E−01 | — | — |
| A18= | 1.81320214E−01 | 1.75897887E−02 | — | — |
| A20= | −3.70782424E−02 | −5.43661245E−04 | — | — |
| A22= | 4.88192972E−03 | −5.33205387E−04 | — | — |
| A24= | −3.73194872E−04 | 1.40353013E−04 | — | — |
| A26= | 1.25786513E−05 | −1.73897387E−05 | — | — |
| A28= | — | 1.12589746E−06 | — | — |
| A30= | — | −3.06048943E−08 | — | — |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Values of Conditional Expressions

| f [mm] | 2.45 | ImgH [mm] | 2.86 |
|---|---|---|---|
| Fno | 2.35 | TL/ImgH | 1.24 |
| HFOV [deg.] | 50.1 | TD/BL | 2.79 |
| f/f1 | 0.60 | CRA_D [deg.] | 36.00 |
| f/f3 | −0.43 | T45/CT5 | 0.20 |
| f/f4 | −0.33 | (T45 − T34)/CT3 | 0.36 |
| f1/f2 | 1.00 | (CT1 + CT3 + CT4)/CT2 | 2.21 |
| f123/f45 | 0.30 | (CT4 + T45 + CT5)/(CT1 + T12 + CT2) | 1.25 |
| (\|f1\| + \|f2\| + \|f5\|)/(\|f3\| + \|f4\|) | 0.93 | ATmax/T45 | 1.88 |
| f/f3 + f/f4 + f/f5 | −0.16 | ET4/T23 | 1.41 |
| f2/CT2 | 9.60 | ET34/ET45 | 1.36 |
| f/R6 | −1.72 | SAG31/CT3 | −1.58 |
| f/R10 | 3.18 | Y11/ImgH | 0.18 |
| \|f5/R9\| + \|f5/R10\| | 10.69 | Y41/Y32 | 1.26 |
| R4/R1 | −1.26 | Y52cs/Y52 | 0.57 |
| (R2 + R3)/(R2 − R3) | −0.62 | V2/V3 | 2.88 |
| (R3 + R4)/(R3 − R4) | 1.19 | (V4 + V5)/V1 | 1.57 |
| (R7 + R8)/(R7 − R8) | −1.56 | V3/N3 | 11.68 |
| (R9 − R10)/(R9 + R10) | −0.02 | min(Vi/Ni) | 11.68 |

5th Embodiment

Figure 9:
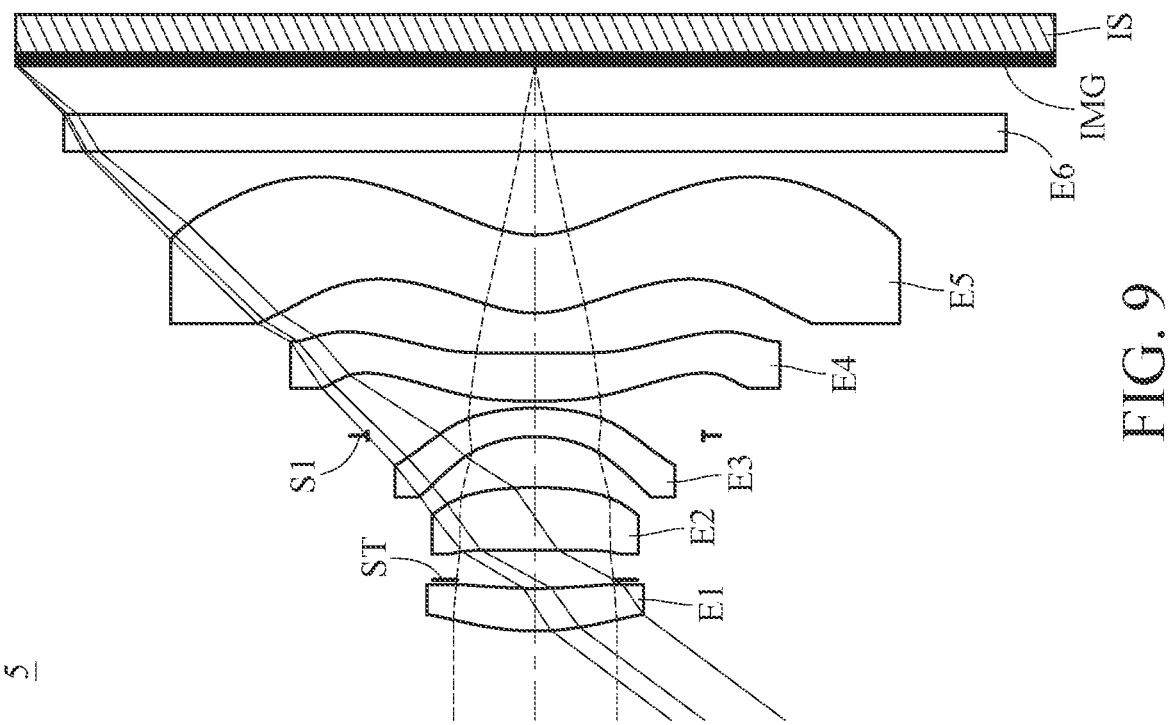
FIG. 9 is a schematic view of an image capturing unit according to the 5th embodiment of the present disclosure.
Figure 10:
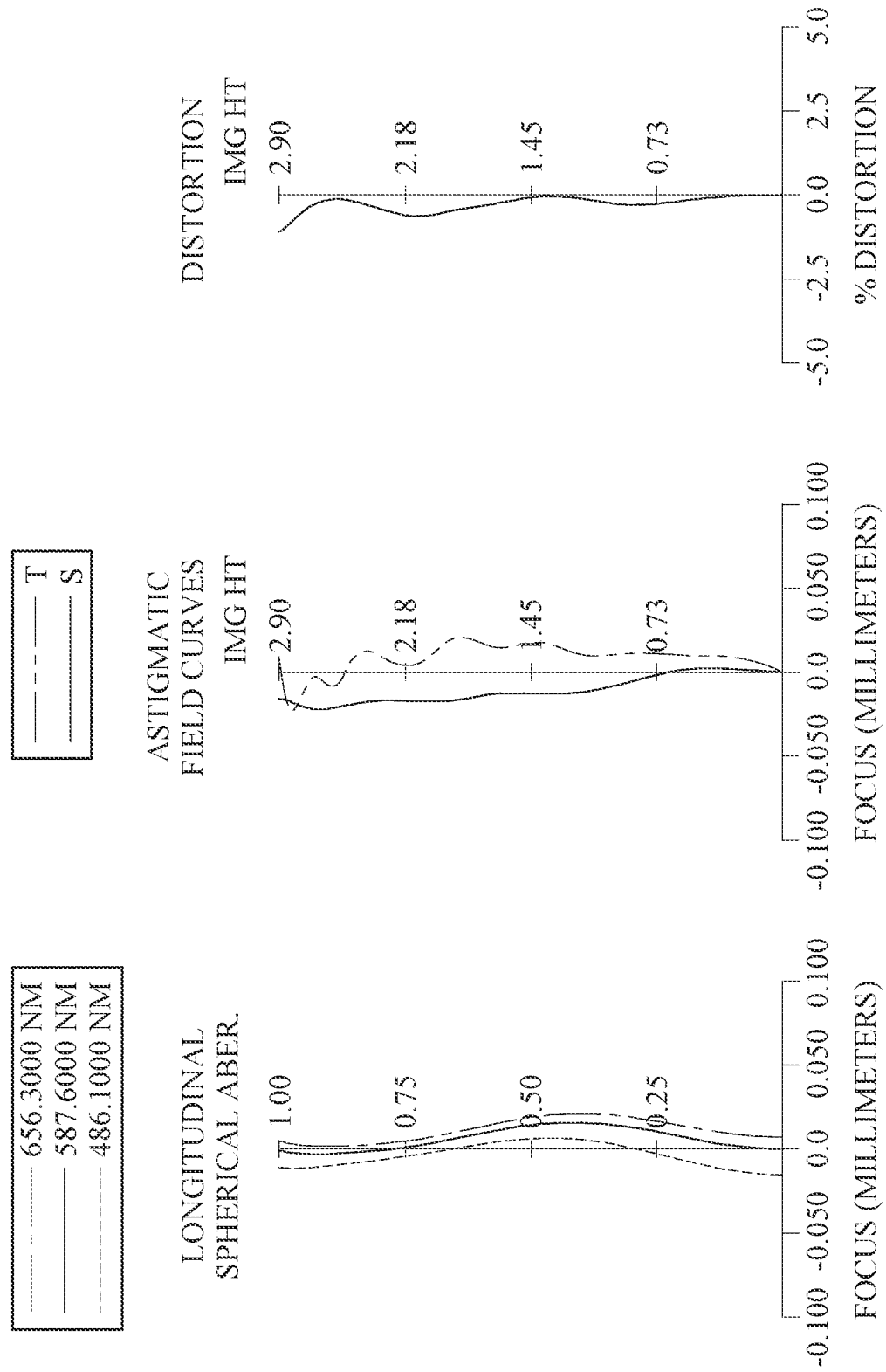
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the imaging system lens assembly (its reference numeral is omitted) of the present disclosure and an image sensor IS. The imaging system lens assembly includes, in order from an object side to an image side along an optical axis, a first lens element E1, an aperture stop ST, a second lens element E2, a third lens element E3, a stop S1, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has one inflection point. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 5th embodiment are shown in Table 5A and the aspheric surface data are shown in Table 5B below.

TABLE 5A

5th Embodiment
f = 2.18 mm, Fno = 2.39, HFOV = 53.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.5279 | (ASP) | 0.238 | Plastic | 1.545 | 56.1 | 5.41 |
| 2 | | 2.9982 | (ASP) | 0.050 | | | | |
| 3 | Ape. Stop | Plano | | 0.165 | | | | |
| 4 | Lens 2 | 21.3651 | (ASP) | 0.350 | Plastic | 1.544 | 56.0 | 3.48 |
| 5 | | −2.0662 | (ASP) | 0.284 | | | | |
| 6 | Lens 3 | −0.8458 | (ASP) | 0.160 | Plastic | 1.669 | 19.5 | −5.43 |
| 7 | | −1.1864 | (ASP) | −0.156 | | | | |
| 8 | Stop | Plano | | 0.196 | | | | |
| 9 | Lens 4 | 83.3333 | (ASP) | 0.269 | Plastic | 1.562 | 44.6 | −37.24 |
| 10 | | 16.7023 | (ASP) | 0.222 | | | | |
| 11 | Lens 5 | 0.6214 | (ASP) | 0.437 | Plastic | 1.566 | 37.4 | 4.73 |
| 12 | | 0.6036 | (ASP) | 0.466 | | | | |
| 13 | Filter | Plano | | 0.210 | Glass | 1.517 | 64.2 | — |
| 14 | | Plano | | 0.273 | | | | |
| 15 | Image | Plano | | — | | | | |

Note:
Reference wavelength is 587.6 nm (d-line).
An effective radius of the stop S1 (Surface 8) is 0.939 mm.

TABLE 5B

Aspheric Coefficients

| Surface # | 1 | 2 | 4 | 5 |
|---|---|---|---|---|
| k= | 2.84489E+00 | 1.55533E+01 | −8.28988E+01 | 6.22154E+00 |
| A4= | −2.61902683E−01 | −2.42244025E−01 | −3.06425334E−01 | −3.38221644E−01 |
| A6= | 4.40215305E−01 | −5.67079746E−01 | −4.67440880E−01 | −6.58873402E−01 |
| A8= | −5.88041205E+00 | −1.90102514E+00 | −4.49181279E+00 | 1.14240923E+00 |
| A10= | 2.08183168E+01 | 1.69662455E+01 | 2.01808951E+01 | −1.07052633E+01 |
| A12= | −4.43437956E+01 | −8.36286098E+01 | −8.03089772E+01 | 3.07025977E+01 |
| A14= | 3.63170399E+01 | 1.47176873E+02 | 9.44324706E+01 | −3.09892740E+01 |

| Surface # | 6 | 7 | 9 | 10 |
|---|---|---|---|---|
| k= | −5.99068E−01 | −1.03861E+00 | 9.00000E+01 | 4.28960E+01 |
| A4= | −7.47623256E−01 | 1.41466246E+00 | 2.59078851E+00 | −1.45754637E+00 |
| A6= | −2.27370816E+00 | −1.86849562E+01 | −1.41929242E+01 | 1.73090876E+01 |
| A8= | 1.87548262E+01 | 9.18152839E+01 | 5.37293072E+01 | −8.12513833E+01 |
| A10= | −1.07847838E+02 | −3.03275555E+02 | −1.51498439E+02 | 2.32666019E+02 |
| A12= | 5.08814576E+02 | 7.38416893E+02 | 3.11183880E+02 | −4.59844750E+02 |
| A14= | −1.27995997E+03 | −1.22903418E+03 | −4.55296796E+02 | 6.59243469E+02 |
| A16= | 1.55721653E+03 | 1.27656999E+03 | 4.64611062E+02 | −6.98933906E+02 |
| A18= | −7.35391592E+02 | −7.38761031E+02 | −3.21217737E+02 | 5.48568113E+02 |
| A20= | — | 1.82237077E+02 | 1.42811281E+02 | −3.14385057E+02 |
| A22= | — | — | −3.67086102E+01 | 1.27626490E+02 |
| A24= | — | — | 4.13389591E+00 | −3.46904957E+01 |

TABLE 5B-continued

| Aspheric Coefficients | | | | |
|---|---|---|---|---|
| A26= | — | — | — | 5.65119670E+00 |
| A28= | — | — | — | −4.16377164E−01 |

| Surface # | 11 | 12 | — | — |
|---|---|---|---|---|
| k= | −4.11639E+00 | −2.38021E+00 | — | — |
| A4= | −6.38484973E−01 | −7.54578198E−01 | — | — |
| A6= | 1.55631075E+00 | 1.69215767E+00 | — | — |
| A8= | −3.16939716E+00 | −2.84218774E+00 | — | — |
| A10= | 4.56987636E+00 | 3.41407896E+00 | — | — |
| A12= | −4.72989152E+00 | −2.95714226E+00 | — | — |
| A14= | 3.21022229E+00 | 1.85405801E+00 | — | — |
| A16= | −1.00386581E+00 | −8.39686728E−01 | — | — |
| A18= | −3.19883521E−01 | 2.72320346E−01 | — | — |
| A20= | 4.63907088E−01 | −6.21082005E−02 | — | — |
| A22= | −1.98815500E−01 | 9.63399069E−03 | — | — |
| A24= | 4.04341286E−02 | −9.55814924E−04 | — | — |
| A26= | −3.29002129E−03 | 5.36703069E−05 | — | — |
| A28= | — | −1.25308743E−06 | — | — |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Conditional Expressions | | | |
|---|---|---|---|
| f [mm] | 2.18 | ImgH [mm] | 2.90 |
| Fno | 2.39 | TL/ImgH | 1.09 |
| HFOV [deg.] | 53.3 | TD/BL | 2.33 |
| f/f1 | 0.40 | CRA_D [deg.] | 46.25 |
| f/f3 | −0.40 | T45/CT5 | 0.51 |
| f/f4 | −0.06 | (T45 − T34)/CT3 | 1.14 |
| f1/f2 | 1.55 | (CT1 + CT3 + CT4)/CT2 | 1.91 |
| f123/f45 | 0.65 | (CT4 + T45 + CT5)/ (CT1 + T12 + CT2) | 1.16 |
| (|f1| + |f2| + |f5|)/ (|f3| + |f4|) | 0.32 | ATmax/T45 | 1.28 |
| f/f3 + f/f4 + f/f5 | 0.0007 | ET4/T23 | 0.91 |
| f2/CT2 | 9.95 | ET34/ET45 | 4.20 |
| f/R6 | −1.84 | SAG31/CT3 | −2.10 |
| f/R10 | 3.62 | Y11/ImgH | 0.21 |
| |f5/R9| + |f5/R10| | 15.44 | Y41/Y32 | 1.52 |
| R4/R1 | −1.35 | Y52cs/Y52 | 0.59 |
| (R2 + R3)/(R2 − R3) | −1.33 | V2/V3 | 2.87 |
| (R3 + R4)/(R3 − R4) | 0.82 | (V4 + V5)/V1 | 1.46 |
| (R7 + R8)/(R7 − R8) | 1.50 | V3/N3 | 11.68 |
| (R9 − R10)/(R9 + R10) | 0.01 | min(Vi/Ni) | 11.68 |

6th Embodiment

Figure 11:
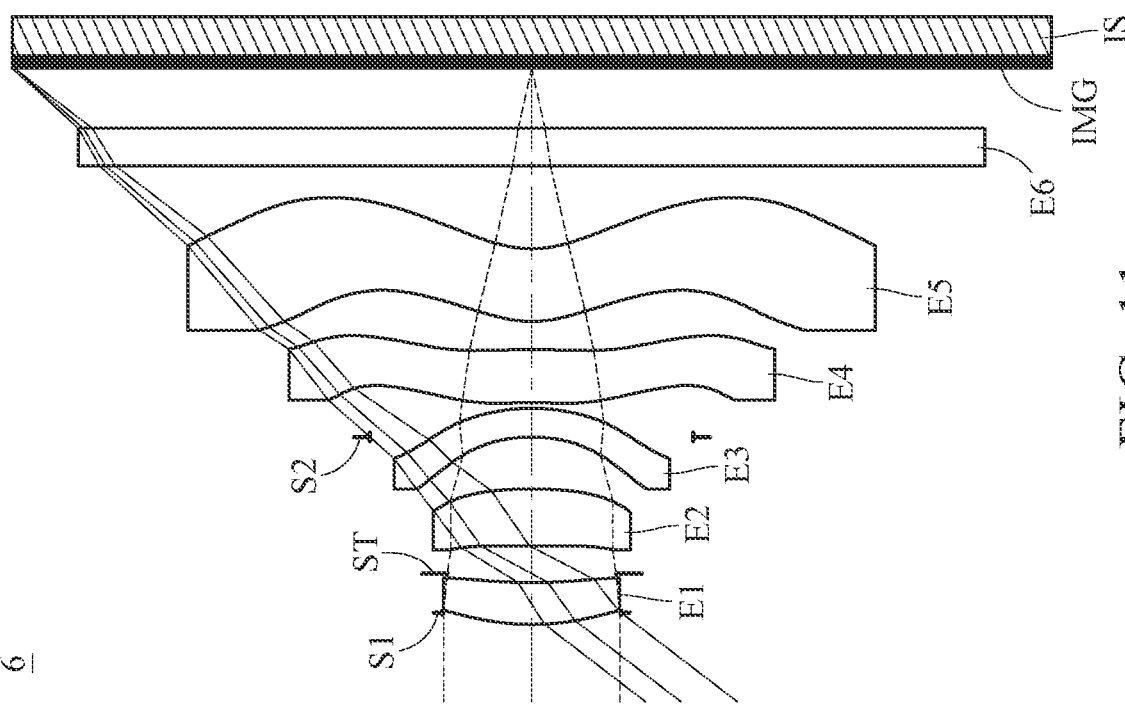
FIG. 11 is a schematic view of an image capturing unit according to the 6th embodiment of the present disclosure.
Figure 12:
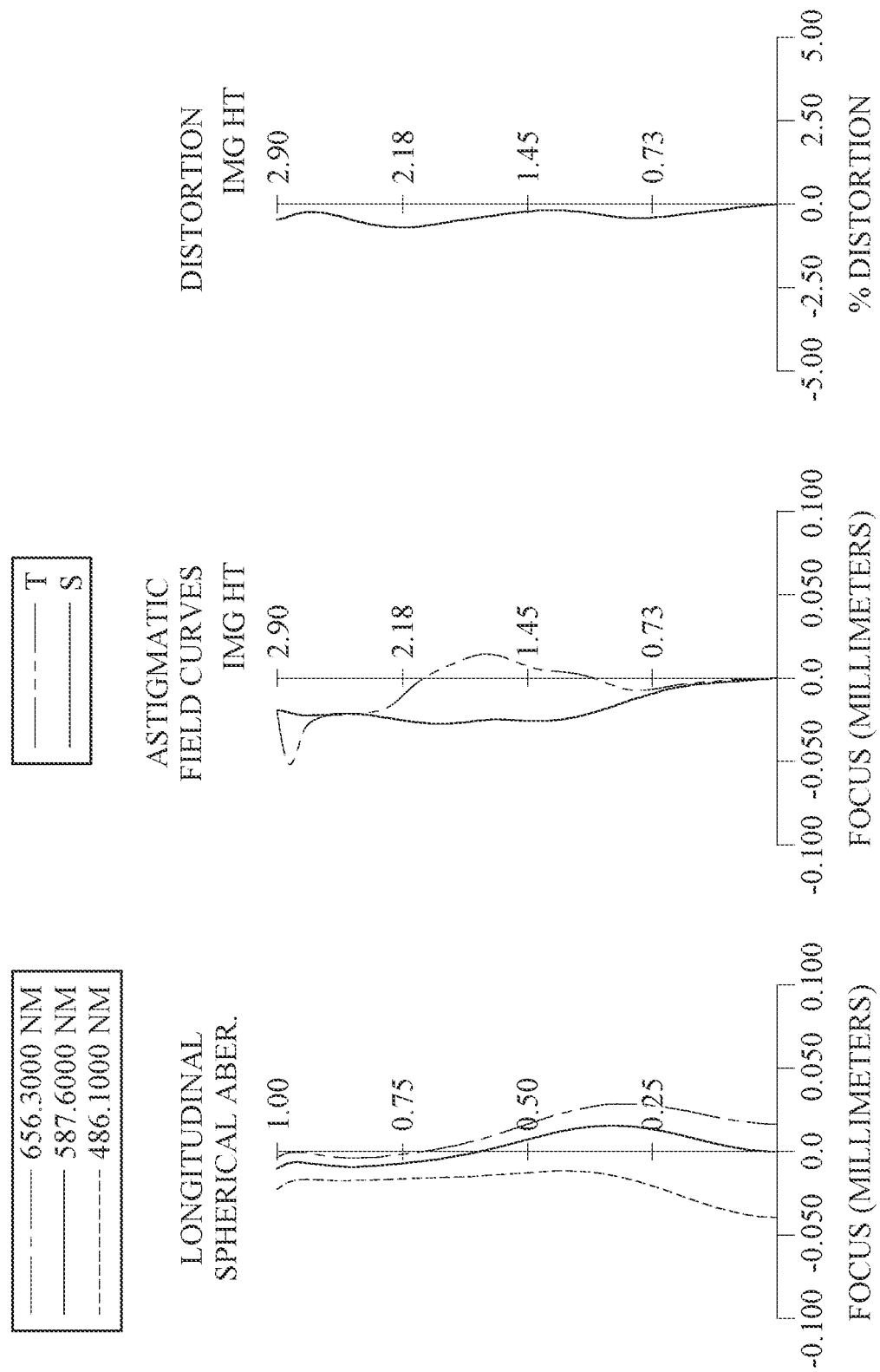
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the imaging system lens assembly (its reference numeral is omitted) of the present disclosure and an image sensor IS. The imaging system lens assembly includes, in order from an object side to an image side along an optical axis, a stop S1, a first lens element E1, an aperture stop ST, a second lens element E2, a third lens element E3, a stop S2, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has three inflection points. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 6th embodiment are shown in Table 6A and the aspheric surface data are shown in Table 6B below.

TABLE 6A

6th Embodiment
f = 2.24 mm, Fno = 2.28, HFOV = 52.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.068 | | | | |
| 2 | Lens 1 | 1.3863 | (ASP) | 0.234 | Plastic | 1.544 | 56.0 | 4.85 |
| 3 | | 2.7455 | (ASP) | 0.050 | | | | |
| 4 | Ape. Stop | Plano | | 0.156 | | | | |
| 5 | Lens 2 | 61.8661 | (ASP) | 0.319 | Plastic | 1.562 | 44.6 | 3.86 |
| 6 | | −2.2407 | (ASP) | 0.290 | | | | |
| 7 | Lens 3 | −0.9107 | (ASP) | 0.162 | Plastic | 1.697 | 16.3 | 17.43 |
| 8 | | −0.9091 | (ASP) | −0.161 | | | | |
| 9 | Stop | Plano | | 0.192 | | | | |
| 10 | Lens 4 | −1.9970 | (ASP) | 0.296 | Plastic | 1.544 | 56.0 | −3.87 |
| 11 | | −40.6375 | (ASP) | 0.158 | | | | |
| 12 | Lens 5 | 0.6162 | (ASP) | 0.407 | Plastic | 1.587 | 28.3 | 4.82 |
| 13 | | 0.5952 | (ASP) | 0.466 | | | | |
| 14 | Filter | Plano | | 0.210 | Glass | 1.517 | 64.2 | — |
| 15 | | Plano | | 0.336 | | | | |
| 16 | Image | Plano | | — | | | | |

Note:
Reference wavelength is 587.6 nm (d-line).
An effective radius of the stop S1 (Surface 1) is 0.498 mm.
An effective radius of the stop S2 (Surface 9) is 0.905 mm.

TABLE 6B

Aspheric Coefficients

| Surface # | 2 | 3 | 5 | 6 |
|---|---|---|---|---|
| k= | 2.48447E+00 | 1.25111E+01 | 9.00000E+01 | 7.05507E+00 |
| A4= | −3.06194389E−01 | −2.09462724E−01 | −3.23317391E−01 | −3.83914201E−01 |
| A6= | 1.20994270E+00 | −1.44523150E+00 | −5.90269708E−01 | 1.25191604E−01 |
| A8= | −1.45011625E+01 | 9.28586604E+00 | −5.40289406E+00 | −5.14553320E+00 |
| A10= | 6.53168372E+01 | −6.40569902E+01 | 2.99374762E+01 | 1.43768089E+01 |
| A12= | −1.60349845E+02 | 2.01729440E+02 | −1.22583702E+02 | −1.63577391E+01 |
| A14= | 1.50270994E+02 | −2.59626233E+02 | 1.63366328E+02 | 3.93715747E+00 |

| Surface # | 7 | 8 | 10 | 11 |
|---|---|---|---|---|
| k= | −8.66783E−01 | −3.72278E+00 | −6.72982E+01 | 6.45983E+01 |
| A4= | −1.50605099E+00 | 1.28600552E+00 | 3.68101365E+00 | −1.27313724E+00 |
| A6= | 8.57045077E+00 | −1.44357350E+01 | −2.18869474E+01 | 1.55283918E+01 |
| A8= | −4.95656205E+01 | 6.17854066E+01 | 8.76008146E+01 | −7.13462669E+01 |
| A10= | 1.54358493E+02 | −1.93972857E+02 | −2.57619441E+02 | 1.98337401E+02 |
| A12= | −1.11088078E+02 | 5.07645265E+02 | 5.50142695E+02 | −3.81395399E+02 |
| A14= | −4.20307435E+02 | −9.39775665E+02 | −8.38056491E+02 | 5.36004190E+02 |
| A16= | 9.32028093E+02 | 1.06698104E+03 | 8.93021385E+02 | −5.62680384E+02 |
| A18= | −5.61154232E+02 | −6.57585205E+02 | −6.46634119E+02 | 4.41799271E+02 |
| A20= | — | 1.68466936E+02 | 3.01911582E+02 | −2.55605714E+02 |
| A22= | — | — | −8.16893519E+01 | 1.05513271E+02 |
| A24= | — | — | 9.70224385E+00 | −2.93196838E+01 |
| A26= | — | — | — | 4.90112147E+00 |
| A28= | — | — | — | −3.71469445E−01 |

| Surface # | 12 | 13 | — | — |
|---|---|---|---|---|
| k= | −4.57967E+00 | −2.70453E+00 | — | — |
| A4= | −7.25314769E−01 | −7.69263043E−01 | — | — |
| A6= | 2.30450884E+00 | 1.88593794E+00 | — | — |
| A8= | −6.44295807E+00 | −3.52897342E+00 | — | — |

TABLE 6B-continued

Aspheric Coefficients

| A10= | 1.37043203E+01 | 4.76480097E+00 | — | — |
|---|---|---|---|---|
| A12= | −2.21422347E+01 | −4.70392337E+00 | — | — |
| A14= | 2.61190207E+01 | 3.42204073E+00 | — | — |
| A16= | −2.17346194E+01 | −1.83556053E+00 | — | — |
| A18= | 1.24541014E+01 | 7.21745773E−01 | — | — |
| A20= | −4.77734549E+00 | −2.05137439E−01 | — | — |
| A22= | 1.16739157E+00 | 4.10052598E−02 | — | — |
| A24= | −1.63874350E−01 | −5.47036825E−03 | — | — |
| A26= | 1.00405294E−02 | 4.37504991E−04 | — | — |
| A28= | — | −1.58701089E−05 | — | — |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Values of Conditional Expressions

| f [mm] | 2.24 | ImgH [mm] | 2.90 |
|---|---|---|---|
| Fno | 2.28 | TL/ImgH | 1.07 |
| HFOV [deg.] | 52.5 | TD/BL | 2.08 |
| f/f1 | 0.46 | CRA_D [deg.] | 49.46 |
| f/f3 | 0.13 | T45/CT5 | 0.39 |
| f/f4 | −0.58 | (T45 − T34)/CT3 | 0.78 |
| f1/f2 | 1.26 | (CT1 + CT3 + CT4)/CT2 | 2.17 |
| f123/f45 | −0.22 | (CT4 + T45 + CT5)/(CT1 + T12 + CT2) | 1.13 |
| (|f1| + |f2| + |f5|)/(|f3| + |f4|) | 0.64 | ATmax/T45 | 1.84 |
| f/f3 + f/f4 + f/f5 | 0.01 | ET4/T23 | 0.98 |
| f2/CT2 | 12.09 | ET34/ET45 | 3.10 |
| f/R6 | −2.47 | SAG31/CT3 | −1.80 |
| f/R10 | 3.77 | Y11/ImgH | 0.17 |
| |f5/R9| + |f5/R10| | 15.92 | Y41/Y32 | 1.48 |
| R4/R1 | −1.62 | Y52cs/Y52 | 0.59 |
| (R2 + R3)/(R2 − R3) | −1.09 | V2/V3 | 2.74 |
| (R3 + R4)/(R3 − R4) | 0.93 | (V4 + V5)/V1 | 1.51 |
| (R7 + R8)/(R7 − R8) | −1.10 | V3/N3 | 9.61 |
| (R9 − R10)/(R9 + R10) | 0.02 | min(Vi/Ni) | 9.61 |

7th Embodiment

Figure 13:
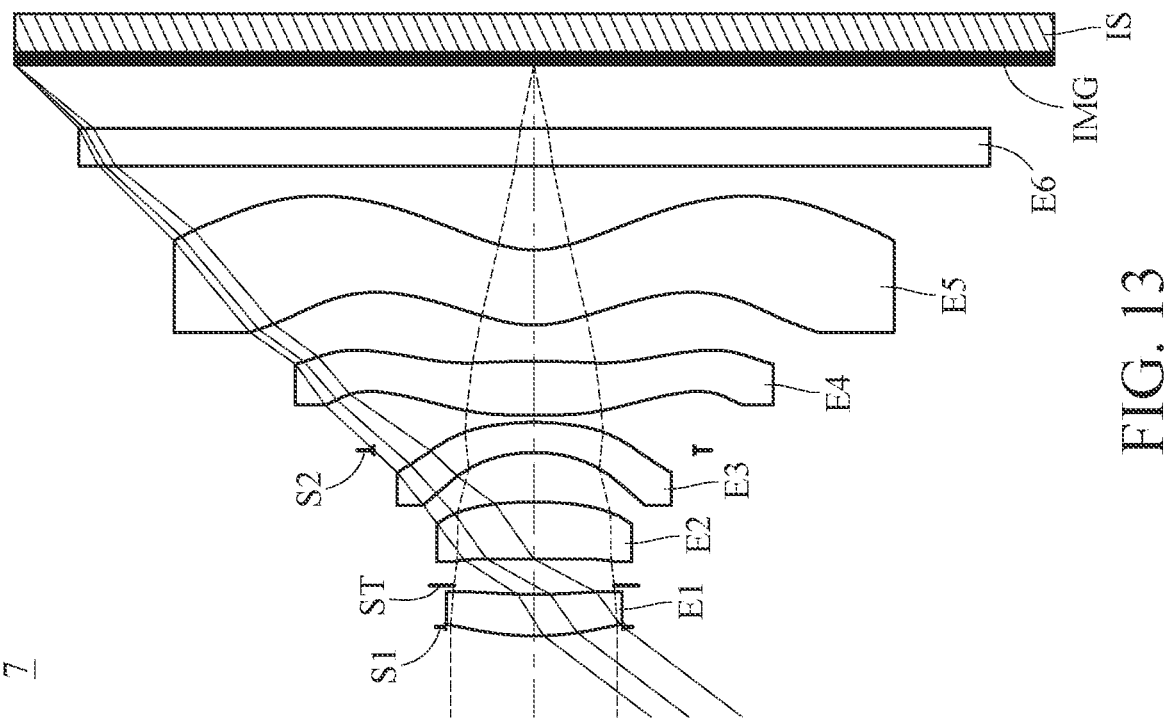
FIG. 13 is a schematic view of an image capturing unit according to the 7th embodiment of the present disclosure.
Figure 14:
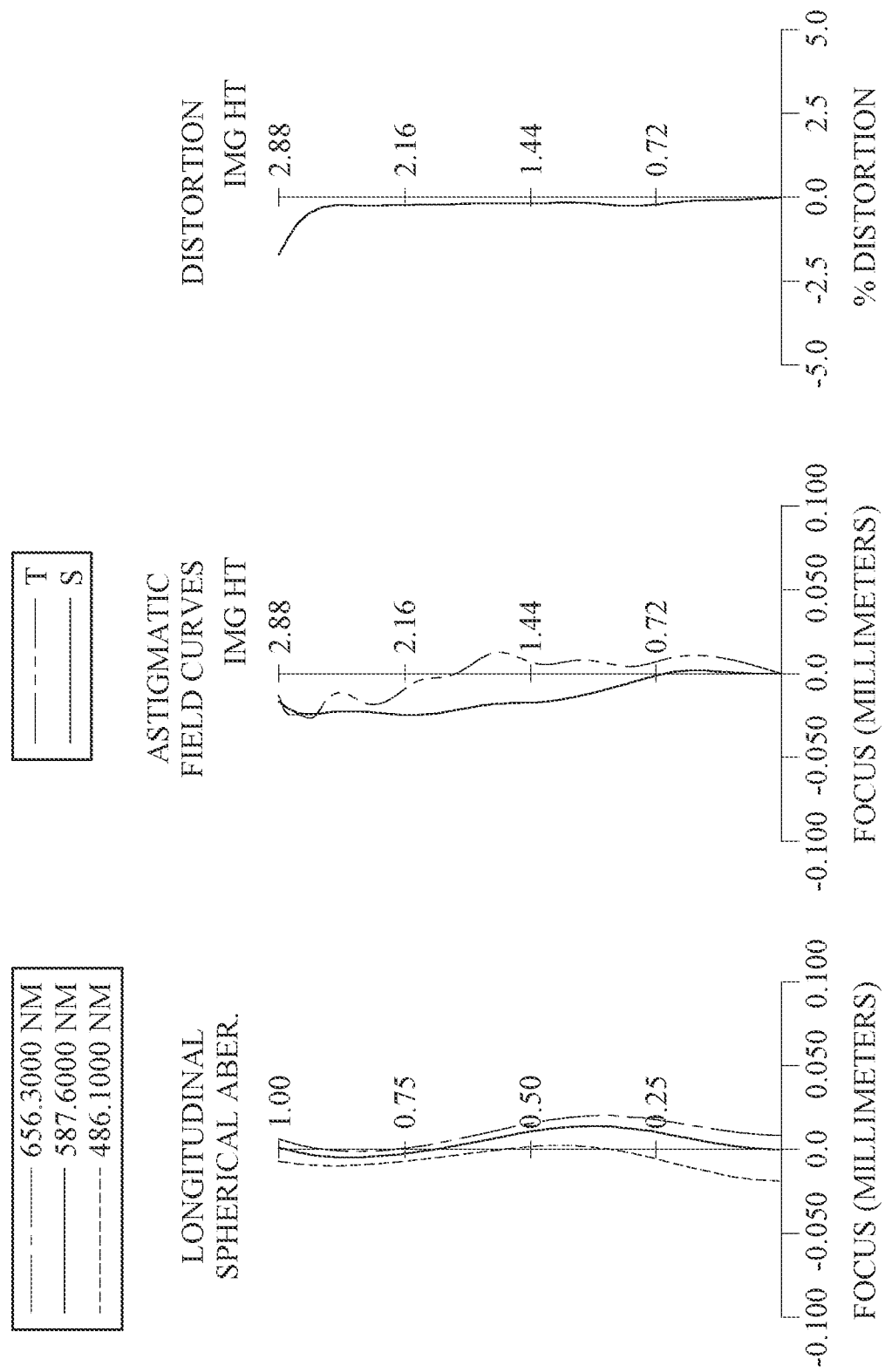
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the imaging system lens assembly (its reference numeral is omitted) of the present disclosure and an image sensor IS. The imaging system lens assembly includes, in order from an object side to an image side along an optical axis, a stop S1, a first lens element E1, an aperture stop ST, a second lens element E2, a third lens element E3, a stop S2, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has one inflection point. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 7th embodiment are shown in Table 7A and the aspheric surface data are shown in Table 7B below.

TABLE 7A

7th Embodiment
f = 2.22 mm, Fno = 2.40, HFOV = 52.9 deg.

| Surface # |          | Curvature Radius |       | Thickness | Material | Index | Abbe # | Focal Length |
|-----------|----------|------------------|-------|-----------|----------|-------|--------|--------------|
| 0         | Object   | Plano            |       | Infinity  |          |       |        |              |
| 1         | Stop     | Plano            |       | −0.050    |          |       |        |              |
| 2         | Lens 1   | 1.5528           | (ASP) | 0.231     | Plastic  | 1.544 | 56.0   | 5.02         |
| 3         |          | 3.4106           | (ASP) | 0.050     |          |       |        |              |
| 4         | Ape. Stop| Plano            |       | 0.147     |          |       |        |              |
| 5         | Lens 2   | 22.5786          | (ASP) | 0.316     | Plastic  | 1.534 | 56.0   | 3.75         |
| 6         |          | −2.1893          | (ASP) | 0.275     |          |       |        |              |
| 7         | Lens 3   | −0.8511          | (ASP) | 0.168     | Plastic  | 1.680 | 18.2   | −3.98        |
| 8         |          | −1.3409          | (ASP) | −0.155    |          |       |        |              |
| 9         | Stop     | Plano            |       | 0.195     |          |       |        |              |
| 10        | Lens 4   | −35.5385         | (ASP) | 0.299     | Plastic  | 1.566 | 37.4   | 18.50        |
| 11        |          | −8.1140          | (ASP) | 0.201     |          |       |        |              |
| 12        | Lens 5   | 0.6659           | (ASP) | 0.418     | Plastic  | 1.639 | 23.5   | 5.35         |
| 13        |          | 0.6248           | (ASP) | 0.466     |          |       |        |              |
| 14        | Filter   | Plano            |       | 0.210     | Glass    | 1.517 | 64.2   | —            |
| 15        |          | Plano            |       | 0.352     |          |       |        |              |
| 16        | Image    | Plano            |       | —         |          |       |        |              |

Note:
Reference wavelength is 587.6 nm (d-line).
An effective radius of the stop S1 (Surface 1) is 0.494 mm.
An effective radius of the stop S2 (Surface 9) is 0.891 mm.

TABLE 7B

Aspheric Coefficients

| Surface # | 2 | 3 | 5 | 6 |
|-----------|---|---|---|---|
| k=   | 2.47252E+00     | 1.01216E+01     | −2.96904E+01    | 6.22277E+00     |
| A4=  | −2.89708948E−01 | −2.38233343E−01 | −2.63504829E−01 | −3.13187053E−01 |
| A6=  | 8.34789612E−01  | −1.31169023E+00 | −1.58046330E+00 | −6.93678749E−01 |
| A8=  | −1.13779106E+01 | 6.38221982E+00  | 5.48964942E+00  | −7.15974456E−01 |
| A10= | 5.02224320E+01  | −3.67581709E+01 | −2.66446004E+01 | 2.00946013E+00  |
| A12= | −1.18868772E+02 | 9.64712268E+01  | 2.00160101E+01  | −4.42753468E+00 |
| A14= | 1.05389395E+02  | −9.62194604E+01 | 3.78039274E+01  | 5.02694320E+00  |

| Surface # | 7 | 8 | 10 | 11 |
|-----------|---|---|----|----|
| k=   | −7.64434E−01    | −1.09523E+00    | −9.00000E+01    | −8.94645E+01    |
| A4=  | −6.71569963E−01 | 1.41621063E+00  | 2.73052969E+00  | −1.16125231E+00 |
| A6=  | −1.97558431E+00 | −1.82136144E+01 | −1.61022172E+01 | 1.37044789E+01  |
| A8=  | 1.85096612E+01  | 8.99171669E+01  | 6.60732246E+01  | −5.78369637E+01 |
| A10= | −1.38922666E+02 | −3.05958406E+02 | −1.99667756E+02 | 1.45282195E+02  |
| A12= | 7.52059633E+02  | 7.67493327E+02  | 4.32061607E+02  | −2.51527361E+02 |
| A14= | −2.08083830E+03 | −1.29476010E+03 | −6.57318630E+02 | 3.22161165E+02  |
| A16= | 2.79255286E+03  | 1.33692012E+03  | 6.92178517E+02  | −3.17196307E+02 |
| A18= | −1.46655789E+03 | −7.51564744E+02 | −4.91934214E+02 | 2.42817801E+02  |
| A20= | —               | 1.74680109E+02  | 2.24478234E+02  | −1.42279526E+02 |
| A22= | —               | —               | −5.92096333E+01 | 6.12299669E+01  |
| A24= | —               | —               | 6.84578270E+00  | −1.80467654E+01 |
| A26= | —               | —               | —               | 3.22382468E+00  |
| A28= | —               | —               | —               | −2.61395441E−01 |

| Surface # | 12 | 13 | | |
|-----------|----|----|--|--|
| k=   | −4.11812E+00    | −2.45209E+00    | — | — |
| A4=  | −6.55307442E−01 | −7.59061968E−01 | — | — |
| A6=  | 1.73330513E+00  | 1.69172338E+00  | — | — |
| A8=  | −4.02833854E+00 | −2.83219888E+00 | — | — |
| A10= | 7.12510087E+00  | 3.36574642E+00  | — | — |
| A12= | −9.82394158E+00 | −2.87169242E+00 | — | — |
| A14= | 1.02747512E+01  | 1.78253170E+00  | — | — |
| A16= | −7.80906193E+00 | −8.10367957E−01 | — | — |
| A18= | 4.15993422E+00  | 2.69462291E−01  | — | — |
| A20= | −1.49780274E+00 | −6.48142245E−02 | — | — |
| A22= | 3.45341379E−01  | 1.09958207E−02  | — | — |
| A24= | −4.58892154E−02 | −1.25115114E−03 | — | — |
| A26= | 2.66829563E−03  | 8.59504876E−05  | — | — |
| A28= | —               | −2.70239358E−06 | — | — |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

Values of Conditional Expressions

| | | | |
|---|---|---|---|
| f [mm] | 2.22 | ImgH [mm] | 2.88 |
| Fno | 2.40 | TL/ImgH | 1.10 |
| HFOV [deg.] | 52.9 | TD/BL | 2.09 |
| f/f1 | 0.44 | CRA_D [deg.] | 47.27 |
| f/f3 | −0.56 | T45/CT5 | 0.48 |
| f/f4 | 0.12 | (T45 − T34)/CT3 | 0.96 |
| f1/f2 | 1.34 | (CT1 + CT3 + CT4)/CT2 | 2.21 |
| f123/f45 | 1.14 | (CT4 + T45 + CT5)/(CT1 + T12 + CT2) | 1.23 |
| (|f1| + |f2| + |f5|)/(|f3| + |f4|) | 0.63 | ATmax/T45 | 1.37 |
| f/f3 + f/f4 + f/f5 | −0.02 | ET4/T23 | 0.83 |
| f2/CT2 | 11.87 | ET34/ET45 | 2.13 |
| f/R6 | −1.65 | SAG31/CT3 | −1.75 |
| f/R10 | 3.55 | Y11/ImgH | 0.17 |
| |f5/R9| + |f5/R10| | 16.59 | Y41/Y32 | 1.52 |
| R4/R1 | −1.41 | Y52cs/Y52 | 0.59 |
| (R2 + R3)/(R2 − R3) | −1.36 | V2/V3 | 3.08 |
| (R3 + R4)/(R3 − R4) | 0.82 | (V4 + V5)/V1 | 1.09 |
| (R7 + R8)/(R7 − R8) | 1.59 | V3/N3 | 10.83 |
| (R9 − R10)/(R9 + R10) | 0.03 | min(Vi/Ni) | 10.83 |

8th Embodiment

Figure 15:
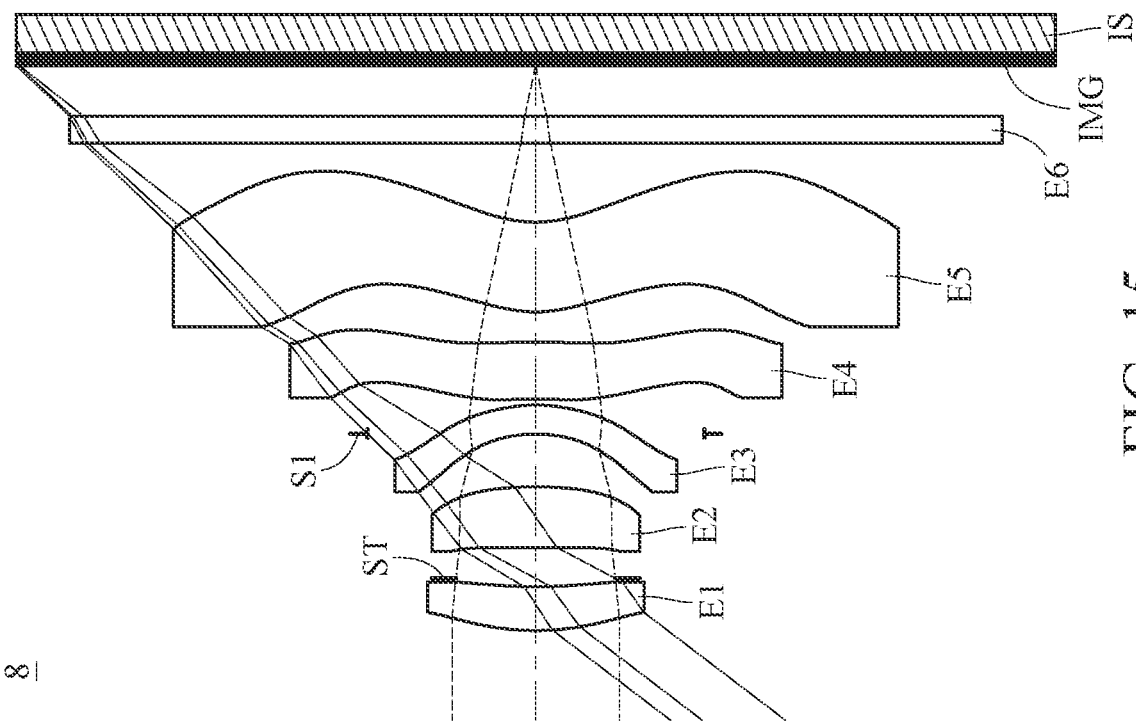
FIG. 15 is a schematic view of an image capturing unit according to the 8th embodiment of the present disclosure.
Figure 16:
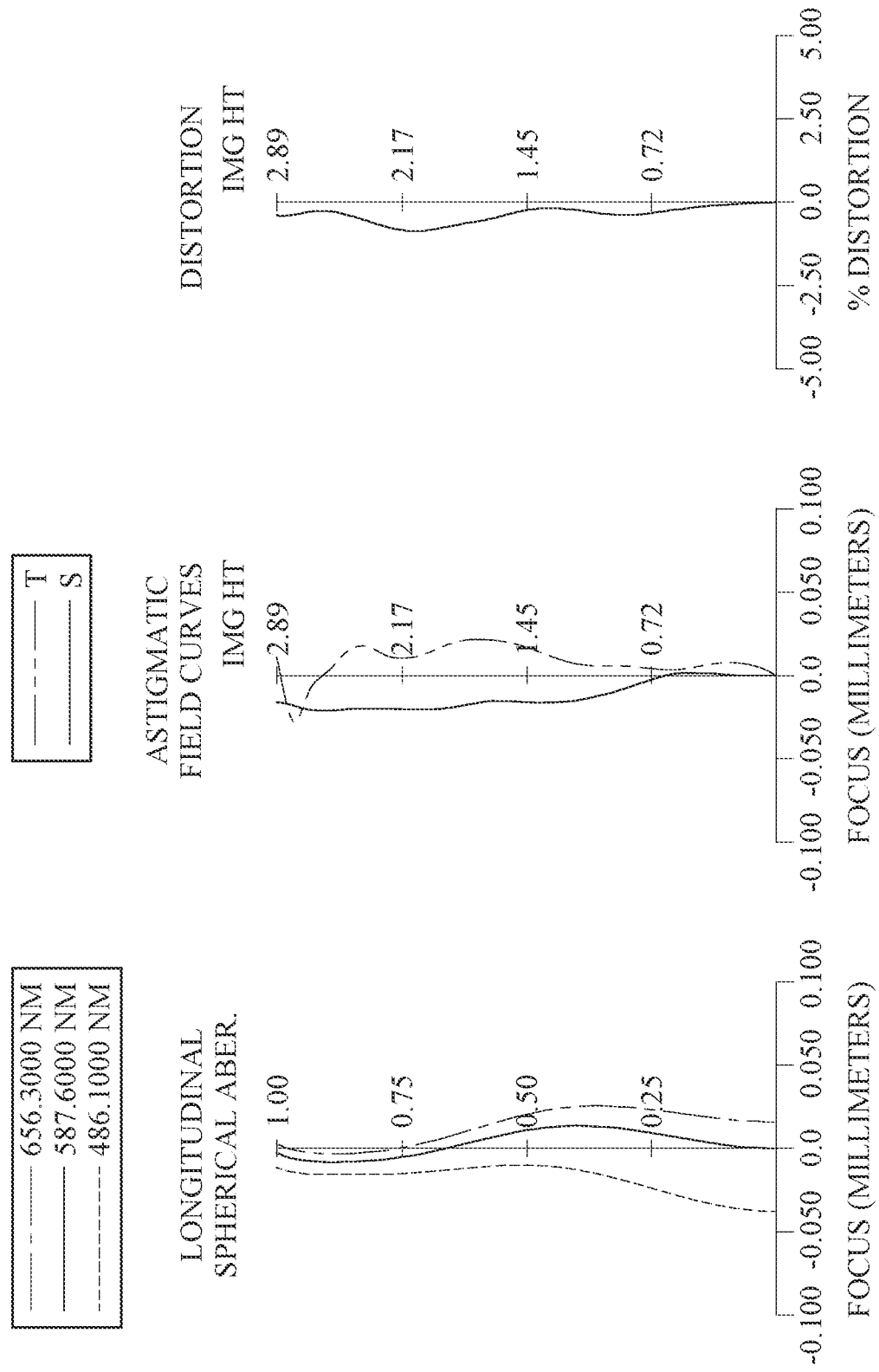
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the imaging system lens assembly (its reference numeral is omitted) of the present disclosure and an image sensor IS. The imaging system lens assembly includes, in order from an object side to an image side along an optical axis, a first lens element E1, an aperture stop ST, a second lens element E2, a third lens element E3, a stop S1, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has one inflection point. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 8th embodiment are shown in Table 8A and the aspheric surface data are shown in Table 8B below.

TABLE 8A

8th Embodiment
f = 2.22 mm, Fno = 2.38, HFOV = 52.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.4302 | (ASP) | 0.245 | Plastic | 1.544 | 56.0 | 5.02 |
| 2 | | 2.8198 | (ASP) | 0.046 | | | | |
| 3 | Ape. Stop | Plano | | 0.172 | | | | |
| 4 | Lens 2 | 20.2461 | (ASP) | 0.339 | Plastic | 1.562 | 44.6 | 3.46 |
| 5 | | −2.1387 | (ASP) | 0.294 | | | | |
| 6 | Lens 3 | −0.8262 | (ASP) | 0.162 | Plastic | 1.697 | 16.3 | 13.96 |
| 7 | | −0.8229 | (ASP) | −0.159 | | | | |
| 8 | Stop | Plano | | 0.194 | | | | |
| 9 | Lens 4 | −1.8481 | (ASP) | 0.315 | Plastic | 1.544 | 56.0 | −3.69 |
| 10 | | −24.6600 | (ASP) | 0.170 | | | | |
| 11 | Lens 5 | 0.7083 | (ASP) | 0.500 | Plastic | 1.587 | 28.3 | 5.52 |

TABLE 8A-continued

8th Embodiment
f = 2.22 mm, Fno = 2.38, HFOV = 52.7 deg.

| Surface # | | Curvature Radius | | Thickness | Material | Index | Abbe # | Focal Length |
|---|---|---|---|---|---|---|---|---|
| 12 | | 0.6695 | (ASP) | 0.440 | | | | |
| 13 | Filter | Plano | | 0.150 | Glass | 1.517 | 64.2 | — |
| 14 | | Plano | | 0.285 | | | | |
| 15 | Image | Plano | | — | | | | |

Note:
Reference wavelength is 587.6 nm (d-line).
An effective radius of the stop S1 (Surface 8) is 0.940 mm.

TABLE 8B

Aspheric Coefficients

| Surface # | 1 | 2 | 4 | 5 |
|---|---|---|---|---|
| k= | 2.67931E+00 | 1.41577E+01 | −9.00000E+01 | 6.75304E+00 |
| A4= | −2.54248745E−01 | −2.33427091E−01 | −3.08923290E−01 | −3.52835861E−01 |
| A6= | 3.16129438E−01 | −3.29196208E−01 | −3.90959303E−01 | −3.01034789E−01 |
| A8= | −4.94196276E+00 | −4.89044686E+00 | −5.85362368E+00 | −1.87781824E+00 |
| A10= | 1.62440065E+01 | 3.62783470E+01 | 2.94575375E+01 | 2.90288772E+00 |
| A12= | −3.42359534E+01 | −1.49534324E+02 | −1.11675034E+02 | 2.21310878E+00 |
| A14= | 2.61054492E+01 | 2.34171911E+02 | 1.39800607E+02 | −6.84770674E+00 |

| Surface # | 6 | 7 | 9 | 10 |
|---|---|---|---|---|
| k= | −8.75717E−01 | −3.71493E+00 | −5.81966E+01 | 2.16797E+00 |
| A4= | −1.58097073E+00 | 1.31427584E+00 | 3.71285830E+00 | −1.05866696E+00 |
| A6= | 1.10109171E+01 | −1.40252460E+01 | −2.23259482E+01 | 1.29074697E+01 |
| A8= | −8.47483617E+01 | 5.32559776E+01 | 8.91635032E+01 | −5.82794479E+01 |
| A10= | 3.92182213E+02 | −1.42385045E+02 | −2.58126447E+02 | 1.60126778E+02 |
| A12= | −9.71586232E+02 | 3.55624489E+02 | 5.40261440E+02 | −3.06551724E+02 |
| A14= | 1.31252560E+03 | −7.01067725E+02 | −8.07777664E+02 | 4.31307703E+02 |
| A16= | −9.05479460E+02 | 8.75506523E+02 | 8.47710178E+02 | −4.54607305E+02 |
| A18= | 2.41572679E+02 | −5.97686960E+02 | −6.06626266E+02 | 3.58507948E+02 |
| A20= | — | 1.70567938E+02 | 2.80705230E+02 | −2.08014092E+02 |
| A22= | — | — | −7.54273865E+01 | 8.59037295E+01 |
| A24= | — | — | 8.90857671E+00 | −2.38152240E+01 |
| A26= | — | — | — | 3.96127294E+00 |
| A28= | — | — | — | −2.98050582E−01 |

| Surface # | 11 | 12 | | |
|---|---|---|---|---|
| k= | −4.94097E+00 | −2.47488E+00 | — | — |
| A4= | −7.95496300E−01 | −7.93052672E−01 | — | — |
| A6= | 2.96998081E+00 | 1.92488708E+00 | — | — |
| A8= | −9.28925613E+00 | −3.54656627E+00 | — | — |
| A10= | 2.09991705E+01 | 4.71477147E+00 | — | — |
| A12= | −3.40387713E+01 | −4.52949314E+00 | — | — |
| A14= | 3.89317981E+01 | 3.15141038E+00 | — | — |
| A16= | −3.10557830E+01 | −1.58872673E+00 | — | — |
| A18= | 1.70620769E+01 | 5.78039359E−01 | — | — |
| A20= | −6.30421660E+00 | −1.49937254E−01 | — | — |
| A22= | 1.49231870E+00 | 2.70106088E−02 | — | — |
| A24= | −2.04059801E−01 | −3.20997511E−03 | — | — |
| A26= | 1.22394169E−02 | 2.26293818E−04 | — | — |
| A28= | — | −7.16901538E−06 | — | — |

In the 8th embodiment, the equation of the aspheric surface profiles of the aforementioned lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

Values of Conditional Expressions

| | | | |
|---|---|---|---|
| f [mm] | 2.22 | ImgH [mm] | 2.89 |
| Fno | 2.38 | TL/ImgH | 1.09 |
| HFOV [deg.] | 52.7 | TD/BL | 2.60 |
| f/f1 | 0.44 | CRA_D [deg.] | 47.65 |
| f/f3 | 0.16 | T45/CT5 | 0.34 |
| f/f4 | −0.60 | (T45 − T34)/CT3 | 0.83 |
| f1/f2 | 1.45 | (CT1 + CT3 + CT4)/CT2 | 2.13 |
| f123/f45 | −0.32 | (CT4 + T45 + CT5)/(CT1 + T12 + CT2) | 1.23 |
| (\|f1\| + \|f2\| + \|f5\|)/(\|f3\| + \|f4\|) | 0.79 | ATmax/T45 | 1.73 |
| f/f3 + f/f4 + f/f5 | −0.04 | ET4/T23 | 1.02 |
| f2/CT2 | 10.21 | ET34/ET45 | 3.74 |
| f/R6 | −2.69 | SAG31/CT3 | −2.00 |
| f/R10 | 3.31 | Y11/ImgH | 0.21 |
| \|f5/R9\| + \|f5/R10\| | 16.05 | Y41/Y32 | 1.46 |
| R4/R1 | −1.50 | Y52cs/Y52 | 0.58 |
| (R2 + R3)/(R2 − R3) | −1.32 | V2/V3 | 2.74 |
| (R3 + R4)/(R3 − R4) | 0.81 | (V4 + V5)/V1 | 1.51 |
| (R7 + R8)/(R7 − R8) | −1.16 | V3/N3 | 9.61 |
| (R9 − R10)/(R9 + R10) | 0.03 | min(Vi/Ni) | 9.61 |

9th Embodiment

Figure 17:
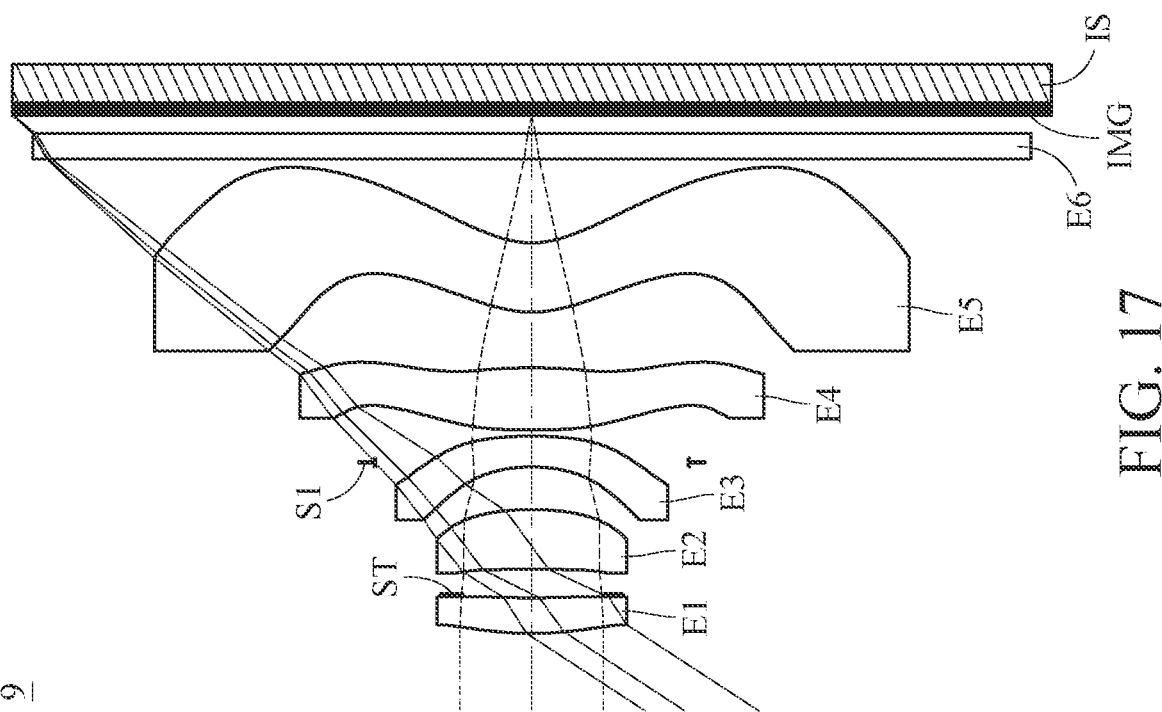
FIG. 17 is a schematic view of an image capturing unit according to the 9th embodiment of the present disclosure.
Figure 18:
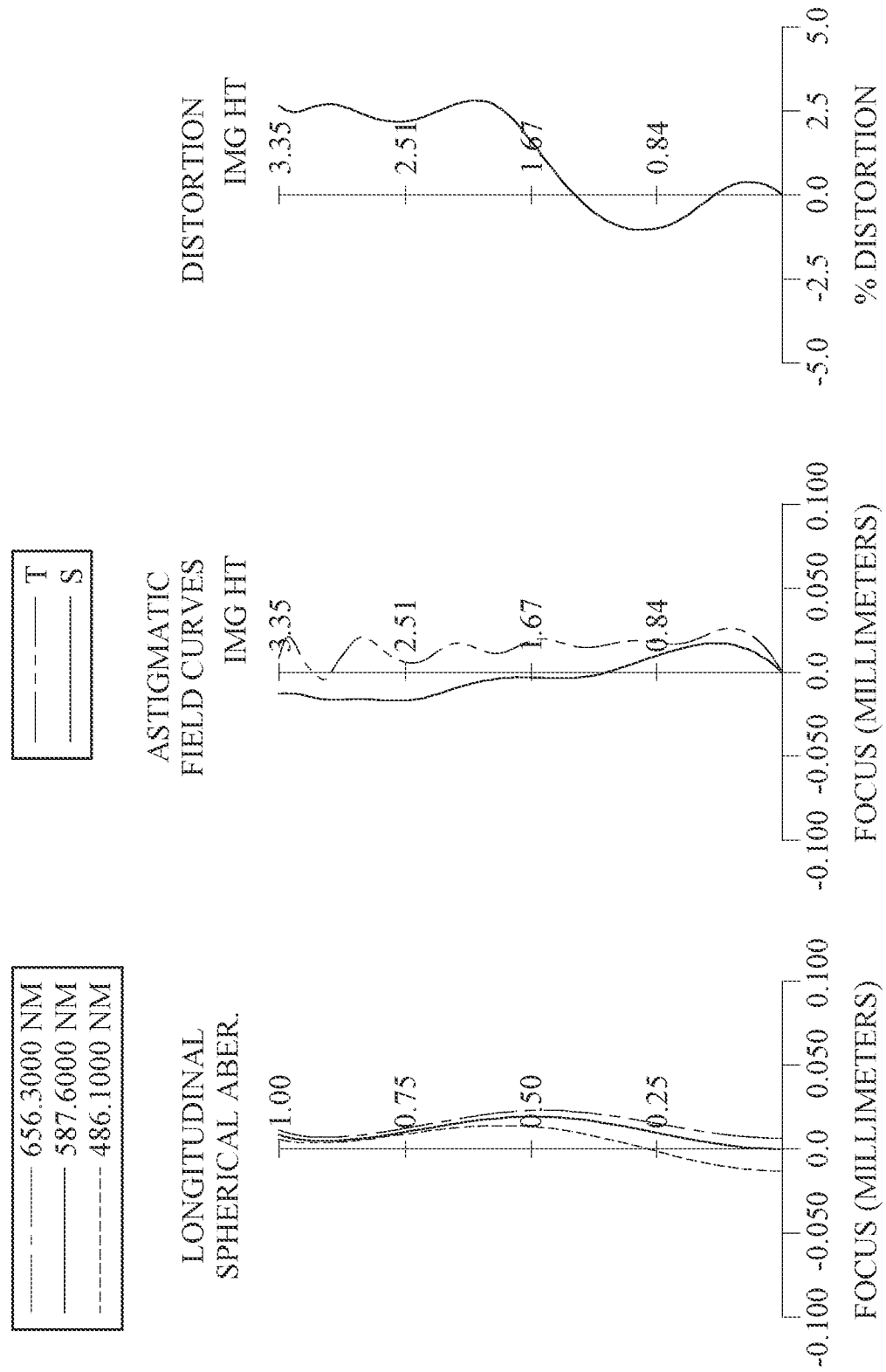
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit 9 includes the imaging system lens assembly (its reference numeral is omitted) of the present disclosure and an image sensor IS. The imaging system lens assembly includes, in order from an object side to an image side along an optical axis, a first lens element E1, an aperture stop ST, a second lens element E2, a third lens element E3, a stop S1, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has one inflection point. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 9th embodiment are shown in Table 9A and the aspheric surface data are shown in Table 9B below.

TABLE 9A

9th Embodiment
f = 2.13 mm, Fno = 2.30, HFOV = 56.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.1109 | (ASP) | 0.230 | Plastic | 1.544 | 56.0 | 6.09 |
| 2 | | 5.5913 | (ASP) | 0.025 | | | | |
| 3 | Ape. Stop | Plano | | 0.158 | | | | |
| 4 | Lens 2 | 187.5690 | (ASP) | 0.387 | Plastic | 1.534 | 56.0 | 3.32 |
| 5 | | −1.7899 | (ASP) | 0.275 | | | | |
| 6 | Lens 3 | −1.0470 | (ASP) | 0.200 | Plastic | 1.680 | 18.2 | −4.17 |
| 7 | | −1.7883 | (ASP) | −0.171 | | | | |
| 8 | Stop | Plano | | 0.211 | | | | |
| 9 | Lens 4 | 369.5993 | (ASP) | 0.400 | Plastic | 1.566 | 37.4 | 6.57 |
| 10 | | −3.7550 | (ASP) | 0.359 | | | | |
| 11 | Lens 5 | 0.7176 | (ASP) | 0.448 | Plastic | 1.639 | 23.5 | 18.27 |

TABLE 9A-continued

9th Embodiment
f = 2.13 mm, Fno = 2.30, HFOV = 56.8 deg.

| Surface # | | Curvature Radius | | Thickness | Material | Index | Abbe # | Focal Length |
|---|---|---|---|---|---|---|---|---|
| 12 | | 0.5786 | (ASP) | 0.540 | | | | |
| 13 | Filter | Plano | | 0.165 | Glass | 1.517 | 64.2 | — |
| 14 | | Plano | | 0.117 | | | | |
| 15 | Image | Plano | | — | | | | |

Note:
Reference wavelength is 587.6 nm (d-line).
An effective radius of the stop S1 (Surface 8) is 1.011 mm.

TABLE 9B

| Aspheric Coefficients | | | | |
|---|---|---|---|---|
| Surface # | 1 | 2 | 4 | 5 |
| k= | 2.88318E+00 | 1.34970E+01 | −9.00000E+01 | 4.70721E+00 |
| A4= | −2.07758803E−01 | −1.86450099E−01 | −2.46002220E−01 | −2.89454198E−01 |
| A6= | 3.42437466E−01 | −6.87720898E−01 | −9.63744835E−01 | −2.08896417E−01 |
| A8= | −4.26573550E+00 | 2.29418441E+00 | 3.85681679E+00 | −1.15587634E+00 |
| A10= | 1.55554885E+01 | −6.08256268E+00 | −2.38890994E+01 | 5.44306401E+00 |
| A12= | −3.09722250E+01 | −2.87315254E+00 | 5.71000637E+01 | −1.08983729E+01 |
| A14= | 2.45680552E+01 | 2.90056421E+01 | −7.12185758E+01 | 4.96276300E+00 |

| Surface # | 6 | 7 | 9 | 10 |
|---|---|---|---|---|
| k= | −3.27632E−01 | −2.37231E−01 | −9.00000E+01 | −5.56288E+01 |
| A4= | −5.86821503E−01 | 1.12076638E+00 | 1.92117896E+00 | −6.79715614E−01 |
| A6= | −1.85079392E+00 | −1.12453105E+01 | −9.44399682E+00 | 5.96643708E+00 |
| A8= | 1.65446084E+01 | 4.59450019E+01 | 3.17675279E+01 | −1.79069790E+01 |
| A10= | −9.53305419E+01 | −1.30045239E+02 | −7.69305026E+01 | 3.14681873E+01 |
| A12= | 3.95905472E+02 | 2.70790603E+02 | 1.32160962E+02 | −3.78541935E+01 |
| A14= | −9.21903245E+02 | −3.85357232E+02 | −1.59392578E+02 | 3.44036515E+01 |
| A16= | 1.07728562E+03 | 3.43722326E+02 | 1.33091901E+02 | −2.57513012E+01 |
| A18= | −4.92961973E+02 | −1.71783556E+02 | −7.49379219E+01 | 1.65439330E+01 |
| A20= | — | 3.69045496E+01 | 2.70117458E+01 | −8.76770792E+00 |
| A22= | — | — | −5.59852497E+00 | 3.49813224E+00 |
| A24= | — | — | 5.04722169E−01 | −9.46781984E−01 |
| A26= | — | — | — | 1.51957184E−01 |
| A28= | — | — | — | −1.08266317E−02 |

| Surface # | 11 | 12 | — | — |
|---|---|---|---|---|
| k= | −5.10048E+00 | −3.04188E+00 | — | — |
| A4= | −1.11357565E−03 | −2.48143100E−01 | — | — |
| A6= | −6.60943343E−01 | 4.50442838E−01 | — | — |
| A8= | 2.33975342E+00 | −6.66192859E−01 | — | — |
| A10= | −5.10095964E+00 | 6.79979305E−01 | — | — |
| A12= | 7.35390192E+00 | −4.86121229E−01 | — | — |
| A14= | −7.30232902E+00 | 2.48223111E−01 | — | — |
| A16= | 5.05602929E+00 | −9.14908945E−02 | — | — |
| A18= | −2.42804175E+00 | 2.43566267E−02 | — | — |
| A20= | 7.89928482E−01 | −4.63463509E−03 | — | — |
| A22= | −1.65459400E−01 | 6.14104435E−04 | — | — |
| A24= | 2.00606657E−02 | −5.37626777E−05 | — | — |
| A26= | −1.06646799E−03 | 2.79108994E−06 | — | — |
| A28= | — | −6.49510994E−08 | — | — |

In the 9th embodiment, the equation of the aspheric surface profiles of the aforementioned lens elements is the same as the equation of the 1st embodiment. Also, the definitions of these parameters shown in Table 9C below are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

Values of Conditional Expressions

| | | | |
|---|---|---|---|
| f [mm] | 2.13 | ImgH [mm] | 3.35 |
| Fno | 2.30 | TL/ImgH | 1.00 |
| HFOV [deg.] | 56.8 | TD/BL | 3.07 |
| f/f1 | 0.35 | CRA_D [deg.] | 49.10 |
| f/f3 | −0.51 | T45/CT5 | 0.80 |
| f/f4 | 0.32 | (T45 − T34)/CT3 | 1.60 |
| f1/f2 | 1.83 | (CT1 + CT3 + CT4)/CT2 | 2.14 |
| f123/f45 | 1.10 | (CT4 + T45 + CT5)/(CT1 + T12 + CT2) | 1.51 |
| (│f1│ + │f2│ + │f5│)/(│f3│ + │f4│) | 2.58 | ATmax/T45 | 1.00 |
| f/f3 + f/f4 + f/f5 | −0.07 | ET4/T23 | 1.04 |
| f2/CT2 | 8.58 | ET34/ET45 | 2.87 |
| f/R6 | −1.19 | SAG31/CT3 | −1.72 |
| f/R10 | 3.68 | Y11/ImgH | 0.18 |
| │f5/R9│ + │f5/R10│ | 57.02 | Y41/Y32 | 1.46 |
| R4/R1 | −0.85 | Y52cs/Y52 | 0.63 |
| (R2 + R3)/(R2 − R3) | −1.06 | V2/V3 | 3.08 |
| (R3 + R4)/(R3 − R4) | 0.98 | (V4 + V5)/V1 | 1.09 |
| (R7 + R8)/(R7 − R8) | 0.98 | V3/N3 | 10.83 |
| (R9 − R10)/(R9 + R10) | 0.11 | min(Vi/Ni) | 10.83 |

10th Embodiment

Figure 19:
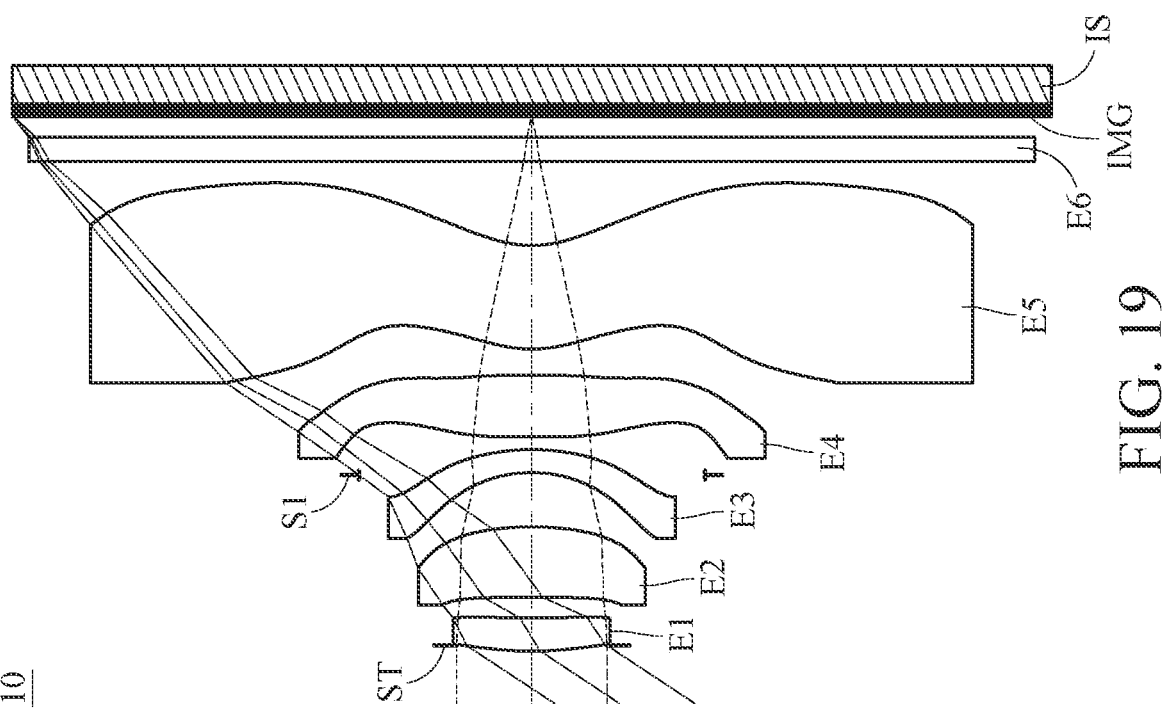
FIG. 19 is a schematic view of an image capturing unit according to the 10th embodiment of the present disclosure.
Figure 20:
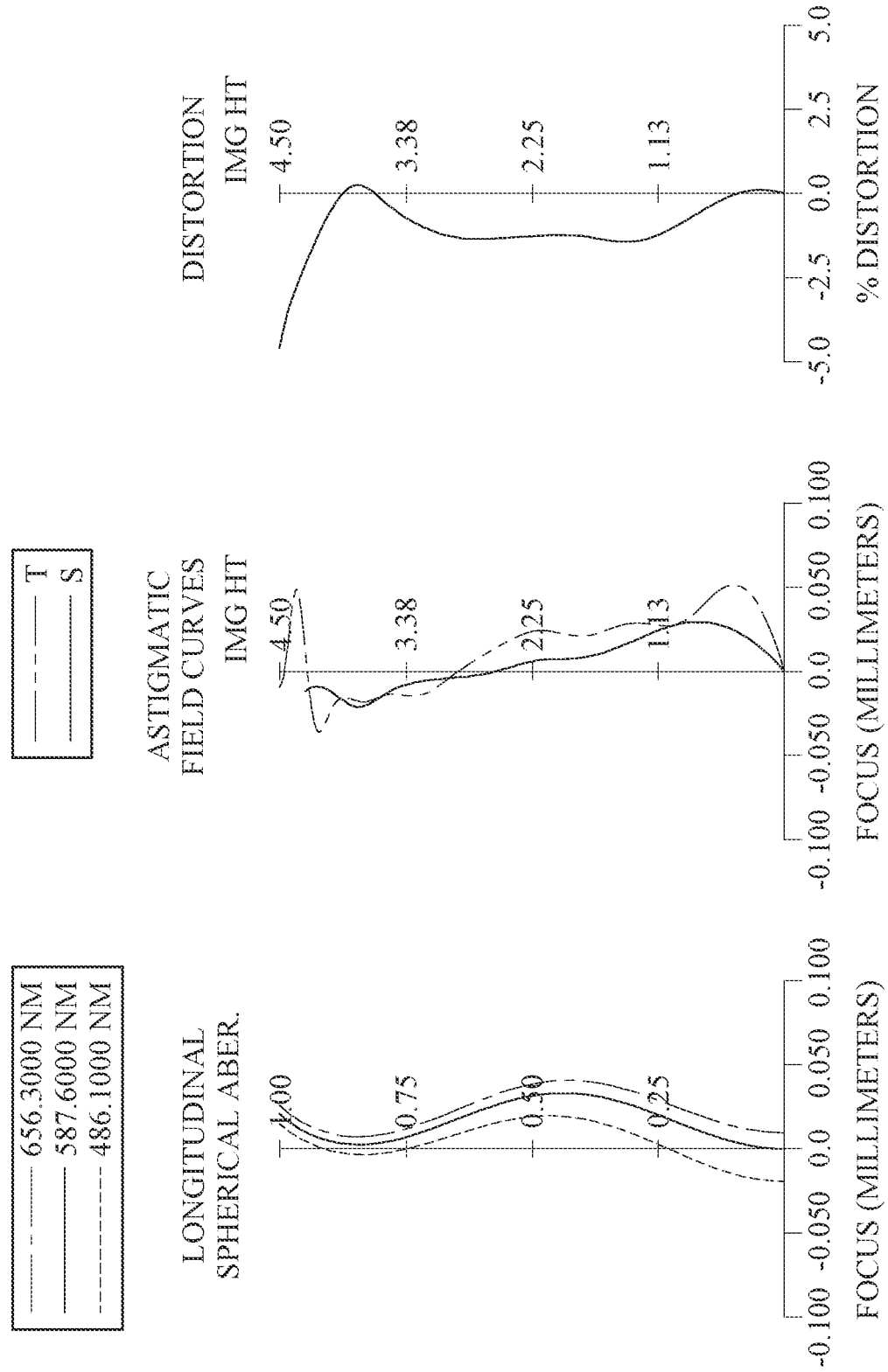
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit 10 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a stop S1, a fourth lens element E4, a fifth lens element E5, a filter E6 and an image surface IMG. The imaging system lens assembly includes five lens elements (E1, E2, E3, E4 and E5) with no additional lens element disposed between each of the adjacent five lens elements.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has one inflection point. The image-side surface of the fifth lens element E5 has one critical point in an off-axis region thereof.

The filter E6 is made of glass material and located between the fifth lens element E5 and the image surface IMG, and will not affect the focal length of the imaging system lens assembly. The image sensor IS is disposed on or near the image surface IMG of the imaging system lens assembly.

In this embodiment, the second lens element E2, the third lens element E3 and the fourth lens element E4 are made of different materials from one another.

The detailed optical data of the 10th embodiment are shown in Table 10A and the aspheric surface data are shown in Table 10B below.

TABLE 10A

10th Embodiment
f = 3.09 mm, Fno = 2.38, HFOV = 56.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.048 | | | | |
| 2 | Lens 1 | 2.9042 | (ASP) | 0.287 | Glass | 1.639 | 55.4 | 7.27 |
| 3 | | 7.4567 | (ASP) | 0.179 | | | | |
| 4 | Lens 2 | −116.4338 | (ASP) | 0.612 | Plastic | 1.544 | 56.0 | 5.03 |
| 5 | | −2.6795 | (ASP) | 0.470 | | | | |
| 6 | Lens 3 | −1.2450 | (ASP) | 0.200 | Plastic | 1.669 | 19.5 | −7.30 |
| 7 | | −1.7787 | (ASP) | −0.220 | | | | |
| 8 | Stop | Plano | | 0.331 | | | | |
| 9 | Lens 4 | −9.0971 | (ASP) | 0.536 | Plastic | 1.562 | 44.6 | −34.84 |
| 10 | | −17.3553 | (ASP) | 0.223 | | | | |
| 11 | Lens 5 | 1.0349 | (ASP) | 0.900 | Plastic | 1.566 | 37.4 | 7.11 |

TABLE 10A-continued

10th Embodiment
f = 3.09 mm, Fno = 2.38, HFOV = 56.7 deg.

| Surface # | | Curvature Radius | | Thickness | Material | Index | Abbe # | Focal Length |
|---|---|---|---|---|---|---|---|---|
| 12 | | 0.9551 | (ASP) | 0.730 | | | | |
| 13 | Filter | Plano | | 0.210 | Glass | 1.517 | 64.2 | |
| 14 | | Plano | | 0.178 | | | | |
| 15 | Image | Plano | | — | | | | |

Note:
Reference wavelength is 587.6 nm (d-line).
An effective radius of the stop S1 (Surface 8) is 1.500 mm.

TABLE 10B

Aspheric Coefficients

| Surface # | 2 | 3 | 4 | 5 |
|---|---|---|---|---|
| k= | −8.83910E−01 | −8.44913E+01 | 9.00000E+01 | 3.34036E+00 |
| A4= | −5.70452178E−02 | −7.07895209E−02 | −7.12798520E−02 | −4.69036627E−02 |
| A6= | −6.66351394E−02 | −1.04630908E−01 | −1.18378449E−01 | −1.47209126E−01 |
| A8= | 4.30075767E−03 | −6.03818613E−02 | 1.27813202E−02 | 4.18036983E−01 |
| A10= | −8.92809817E−02 | 9.80507286E−03 | −1.18361304E−01 | −1.07277391E+00 |
| A12= | — | — | 1.07821668E−02 | 1.37747412E+00 |
| A14= | — | — | −1.07959966E−01 | −9.31889559E−01 |
| A16= | — | — | — | 2.45430047E−01 |

| Surface # | 6 | 7 | 9 | 10 |
|---|---|---|---|---|
| k= | −9.14613E−01 | −2.74879E+00 | 2.64821E+01 | 7.05201E+01 |
| A4= | −4.64225266E−01 | 3.33079141E−02 | 6.61426053E−01 | −2.94528186E−01 |
| A6= | 2.83188709E+00 | 4.65243017E−01 | −1.28452933E+00 | 8.37432451E−01 |
| A8= | −1.38366445E+01 | −3.72212928E+00 | 1.75019399E+00 | −7.20399444E−01 |
| A10= | 4.11865277E+01 | 9.04641870E+00 | −1.80467748E+00 | −1.88676111E−01 |
| A12= | −7.95127556E+01 | −1.18077770E+01 | 1.27998255E+00 | 9.05323956E−01 |
| A14= | 1.03273824E+02 | 9.36962570E+00 | −5.29749181E−01 | −8.87404817E−01 |
| A16= | −8.99163331E+01 | −4.54514200E+00 | 5.68028310E−02 | 4.91193125E−01 |
| A18= | 5.03376556E+01 | 1.24516637E+00 | 5.81173189E−02 | −1.74367659E−01 |
| A20= | −1.63265688E+01 | −1.47786292E−01 | −3.13956815E−02 | 4.05668620E−02 |
| A22= | 2.32127951E+00 | — | 6.59955583E−03 | −6.00061920E−03 |
| A24= | — | — | −5.28397399E−04 | 5.12858268E−04 |
| A26= | — | — | — | −1.93007737E−05 |

| Surface # | 11 | 12 | — | — |
|---|---|---|---|---|
| k= | −4.73426E+00 | −1.88081E+00 | — | — |
| A4= | −2.04309746E−01 | −2.74820252E−01 | — | — |
| A6= | 1.25703643E−01 | 2.45229447E−01 | — | — |
| A8= | 2.67442827E−02 | −1.49169165E−01 | — | — |
| A10= | −1.23442026E−01 | 6.23465639E−02 | — | — |
| A12= | 9.52833952E−02 | −1.84143173E−02 | — | — |
| A14= | −3.86671236E−02 | 3.93159751E−03 | — | — |
| A16= | 9.76738654E−03 | −6.14811530E−04 | — | — |
| A18= | −1.62756557E−03 | 7.07115895E−05 | — | — |
| A20= | 1.80941361E−04 | −5.95343925E−06 | — | — |
| A22= | −1.304454923E−05 | 3.61367758E−07 | — | — |
| A24= | 5.56953149E−07 | −1.53424989E−08 | — | — |
| A26= | −1.07762366E−08 | 4.30826770E−10 | — | — |
| A28= | — | −7.16023647E−12 | — | — |
| A30= | — | 5.30742330E−14 | — | — |

In the 10th embodiment, the equation of the aspheric surface profiles of the aforementioned lens elements is the same as the equation of the 1st embodiment. Also, the definitions of these parameters shown in Table 10C below are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

Values of Conditional Expressions

| | | | |
|---|---|---|---|
| f [mm] | 3.09 | ImgH [mm] | 4.50 |
| Fno | 2.38 | TL/ImgH | 1.03 |
| HFOV [deg.] | 56.7 | TD/BL | 3.15 |
| f/f1 | 0.43 | CRA_D [deg.] | 42.28 |
| f/f3 | −0.42 | T45/CT5 | 0.25 |
| f/f4 | −0.09 | (T45 − T34)/CT3 | 0.56 |
| f1/f2 | 1.45 | (CT1 + CT3 + CT4)/CT2 | 1.67 |

TABLE 10C-continued

Values of Conditional Expressions

| | | | |
|---|---|---|---|
| f123/f45 | 0.54 | (CT4 + T45 + CT5)/(CT1 + T12 + CT2) | 1.54 |
| (\|f1\| + \|f2\| + \|f5\|)/(\|f3\| + \|f4\|) | 0.46 | ATmax/T45 | 2.11 |
| f/f3 + f/f4 + f/f5 | −0.08 | ET4/T23 | 0.48 |
| f2/CT2 | 8.22 | ET34/ET45 | 0.79 |
| f/R6 | −1.74 | SAG31/CT3 | −2.86 |
| f/R10 | 3.24 | Y11/ImgH | 0.14 |
| \|f5/R9\| + \|f5/R10\| | 14.32 | Y41/Y32 | 1.36 |
| R4/R1 | −0.92 | Y52cs/Y52 | 0.58 |
| (R2 + R3)/(R2 − R3) | −0.88 | V2/V3 | 2.87 |
| (R3 + R4)/(R3 − R4) | 1.05 | (V4 + V5)/V1 | 1.48 |
| (R7 + R8)/(R7 − R8) | −3.20 | V3/N3 | 11.68 |
| (R9 − R10)/(R9 + R10) | 0.04 | min(Vi/Ni) | 11.68 |

11th Embodiment

Figure 21:
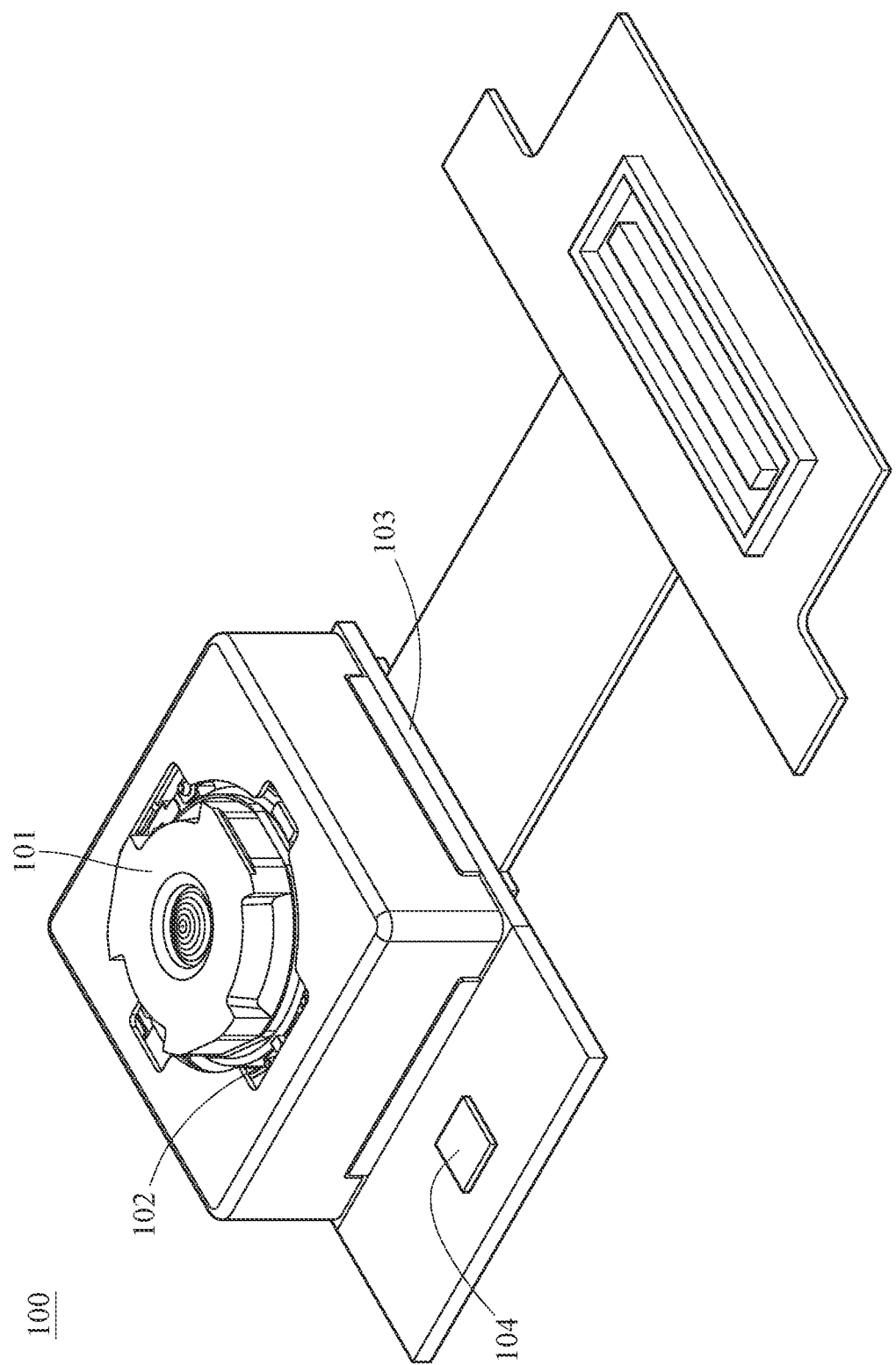
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 100 is a camera module including a lens unit 101, a driving device 102, an image sensor 103 and an image stabilizer 104. The lens unit 101 includes the imaging system lens assembly as disclosed in the 1st embodiment, a barrel and a holder member (their reference numerals are omitted) for holding the imaging system lens assembly. However, the lens unit 101 may alternatively be provided with the imaging system lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the imaging system lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

12th Embodiment

Figure 22:
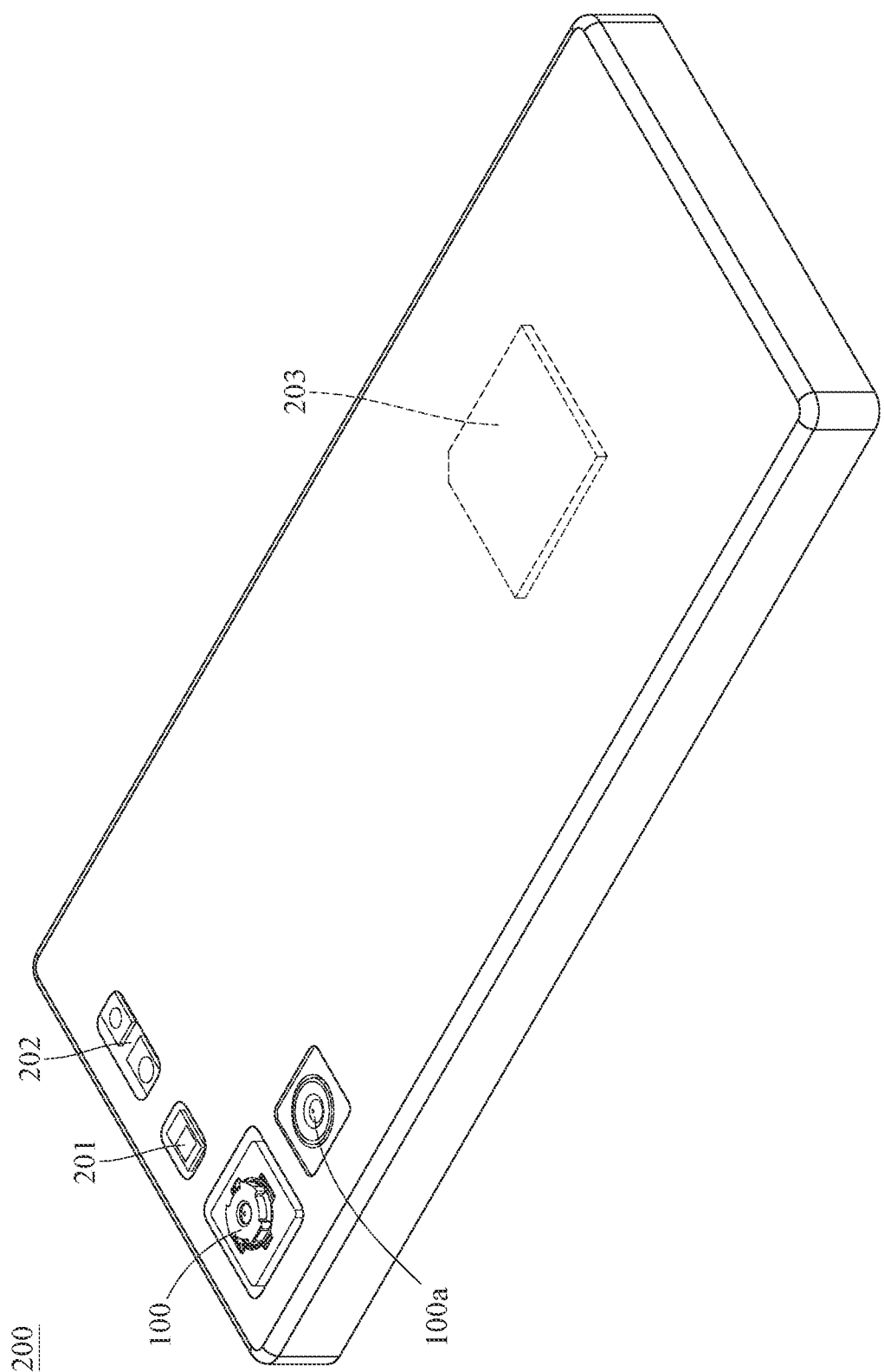
FIG. 22 is one perspective view of an electronic device according to the 12th embodiment of the present disclosure.
Figure 23:
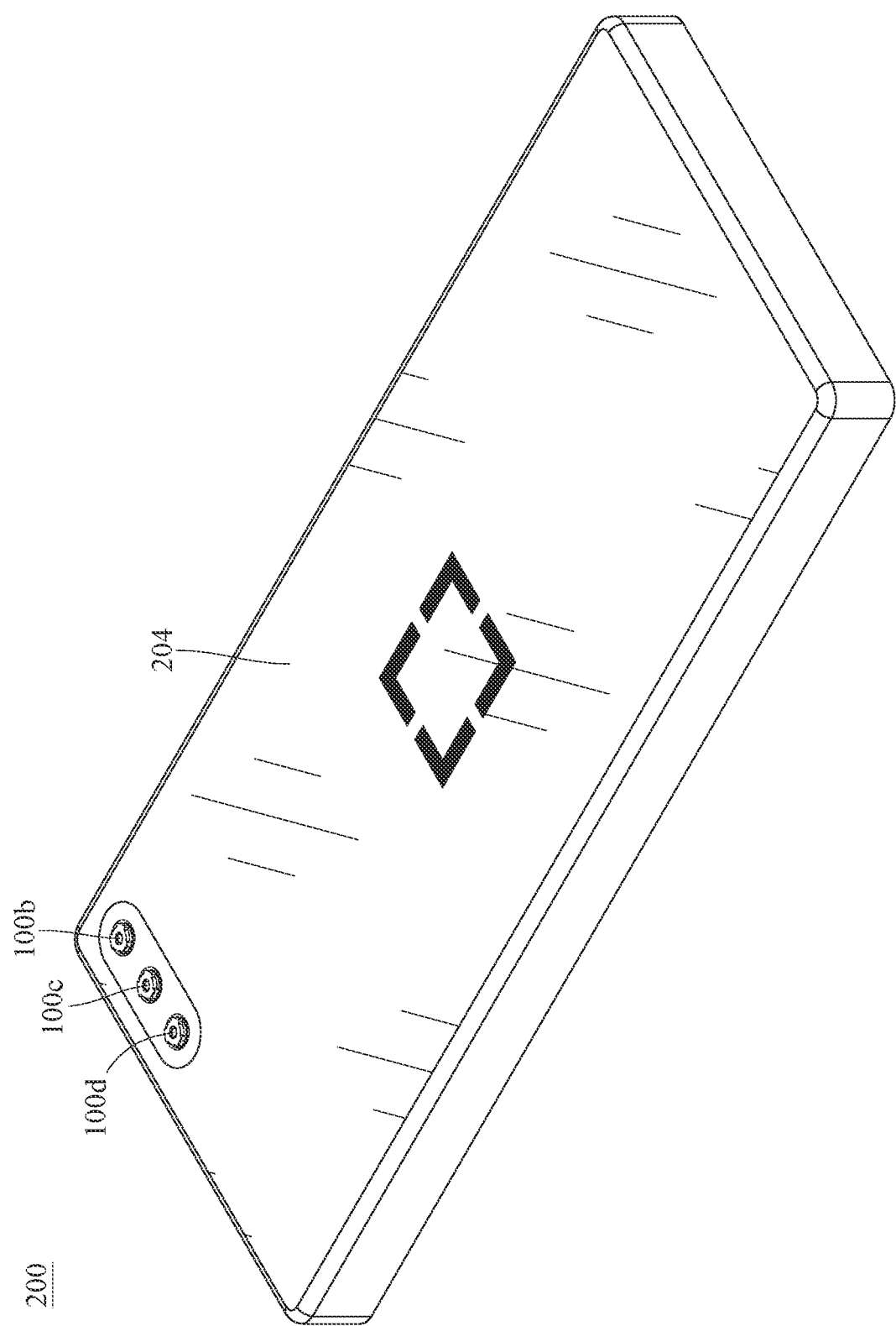
FIG. 23 is another perspective view of the electronic device in FIG. 22.
Figure 24:
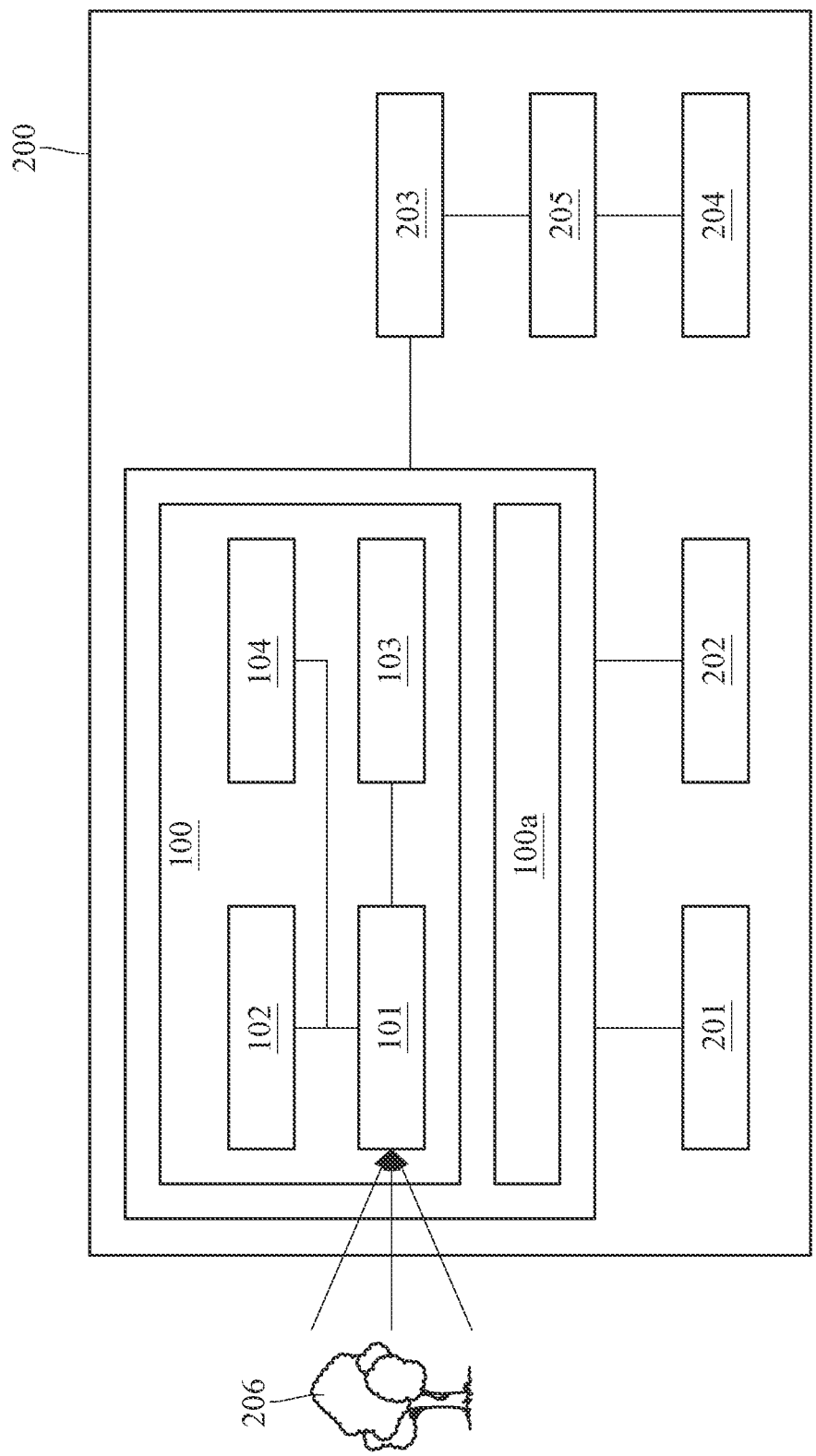
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 200 is a smartphone including the image capturing unit 100 disclosed in the 11th embodiment, an image capturing unit 100a, an image capturing unit 100b, an image capturing unit 100c, an image capturing unit 100d, a flash module 201, a focus assist module 202, an image signal processor 203, a display module 204 and an image software processor 205. The image capturing unit 100 and the image capturing unit 100a are disposed on the same side of the electronic device 200 and each of the image capturing units 100 and 100a has a single focal point. The focus assist module 202 can be a laser rangefinder or a ToF (time of flight) module, but the present disclosure is not limited thereto. The image capturing unit 100b, the image capturing unit 100c, the image capturing unit 100d and the display module 204 are disposed on the opposite side of the electronic device 200, and the display module 204 can be a user interface, such that the image capturing units 100b, 100c, 100d can be front-facing cameras of the electronic device 200 for taking selfies, but the present disclosure is not limited thereto. Furthermore, each of the image capturing units 100a, 100b, 100c and 100d can include the imaging system lens assembly of the present disclosure and can have a configuration similar to that of the image capturing unit 100. In detail, each of the image capturing units 100a, 100b, 100c and 100d can include a lens unit, a driving device, an image sensor and an image stabilizer, and each of the lens unit can include an optical lens assembly such as the imaging system lens assembly of the present disclosure, a barrel and a holder member for holding the optical lens assembly.

The image capturing unit 100 is a wide-angle image capturing unit, the image capturing unit 100a is an ultra-wide-angle image capturing unit, the image capturing unit 100b is a wide-angle image capturing unit, the image capturing unit 100c is an ultra-wide-angle image capturing unit, and the image capturing unit 100d is a ToF image capturing unit. In this embodiment, the image capturing units 100 and 100a have different fields of view, such that the electronic device 200 can have various magnification ratios so as to meet the requirement of optical zoom functionality. In addition, the image capturing unit 100d can determine depth information of the imaged object. In this embodiment, the electronic device 200 includes multiple image capturing units 100, 100a, 100b, 100c and 100d, but the present disclosure is not limited to the number and arrangement of image capturing units.

When a user captures images of an object 206, the light rays converge in the image capturing unit 100 or the image capturing unit 100a to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100b, 100c or 100d to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

13th Embodiment

Figure 25:
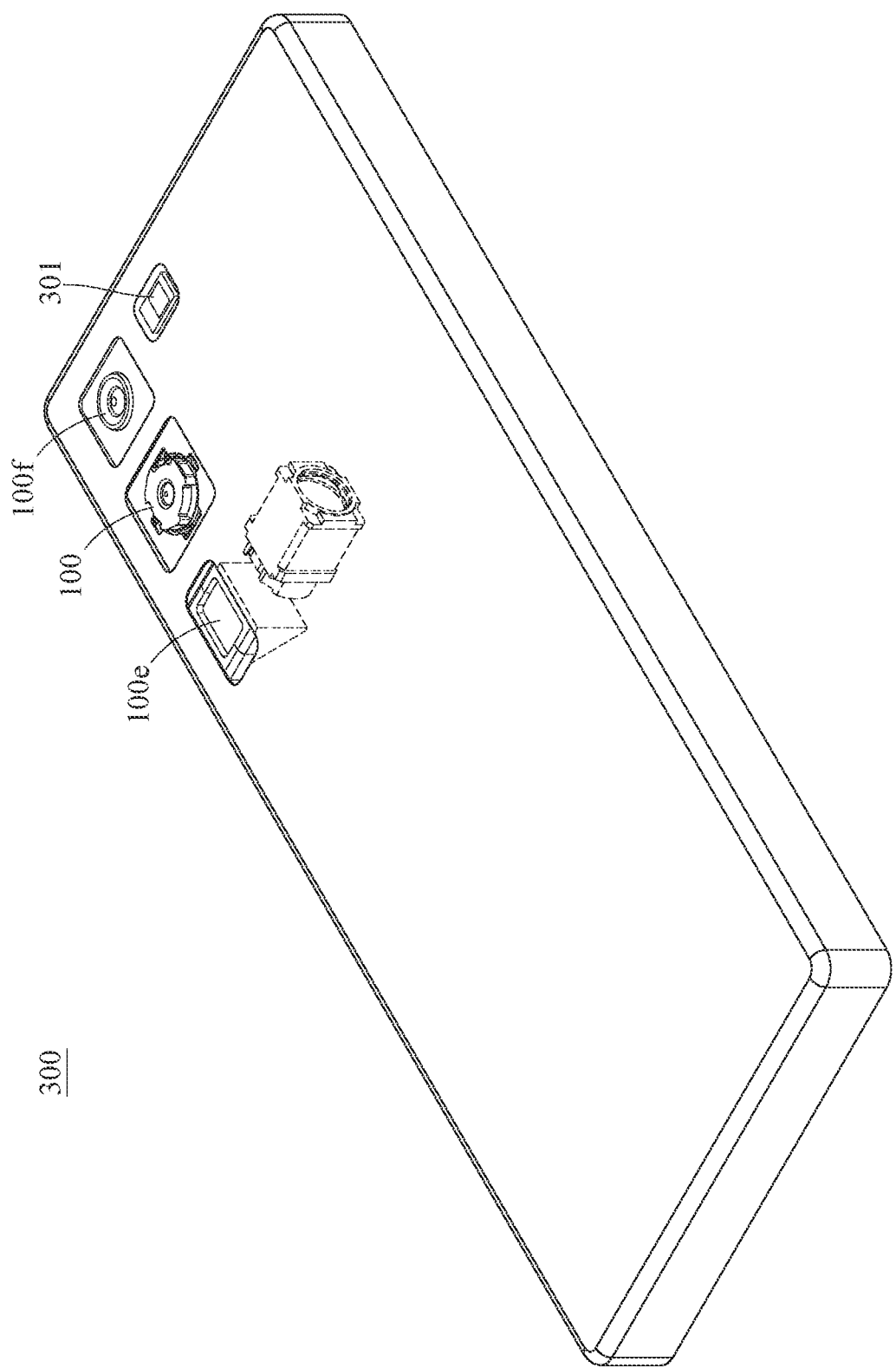
FIG. 25 is one perspective view of an electronic device according to the 13th embodiment of the present disclosure.

FIG. 25 is one perspective view of an electronic device according to the 13th embodiment of the present disclosure.

In this embodiment, an electronic device 300 is a smartphone including the image capturing unit 100 disclosed in the 11th embodiment, an image capturing unit 100e, an image capturing unit 100f, a flash module 301, a focus assist module, an image signal processor, a display module and an image software processor (not shown). The image capturing unit 100, the image capturing unit 100e and the image capturing unit 100f are disposed on the same side of the electronic device 300, while the display module is disposed on the opposite side of the electronic device 300. Furthermore, each of the image capturing units 100e and 100f can include the imaging system lens assembly of the present disclosure and can have a configuration similar to that of the image capturing unit 100, and the details in this regard will not be provided again.

The image capturing unit 100 is a wide-angle image capturing unit, the image capturing unit 100e is a telephoto image capturing unit, and the image capturing unit 100f is an ultra-wide-angle image capturing unit. In this embodiment, the image capturing units 100, 100e and 100f have different fields of view, such that the electronic device 300 can have various magnification ratios so as to meet the requirement of optical zoom functionality. Moreover, the image capturing unit 100e can be a telephoto image capturing unit having a light-folding element configuration, such that the total track length of the image capturing unit 100e is not limited by the thickness of the electronic device 300. Moreover, the light-folding element configuration of the image capturing unit 100e can be similar to, for example, one of the structures shown in FIG. 32 to FIG. 34, which can be referred to foregoing descriptions corresponding to FIG. 32 to FIG. 34, and the details in this regard will not be provided again. In this embodiment, the electronic device 300 includes multiple image capturing units 100, 100e and 100f, but the present disclosure is not limited to the number and arrangement of image capturing units. When a user captures images of an object, light rays converge in the image capturing unit 100, 100e or 100f to generate images, and the flash module 301 is activated for light supplement. Further, the subsequent processes are performed in a manner similar to the abovementioned embodiment, so the details in this regard will not be provided again.

14th Embodiment

Figure 26:
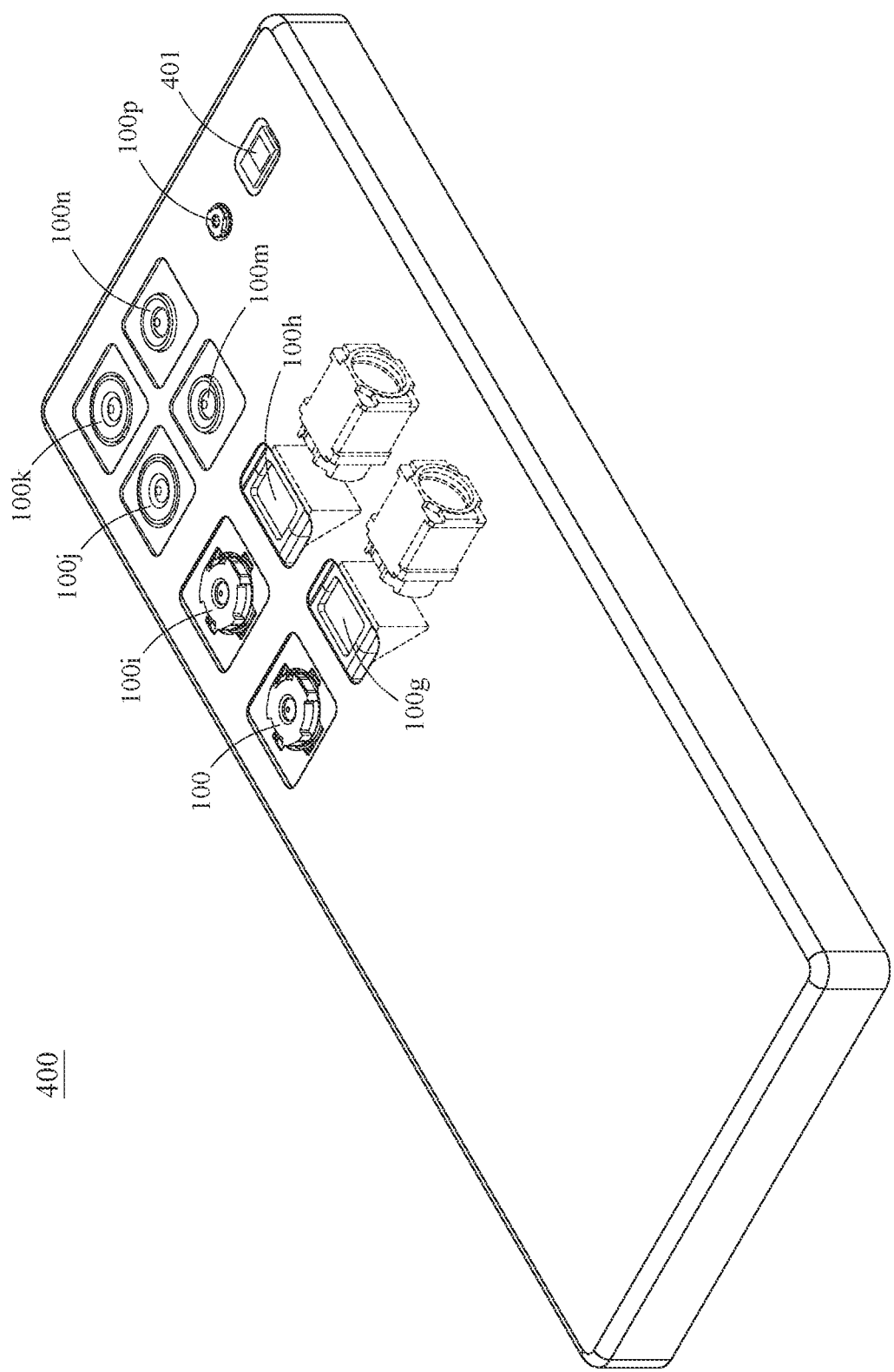
FIG. 26 is one perspective view of an electronic device according to the 14th embodiment of the present disclosure.

FIG. 26 is one perspective view of an electronic device according to the 14th embodiment of the present disclosure.

In this embodiment, an electronic device 400 is a smartphone including the image capturing unit 100 disclosed in the 11th embodiment, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 401, a focus assist module, an image signal processor, a display module and an image software processor (not shown). The image capturing units 100, 100g, 100h, 100i, 100j, 100k, 100m, 100n and 100p are disposed on the same side of the electronic device 400, while the display module is disposed on the opposite side of the electronic device 400. Furthermore, each of the image capturing units 100g, 100h, 100i, 100j, 100k, 100m, 100n and 100p can include the imaging system lens assembly of the present disclosure and can have a configuration similar to that of the image capturing unit 100, and the details in this regard will not be provided again.

The image capturing unit 100 is a wide-angle image capturing unit, the image capturing unit 100g is a telephoto image capturing unit, the image capturing unit 100h is a telephoto image capturing unit, the image capturing unit 100i is a wide-angle image capturing unit, the image capturing unit 100j is an ultra-wide-angle image capturing unit, the image capturing unit 100k is an ultra-wide-angle image capturing unit, the image capturing unit 100m is a telephoto image capturing unit, the image capturing unit 100n is a telephoto image capturing unit, and the image capturing unit 100p is a ToF image capturing unit. In this embodiment, the image capturing units 100, 100g, 100h, 100i, 100j, 100k, 100m and 100n have different fields of view, such that the electronic device 400 can have various magnification ratios so as to meet the requirement of optical zoom functionality. Moreover, each of the image capturing units 100g and 100h can be a telephoto image capturing unit having a light-folding element configuration. Moreover, the light-folding element configuration of each of the image capturing unit 100g and 100h can be similar to, for example, one of the structures shown in FIG. 32 to FIG. 34, which can be referred to foregoing descriptions corresponding to FIG. 32 to FIG. 34, and the details in this regard will not be provided again. In addition, the image capturing unit 100p can determine depth information of the imaged object. In this embodiment, the electronic device 400 includes multiple image capturing units 100, 100g, 100h, 100i, 100j, 100k, 100m, 100n and 100p, but the present disclosure is not limited to the number and arrangement of image capturing units. When a user captures images of an object, the light rays converge in the image capturing unit 100, 100g, 100h, 100i, 100j, 100k, 100m, 100n or 100p to generate images, and the flash module 401 is activated for light supplement. Further, the subsequent processes are performed in a manner similar to the abovementioned embodiments, and the details in this regard will not be provided again.

15th Embodiment

Figure 27:
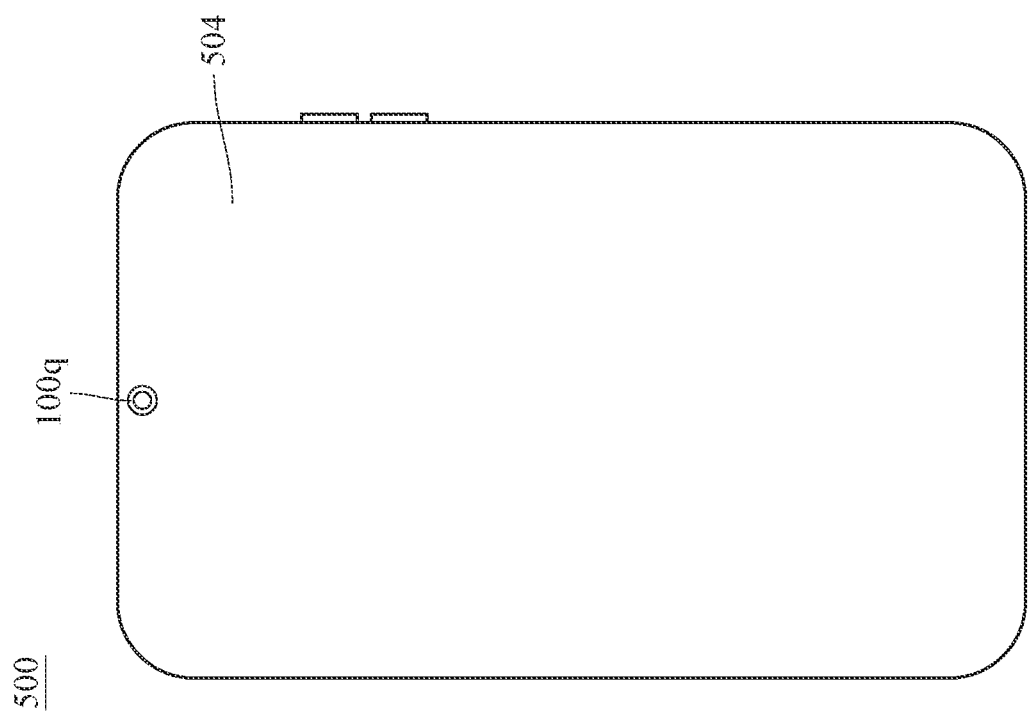
FIG. 27 is one perspective view of an electronic device according to the 15th embodiment of the present disclosure.
Figure 28:
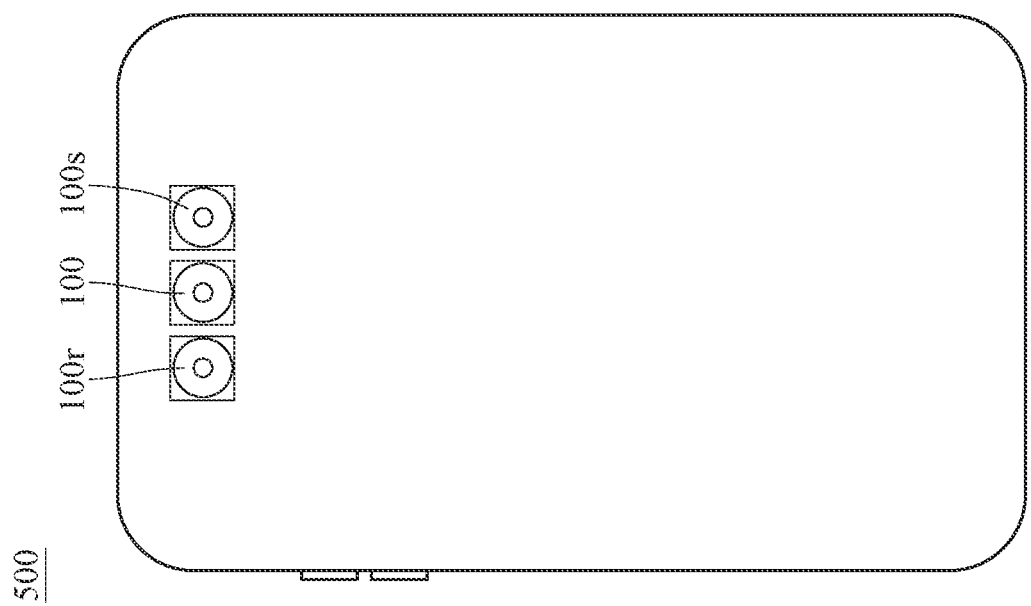
FIG. 28 is another perspective view of the electronic device in FIG. 27.

FIG. 27 is one perspective view of an electronic device according to the 15th embodiment of the present disclosure, and FIG. 28 is another perspective view of the electronic device in FIG. 27.

In this embodiment, an electronic device 500 is a smartphone including the image capturing unit 100 disclosed in the 11th embodiment, an image capturing unit 100q, an image capturing unit 100r, an image capturing unit 100s and a display module 504.

In this embodiment, the image capturing unit 100, the image capturing unit 100r and the image capturing unit 100s are disposed on the same side of the electronic device 500, and the image capturing unit 100q and the display module 504 are disposed on the opposite side of the electronic device 500. The image capturing unit 100q can be a front-facing camera of the electronic device 500 for taking selfies, but the present disclosure is not limited thereto. Furthermore, each of the image capturing units 100q, 100r and 100s can include the imaging system lens assembly of the present disclosure and can have a configuration similar to that of the image capturing unit 100, and the details in this regard will not be provided again.

The image capturing unit 100 is a wide-angle image capturing unit, the image capturing unit 100r is a telephoto image capturing unit, and the image capturing unit 100s is an ultra-wide-angle image capturing unit. In this embodiment, the image capturing units 100, 100r and 100s have different fields of view, such that the electronic device 500 can have various magnification ratios so as to meet the requirement of optical zoom functionality for various applications with different requirements. The image capturing unit 100q can have a non-circular opening, and optical components in the image capturing unit 100q can have trimmed edges at their outermost positions so as to coordinate with the shape of the non-circular opening. Therefore, it is favorable for reducing the size of the image capturing unit 100q so as to increase the ratio of the area of the display module 504 relative to that of the electronic device 500, and reduce the thickness of the electronic device 500. In this embodiment, the electronic device 500 includes multiple image capturing units 100, 100q, 100r and 100s, but the present disclosure is not limited to the number and arrangement of image capturing units.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the imaging system lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-10C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging system lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;
wherein the first lens element has positive refractive power, the object-side surface of the first lens element is convex in a paraxial region thereof, the image-side surface of the first lens element is concave in a paraxial region thereof, the second lens element has positive refractive power, the image-side surface of the second lens element is convex in a paraxial region thereof, the object-side surface of the third lens element is concave in a paraxial region thereof, the image-side surface of the third lens element is convex in a paraxial region thereof, the fifth lens element has positive refractive power, the object-side surface of the fifth lens element is convex in a paraxial region thereof, the image-side surface of the fifth lens element is concave in a paraxial region thereof, and the image-side surface of the fifth lens element has at least one inflection point;
wherein a focal length of the imaging system lens assembly is f, a focal length of the third lens element is f3, a focal length of the fourth lens element is f4, an axial distance between the fourth lens element and the fifth lens element is T45, a central thickness of the fifth lens element is CT5, a curvature radius of the image-side surface of the third lens element is R6, half of a maximum field of view of the imaging system lens assembly is HFOV, and the following conditions are satisfied:

$-3.00 < f/f3 < 0.40;$ $-3.00 < f/f4 < 0.45;$ $0.15 < T45/CT5 < 1.50;$ $-2.80 < f/R6 < -0.10;$ and $20.00$ degrees $<$ HFOV $< 75.00$ degrees.

2. The imaging system lens assembly of claim 1, wherein a curvature radius of the object-side surface of the second lens element is R3, a curvature radius of the image-side surface of the second lens element is R4, a focal length of the second lens element is f2, a central thickness of the second lens element is CT2, and the following conditions are satisfied:

$0.25 < (R3+R4)/(R3-R4) < 2.00;$ and $5.30 < f2/CT2 < 20.00.$

3. The imaging system lens assembly of claim 1, wherein an axial distance between the object-side surface of the first lens element and an image surface is TL, a maximum image height of the imaging system lens assembly is ImgH, and the following condition is satisfied:

$60 < TL/ImgH < 1.45.$

4. The imaging system lens assembly of claim 1, wherein a maximum effective radius of the image-side surface of the third lens element is Y32, a maximum effective radius of the object-side surface of the fourth lens element is Y41, and the following condition is satisfied:

$25 < Y41/Y32 < 1.80.$

5. The imaging system lens assembly of claim 1, wherein a focal length of the first lens element is f1, a focal length of the second lens element is f2, the focal length of the third lens element is f3, the focal length of the fourth lens element is f4, a focal length of the fifth lens element is f5, and the following condition is satisfied:

$0.20 < (|f1|+|f2|+|f5|)/(|f3|+|f4|) < 2.00.$

6. The imaging system lens assembly of claim 1, wherein an Abbe number of the second lens element is V2, an Abbe number of the third lens element is V3, and the following condition is satisfied:

$1.10 < V2/V3 < 4.50.$

7. The imaging system lens assembly of claim 1, wherein a distance in parallel with an optical axis between a maximum effective radius position of the object-side surface of the fourth lens element and a maximum effective radius position of the image-side surface of the fourth lens element is ET4, an axial distance between the second lens element and the third lens element is T23, and the following condition is satisfied:

$$0.10 < ET4/T23 < 2.50.$$

8. The imaging system lens assembly of claim 1, wherein a central thickness of the first lens element is CT1, a central thickness of the second lens element is CT2, a central thickness of the third lens element is CT3, a central thickness of the fourth lens element is CT4, a focal length of the first lens element is f1, a focal length of the second lens element is f2, and the following conditions are satisfied:

$$1.50 < (CT1+CT3+CT4)/CT2 < 2.60;\ \text{and}$$

$$0.25 < f1/f2 < 4.00.$$

9. The imaging system lens assembly of claim 1, wherein a chief ray angle of the maximum field of view on an image surface of the imaging system lens assembly is CRA_D, and the following condition is satisfied:

$$34.00\ \text{degrees} < CRA\_D < 65.00\ \text{degrees}.$$

10. The imaging system lens assembly of claim 1, wherein the fifth lens element is made of plastic material, the image-side surface of the fifth lens element has at least one critical point in an off-axis region thereof, a vertical distance between a critical point closest to an image surface on the image-side surface of the fifth lens element and an optical axis is Y52cs, a maximum effective radius of the image-side surface of the fifth lens element is Y52, and the following condition is satisfied:

$$35 < Y52cs/Y52 < 0.80.$$

11. An image capturing unit comprising:
the imaging system lens assembly of claim 1; and
an image sensor disposed on an image surface of the imaging system lens assembly.

12. An electronic device comprising:
the image capturing unit of claim 11.

13. An imaging system lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;
wherein the first lens element has positive refractive power, the object-side surface of the first lens element is convex in a paraxial region thereof, the second lens element has positive refractive power, the image-side surface of the third lens element is convex in a paraxial region thereof, the fifth lens element has positive refractive power, the object-side surface of the fifth lens element is convex in a paraxial region thereof, the image-side surface of the fifth lens element is concave in a paraxial region thereof, and the image-side surface of the fifth lens element has at least one critical point in an off-axis region thereof;
wherein a focal length of the imaging system lens assembly is f, a composite focal length of the first lens element, the second lens element and the third lens element is f123, a composite focal length of the fourth lens element and the fifth lens element is f45, a maximum value among all axial distances between each of all adjacent lens elements of the imaging system lens assembly is ATmax, an axial distance between the fourth lens element and the fifth lens element is T45, a curvature radius of the object-side surface of the fourth lens element is R7, a curvature radius of the image-side surface of the fourth lens element is R8, a curvature radius of the image-side surface of the fifth lens element is R10, and the following conditions are satisfied:

$$-0.35 < f123/f45 < 3.50;$$

$$1.00 \le AT\text{max}/T45 < 3.00;$$

$$-4.00 < (R7+R8)/(R7-R8) < 3.00;\ \text{and}$$

$$0.15 < f/R10 < 10.00.$$

14. The imaging system lens assembly of claim 13, wherein the focal length of the imaging system lens assembly is f, a focal length of the first lens element is f1, a curvature radius of the object-side surface of the first lens element is R1, a curvature radius of the image-side surface of the second lens element is R4, and the following conditions are satisfied:

$$0.25 < f/f1 < 1.50;\ \text{and}$$

$$-4.50 < R4/R1 < 0.00.$$

15. The imaging system lens assembly of claim 13, wherein a curvature radius of the object-side surface of the fifth lens element is R9, the curvature radius of the image-side surface of the fifth lens element is R10, and the following condition is satisfied:

$$-0.15 < (R9-R10)/(R9+R10) < 0.25.$$

16. The imaging system lens assembly of claim 13, wherein an f-number of the imaging system lens assembly is Fno, an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the i-th lens element is Ni, a minimum value of Vi/Ni is min(Vi/Ni), and the following conditions are satisfied:

$$1.60 < Fno < 2.46;\ \text{and}$$

$$\min(Vi/Ni) < 14.00,\ \text{wherein}\ i=1,\ 2,\ 3,\ 4\ \text{or}\ 5.$$

17. The imaging system lens assembly of claim 13, wherein the object-side surface of the third lens element is concave in a paraxial region thereof, a displacement in parallel with an optical axis from an axial vertex of the object-side surface of the third lens element to a maximum effective radius position of the object-side surface of the third lens element is SAG31, a central thickness of the third lens element is CT3, and the following condition is satisfied:

$$-5.00 \le SAG31/CT3 < -0.75.$$

18. The imaging system lens assembly of claim 13, wherein a maximum image height of the imaging system lens assembly is ImgH, an axial distance between the object-side surface of the first lens element and the image-side surface of the fifth lens element is TD, an axial distance between the image-side surface of the fifth lens element and an image surface is BL, and the following conditions are satisfied:

$$60\ \text{mm} < ImgH < 6.00\ \text{mm};\ \text{and}$$

$$1.00 < TD/BL < 4.80.$$

19. The imaging system lens assembly of claim 13, wherein the second lens element, the third lens element and the fourth lens element are made of different materials from one another.

20. An imaging system lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;
   wherein the first lens element has positive refractive power, the object-side surface of the first lens element is convex in a paraxial region thereof, the image-side surface of the first lens element is concave in a paraxial region thereof, the image-side surface of the second lens element is convex in a paraxial region thereof, the object-side surface of the third lens element is concave in a paraxial region thereof, the image-side surface of the third lens element is convex in a paraxial region thereof, the fifth lens element has positive refractive power, and the image-side surface of the fifth lens element has at least one critical point in an off-axis region thereof;
   wherein a focal length of the imaging system lens assembly is f, a focal length of the first lens element is f1, a focal length of the fifth lens element is f5, a curvature radius of the image-side surface of the first lens element is R2, a curvature radius of the object-side surface of the second lens element is R3, a curvature radius of the object-side surface of the fifth lens element is R9, a curvature radius of the image-side surface of the fifth lens element is R10, an axial distance between the third lens element and the fourth lens element is T34, an axial distance between the fourth lens element and the fifth lens element is T45, a central thickness of the third lens element is CT3, and the following conditions are satisfied:

$0.15 < f/f1 < 1.80;$ $6.00 < |f5/R9| - |f5/R10| < 65.00;$ $-20.00 < (R2+R3)/(R2-R3) < -0.30;$ and $0.10 < (T45-T34)/CT3 < 3.00.$ 21. The imaging system lens assembly of claim 20, wherein an Abbe number of the third lens element is V3, a refractive index of the third lens element is N3, and the following condition is satisfied:

$5.00 \leq V3/N3 < 35.00.$

22. The imaging system lens assembly of claim 20, wherein the focal length of the imaging system lens assembly is f, a focal length of the third lens element is f3, a focal length of the fourth lens element is f4, the focal length of the fifth lens element is f5, and the following condition is satisfied:

$-0.90 < f/f3 + f/f4 + f/f5 < 0.30.$

23. The imaging system lens assembly of claim 20, wherein the object-side surface of the fourth lens element has at least one concave critical point in an off-axis region thereof;
   wherein a distance in parallel with an optical axis between a maximum effective radius position of the image-side surface of the third lens element and a maximum effective radius position of the object-side surface of the fourth lens element is ET34, a distance in parallel with the optical axis between a maximum effective radius position of the image-side surface of the fourth lens element and a maximum effective radius position of the object-side surface of the fifth lens element is ET45, and the following condition is satisfied:

$0.35 < ET34/ET45 < 8.00.$

24. The imaging system lens assembly of claim 20, wherein half of a maximum field of view of the imaging system lens assembly is HFOV, a maximum effective radius of the object-side surface of the first lens element is Y11, a maximum image height of the imaging system lens assembly is ImgH, and the following conditions are satisfied:

$30.00 \text{ degrees} < \text{HFOV} < 70.00 \text{ degrees; and}$ $0.10 < Y11/ImgH < 0.35.$ 25. The imaging system lens assembly of claim 20, wherein an Abbe number of the first lens element is V1, an Abbe number of the fourth lens element is V4, an Abbe number of the fifth lens element is V5, and the following condition is satisfied:

$0.90 < (V4+V5)/V1 < 1.90.$

26. The imaging system lens assembly of claim 20, wherein a central thickness of the first lens element is CT1, a central thickness of the second lens element is CT2, a central thickness of the fourth lens element is CT4, a central thickness of the fifth lens element is CT5, an axial distance between the first lens element and the second lens element is T12, the axial distance between the fourth lens element and the fifth lens element is T45, and the following condition is satisfied:

$0.85 < (CT4+T45+CT5)/(CT1+T12+CT2) < 2.00.$

* * * * *

UNITED STATES PATENT AND TRADEMARK OFFICE
CERTIFICATE OF CORRECTION

PATENT NO. : 12,372,746 B2
APPLICATION NO. : 17/960685
DATED : July 29, 2025
INVENTOR(S) : Wei-Xiang Fu et al.

It is certified that error appears in the above-identified patent and that said Letters Patent is hereby corrected as shown below:

In the Claims

Column 60, Line 8 Claim 1:
Delete:
"element is CTS, a curvature radius of the image-side"
And insert therefor:
--element is CT5, a curvature radius of the image-side--

Column 60, Line 40 Claim 3:
Delete:
"60 < TL/ImgH < 1.45."
And insert therefor:
--0.60 < TL/ImgH < 1.45.--

Column 60, Line 47 Claim 4:
Delete:
"25 < Y41/Y32 < 1.80."
And insert therefor:
--1.25 < Y41/Y32 < 1.80.--

Column 61, Line 31 Claim 10:
Delete:
"35 < Y52cs/Y52 < 0.80."
And insert therefor:
--0.35 < Y52cs/Y52 <0.80.--

Column 62, Line 55 Claim 17:
Delete:
"-5.00 ≤ SAG31/CT3 < -0.75."

Signed and Sealed this
Twenty-eighth Day of October, 2025

John A. Squires
*Director of the United States Patent and Trademark Office*

And insert therefor:
-- -5.00 <SAG31/CT3 < -0.75.--

Column 62, Line 65 Claim 18:
Delete:
"60 mm < ImgH <6.00 mm; and"
And insert therefor:
--2.60 mm < ImgH < 6.00 mm; and--

Column 63, Line 43 Claim 20:
Delete:
"6.00 < |f5/R9|-|f5/R10| < 65.00;"
And insert therefor:
--6.00 < |f5/R9|+|f5/R10| < 65.00;--

Column 63, Line 52 Claim 21:
Delete:
"5.00 ≤ V3/N3 < 35.00."
And insert therefor:
--5.00 < V3/N3 < 35.00.--

Column 64, Line 45 Claim 26:
Delete:
"thickness of the fifth lens element is CTS, an axial distance"
And insert therefor:
--thickness of the fifth lens element is CT5, an axial distance--